(12) United States Patent
Hatada

(10) Patent No.: US 8,906,565 B2
(45) Date of Patent: Dec. 9, 2014

(54) METHOD FOR LOAD FOLLOWING OPERATION OF FUEL CELL SYSTEM

(75) Inventor: Susumu Hatada, Kanagawa (JP)

(73) Assignee: JX Nippon Oil & Energy Corporation (JP)

( * ) Notice: Subject to any disclaimer, the term of this patent is extended or adjusted under 35 U.S.C. 154(b) by 288 days.

(21) Appl. No.: 13/392,296

(22) PCT Filed: Aug. 26, 2010

(86) PCT No.: PCT/JP2010/064489
§ 371 (c)(1),
(2), (4) Date: Feb. 24, 2012

(87) PCT Pub. No.: WO2011/024899
PCT Pub. Date: Mar. 3, 2011

(65) Prior Publication Data
US 2012/0171589 A1    Jul. 5, 2012

(30) Foreign Application Priority Data

Aug. 27, 2009   (JP) .................. 2009-196694
Sep. 24, 2009   (JP) .................. 2009-218897
Sep. 24, 2009   (JP) .................. 2009-218898
Sep. 24, 2009   (JP) .................. 2009-219021

(51) Int. Cl.
*H01M 8/04*    (2006.01)
*C01B 3/38*    (2006.01)
*H01M 8/06*    (2006.01)

(52) U.S. Cl.
CPC ..... *H01M 8/0618* (2013.01); *C01B 2203/1247* (2013.01); *Y02E 60/50* (2013.01);
(Continued)

(58) Field of Classification Search
USPC .......... 429/425, 416, 417, 423, 424, 427, 428
See application file for complete search history.

(56) References Cited

U.S. PATENT DOCUMENTS

2002/0102447 A1    8/2002   Kato
2005/0102902 A1*   5/2005   Kamijo ............... 48/214 A
(Continued)

FOREIGN PATENT DOCUMENTS

CN    1643724 A    7/2005
CN    1841830 A    10/2006
(Continued)

OTHER PUBLICATIONS

Extended European Search Report for European Application No. 10794078.5, dated Oct. 15, 2013.
(Continued)

*Primary Examiner* — Mark F Huff
*Assistant Examiner* — Monique Wills
(74) *Attorney, Agent, or Firm* — Cantor Colburn LLP

(57) ABSTRACT

Two or more methods selected among a steam reforming method, a partial oxidation reforming method, and an autothermal reforming method are defined as i-th reforming method. Functions Fi=fi(P), P=fi-1(Fi), and ηi=gi(P) are obtained in advance. If there is a number i which satisfies FiR≥Fimin, the following process (1) is performed when PD≤P is satisfied, and the following process (2) is performed when PD>PiM is satisfied. In the process (1), if fi(PD)≤FiR is satisfied, Pi*=PD and Fi*=fi(PD), and if fi(PD)>FiR is satisfied, Pi*=(the maximum fi−1(FiR) which is less than PD) and Fi*=FiR. In the process (2), if fi(PiM)≤FiR is satisfied, Pi*=PiM and Fi*=fi(PiM), and if fi(PiM)>FiR is satisfied, Pi*=(the maximum fi−1(FiR)) and Fi*=FiR. If there are a plurality of numbers i which satisfy FiR≥Fimin, PI*, a reforming method, and FI*, which relate to the number i which provides the maximal ηi=gi(Pi*), are adopted.

16 Claims, 11 Drawing Sheets

(52) U.S. Cl.
CPC ... *C01B 2203/169* (2013.01); *C01B 2203/0233* (2013.01); C01B 3/38 (2013.01); *C01B 2203/1619* (2013.01); *C01B 2203/1235* (2013.01); *C01B 2203/0244* (2013.01); *C01B 2203/0261* (2013.01); *C01B 2203/066* (2013.01)
USPC .......................................... 429/425; 429/416

(56) References Cited

U.S. PATENT DOCUMENTS

| | | | |
|---|---|---|---|
| 2005/0123812 | A1 | 6/2005 | Okamoto |
| 2006/0046109 | A1 | 3/2006 | Mizukami et al. |
| 2007/0224469 | A1 | 9/2007 | Isozaki et al. |
| 2010/0119888 | A1 | 5/2010 | Song et al. |
| 2010/0173208 | A1 | 7/2010 | Hatada |
| 2010/0221619 | A1 | 9/2010 | Fujihara et al. |
| 2010/0279185 | A1 | 11/2010 | Hatada |
| 2011/0027676 | A1 | 2/2011 | Hatada |
| 2011/0039174 | A1 | 2/2011 | Hatada |

FOREIGN PATENT DOCUMENTS

| | | |
|---|---|---|
| CN | 101379646 A | 3/2009 |
| JP | 63-314769 A | 12/1988 |
| JP | 2001-185196 A | 7/2001 |
| JP | 2002-231287 A | 8/2002 |
| JP | 2004-178962 A | 6/2004 |
| JP | 2004-319420 A | 11/2004 |
| JP | 2006-008458 A | 1/2006 |
| JP | 2006-032262 A | 2/2006 |
| JP | 2006-107956 A | 4/2006 |
| JP | 2007-220620 A | 8/2007 |
| JP | 2007-311288 A | 11/2007 |
| JP | 2008-30069 A | 12/2008 |
| JP | 2008-300069 A | 12/2008 |
| JP | 2008-311030 A | 12/2008 |
| JP | 2009-137778 A | 6/2009 |
| JP | 2009-238591 A | 10/2009 |
| JP | 2009-238598 A | 10/2009 |
| JP | 2009-238599 A | 10/2009 |
| WO | 2008/149504 A1 | 12/2008 |

OTHER PUBLICATIONS

International Search Report for International application No. PCT/JP2010/064489 mailing date of Nov. 22, 2010 with English Translation.

Chinese Office Action for Chinese Patent Application No. 201080037751.0, mailed Jan. 10, 2014, with partial English translation.

* cited by examiner

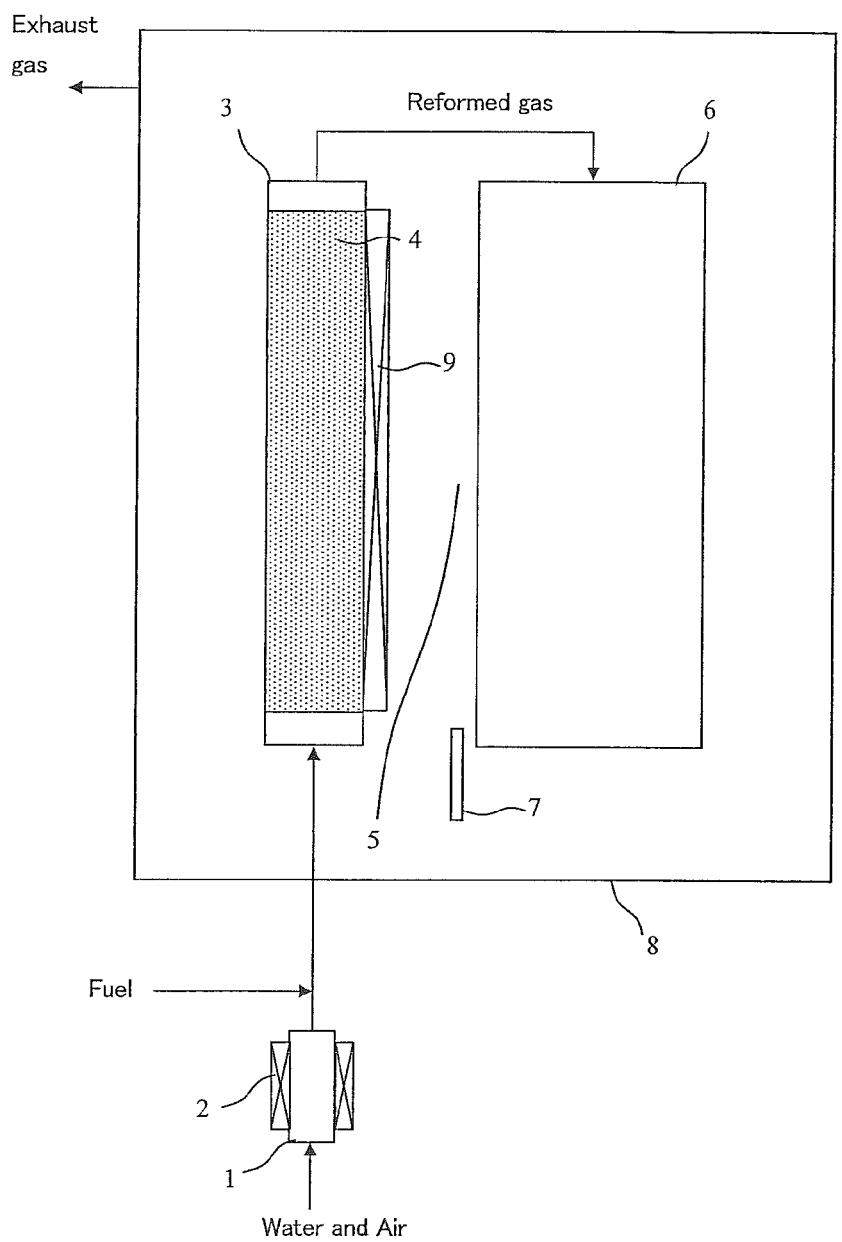

US 8,906,565 B2

METHOD FOR LOAD FOLLOWING OPERATION OF FUEL CELL SYSTEM

CROSS REFERENCE TO RELATED APPLICATIONS

This is a U.S. national stage of application No. PCT/JP2010/064489 filed on Aug. 26, 2010. Priority under 35 U.S.C. §119(a) and 35 U.S.C. §365(b) is claimed from Japanese Application Nos. 2009-196694, filed Aug. 27, 2009; 2009-218897, filed Sep. 24, 2009; 2009-218898, filed Sep. 24, 2009; and 2009-219021, filed Sep. 24, 2009, the disclosure of which is also incorporated herein by reference.

TECHNICAL FIELD

The present invention relates to a method for load following operation of a fuel cell system that generates electric power using a reformed gas obtained by reforming a hydrocarbon-based fuel, such as kerosene.

BACKGROUND ART

A solid oxide fuel cell (hereinafter sometimes referred to as SOFC) system usually includes a reformer for reforming a hydrocarbon-based fuel, such as kerosene and city gas, to generate a hydrogen-containing gas (reformed gas), and an SOFC for electrochemically reacting the reformed gas and air for electric power generation.

The SOFC is usually operated at a high temperature of 550 to 1000° C.

Various reactions, such as steam reforming (SR), partial oxidation reforming (POX), and autothermal reforming (ATR), are used for reforming, and heating to a temperature at which catalytic activity is exhibited is necessary for using a reforming catalyst.

Steam reforming is a very largely endothermic reaction. Also, the reaction temperature of the steam reforming is 550 to 750° C., which is relatively high, and the steam reforming requires a high temperature heat source. Therefore, an internal reforming SOFC is known in which a reformer (internal reformer) is installed near an SOFC, and the reformer is heated mainly using radiant heat from the SOFC as a heat source (Patent Literature 1).

Also, proposals on the load following operation of a fuel cell system are made in Patent Literatures 2 and 3.

PRIOR ART LITERATURES

Patent Literature

Patent Literature 1: JP2004-319420A
Patent Literature 2: JP2001-185196A
Patent Literature 3: JP2006-32262A

SUMMARY OF INVENTION

Problems to be Solved by the Invention

When a hydrocarbon-based fuel is not reformed to a predetermined composition, and an unreformed component is supplied to an SOFC, anode degradation and flow blockage due to carbon deposition may occur, particularly when a heavy hydrocarbon, such as kerosene, is used as the hydrocarbon-based fuel.

An SOFC system may be subjected to load following operation. In other words, an SOFC system may be subjected to an operation in which the amount of electric power generation of the SOFC system is varied according to the fluctuation of electric power demand. For example, when the amount of electric power generation is increased, the feed rate of the hydrocarbon-based fuel to the SOFC system may be increased. In such a case, carbon may be deposited. Therefore, it is desired to reliably reform the hydrocarbon-based fuel also in the load following operation. In the arts disclosed in Patent Literatures 2 and 3, improvement is still desired in terms of performing reliable reforming.

Also, during the load following operation, higher electric power generation efficiency is desired.

This is true not only for the SOFC system, but also for a fuel cell system having a high temperature fuel cell, such as a molten carbonate fuel cell (MCFC).

It is an object of the present invention to provide a method in which, when performing load following operation of a fuel cell system including a reformer having a reforming catalyst layer and a high temperature fuel cell, reforming can be more reliably performed to more reliably prevent flow blockage and anode degradation and a higher efficiency can be obtained.

Means for Solving the Problems

A first embodiment of the present invention provides a method of load following operation of a fuel cell system including a reformer for reforming a hydrocarbon-based fuel to produce a reformed gas containing hydrogen, said reformer having a reforming catalyst layer, and a high temperature fuel cell for generating electric power using the reformed gas, wherein at least two reforming methods selected from the group consisting of a steam reforming method, a partial oxidation reforming method, and an autothermal reforming method are determined as i-th reforming methods, where i is an integer of 1 or more and L or less, and L is 2 or 3, functions Fi=fi(P) and P=fi$^{-1}$(Fi) are obtained beforehand for every i, said functions Fi=fi(P) and P=fi$^{-1}$(Fi) being functions of an electrical output P of the fuel cell and a flow rate Fi of the hydrocarbon-based fuel required to be supplied to the reforming catalyst layer in order to output the electrical output P from the fuel cell when a reformed gas produced by the i-th reforming method is supplied to the fuel cell, where P=fi$^{-1}$(Fi) is an inverse function of Fi=fi(P), a function ηi=gi(P) is obtained beforehand for every i, said function ηi=gi(P) being a function of the electrical output P of the fuel cell and an electric power generation efficiency ηi of the fuel cell when a reformed gas produced by the i-th reforming method is supplied to the fuel cell to output the electrical output P from the fuel cell, Pi$_M$ represents a maximum electrical output of the fuel cell when a reformed gas produced by the i-th reforming method is supplied to the fuel cell, and Fi$_{min}$ represents a minimum value of a flow rate of the hydrocarbon-based fuel determined by the function Fi=fi(P) when P is within a range of 0 or more and Pi$_M$ or less, the method of load following operation of the fuel cell system including:

A$^1$) measuring a temperature T of the reforming catalyst layer;

B$^1$) for every i, calculating a reformable flow rate Fi$^R$ that is a flow rate of the hydrocarbon-based fuel capable of being reformed in the reforming catalyst layer at the temperature T by the i-th reforming method;

$C^1$) when the reformable flow rate $Fi^R$ calculated in step $B^1$ is smaller than the minimum value $Fi_{min}$ for every i, stopping electric power generation in the fuel cell;

$D^1$) when the reformable flow rate $Fi^R$ calculated in step $B^1$ is equal to or more than the minimum value $Fi_{min}$ for at least one i, for each of said at least one i, performing step $d^1 1$ if a fuel cell output demand value $P_D$ is equal to or less than the maximum electrical output $Pi_M$, and performing step $d^1 2$ if the fuel cell output demand value $P_D$ exceeds the maximum electrical output $Pi_M$, $d^1 1$) calculating a flow rate $fi(P_D)$ of the hydrocarbon-based fuel required to be supplied to the reforming catalyst layer, in which the i-th reforming method is performed, in order to output the fuel cell output demand value $P_D$ from the fuel cell, using the function $Fi=fi(P)$, and if $fi(P_D)$ is equal to or less than the reformable flow rate $Fi^R$ calculated in step $B^1$, then setting $Pi^*=P_D$, and setting $Fi^*=fi(P_D)$, and if $fi(P_D)$ exceeds the reformable flow rate $Fi^R$ calculated in step $B^1$, then setting $Pi^*=$(a value that is less than $P_D$ and the maximum among one or more P values calculated from a function $P=fi^{-1}(Fi^R)$), and setting $Fi^*=Fi^R$, $d^1 2$) calculating a flow rate $fi(Pi_M)$ of the hydrocarbon-based fuel supplied to the reforming catalyst layer required to be supplied to the reforming catalyst layer, in which the i-th reforming method is performed, in order to output the maximum electrical output $Pi_M$ from the fuel cell, using the function $Fi=fi(P)$, and if $fi(Pi_M)$ is equal to or less than the reformable flow rate $Fi^R$ calculated in step $B^1$, then setting $Pi^*=Pi_M$, and setting $Fi^*=fi(Pi_M)$, and if $fi(Pi_M)$ exceeds the reformable flow rate $Fi^R$ calculated in step $B^1$, then setting $Pi^*=\{$a value that is the maximum among one or more P values calculated from the function $P=fi^{-1}(Fi^R)\}$, and setting $Fi^*=Fi^R$;

$E^1$) when there exist two or more i for which the reformable flow rate $Fi^R$ calculated in step $B^1$ is equal to or more than the minimum value $Fi_{min}$, calculating $\eta i=gi(Pi^*)$ that is an electric power generation efficiency at the electrical output $Pi^*$, using the function $\eta i=gi(P)$, for each of said two or more i, and representing i that gives the largest $\eta i$ among thus calculated $\eta i$ as I, and setting an electrical output of the fuel cell to $PI^*$, setting a reforming method performed in the reformer to an I-th reforming method, and setting a flow rate of the hydrocarbon-based fuel supplied to the reforming catalyst layer to $FI^*$; and $F^1$) when there exists only one i for which the reformable flow rate $Fi^R$ calculated in step $B^1$ is equal to or more than the minimum value $Fi_{min}$, representing said only one i as I, and setting the electrical output of the fuel cell to $PI^*$, setting the reforming method performed in the reformer to an I-th reforming method, and setting the flow rate of the hydrocarbon-based fuel supplied to the reforming catalyst layer to $FI^*$.

Steps $A^1$ to $F^1$ may be repeatedly performed during the load following operation.

The hydrocarbon-based fuel may include a hydrocarbon-based fuel(s) with a carbon number of two or more.

In this case, the concentration of a compound(s) with a carbon number of two or more in the reformed gas is preferably 50 ppb or less on a mass basis.

A second embodiment of the present invention provides a method of load following operation of a fuel cell system including a reformer for reforming a hydrocarbon-based fuel to produce a reformed gas containing hydrogen, said reformer having a reforming catalyst layer, and a high temperature fuel cell for generating electric power using the reformed gas, wherein at least two reforming methods selected from the group consisting of a steam reforming method, a partial oxidation reforming method, and an autothermal reforming method are determined as i-th reforming methods, where i is an integer of 1 or more and L or less, and L is 2 or 3, functions $Fi=fi(P)$ and $P=fi^{-1}(Fi)$ are obtained beforehand for every i, said functions $Fi=fi(P)$ and $P=fi^{-1}(Fi)$ being functions of an electrical output P of the fuel cell and a flow rate Fi of the hydrocarbon-based fuel required to be supplied to the reforming catalyst layer in order to output the electrical output P from the fuel cell when a reformed gas produced by the i-th reforming method is supplied to the fuel cell, where $P=fi^{-1}(Fi)$ is an inverse function of $Fi=fi(P)$, a function $\eta i=gi(P)$ is obtained beforehand for every i, said function $\eta i=gi(P)$ being a function of the electrical output P of the fuel cell and an electric power generation efficiency $\eta i$ of the fuel cell when a reformed gas produced by the i-th reforming method is supplied to the fuel cell to output the electrical output P from the fuel cell, $Pi_M$ represents a maximum electrical output of the fuel cell when a reformed gas produced by the i-th reforming method is supplied to the fuel cell, $Fi_{min}$ represents a minimum value of a flow rate of the hydrocarbon-based fuel determined by the function $Fi=fi(P)$ when P is within a range of 0 or more and $Pi_M$ or less, and Ni different reforming catalyst layer temperatures $Ti_k$ and a flow rate $Gi_k$ of the hydrocarbon-based fuel that corresponds to each $Ti_k$ are set beforehand for every i, where k is an integer of 1 or more and Ni or less, and Ni is an integer of 2 or more, each $Gi_k$ is a flow rate of the hydrocarbon-based fuel capable of being reformed in the reforming catalyst layer at a corresponding reforming catalyst layer temperature $Ti_k$ by the i-th reforming method, each $Gi_k$ is larger than 0, and $Gi_k$ is the same value or increases with an increase of k, the method of load following operation of the fuel cell system including:

$A^2$) measuring a temperature T of the reforming catalyst layer;

$B^2$) for every i, adopting $Gi_k$ corresponding to a largest $Ti_k$ that is equal to or less than the temperature T as a reformable flow rate $Fi^R$ that is a flow rate of the hydrocarbon-based fuel capable of being reformed in the reforming catalyst layer at the temperature T by the i-th reforming method;

$C^2$) when the reformable flow rate $Fi^R$ determined in step $B^2$ is smaller than the minimum value $Fi_{min}$ for every i, stopping electric power generation in the fuel cell;

$D^2$) when the reformable flow rate $Fi^R$ determined in step $B^2$ is equal to or more than the minimum value $Fi_{min}$ for at least one i, for each of said at least one i, performing step $d^2 1$ if a fuel cell output demand value $P_D$ is equal to or less than the maximum electrical output $Pi_M$, and performing step $d^2 2$ if the fuel cell output demand value $P_D$ exceeds the maximum electrical output $Pi_M$, $d^2 1$) calculating a flow rate $fi(P_D)$ of the hydrocarbon-based fuel required to be supplied to the reforming catalyst layer, in which the i-th reforming method is performed, in order to output the fuel cell output demand value $P_D$ from the fuel cell, using the function $Fi=fi(P)$, and if $fi(P_D)$ is equal to or less than the reformable flow rate $Fi^R$ determined in step $B^2$, then setting $Pi^*=P_D$, and setting $Fi^*=fi(P_D)$, and if $fi(P_D)$ exceeds the reformable flow rate $Fi^R$ determined in step $B^2$, then setting $Pi^* = \{$a value that is less than $P_D$ and the maximum among one or more P values calculated from a function $P = fi^{-1}(Fi^R)\}$, and setting $Fi^* = Fi^R$, $d^22$) calculating a flow rate $fi(Pi_M)$ of the hydrocarbon-based fuel supplied to the reforming catalyst layer required to be supplied to the reforming catalyst layer, in which the i-th reforming method is performed, in order to output the maximum electrical output $Pi_M$ from the fuel cell, using the function $Fi = fi(P)$, and if $fi(Pi_M)$ is equal to or less than the reformable flow rate $Fi^R$ determined in step $B^2$, then setting $Pi^* = Pi_M$, and setting $Fi^* = fi(Pi_M)$, and if $fi(Pi_M)$ exceeds the reformable flow rate $Fi^R$ determined in step $B^2$, then setting $Pi^* = \{$a value that is the maximum among one or more P values calculated from the function $P = fi^{-1}(Fi^R)\}$, and setting $Fi^* = Fi^R$;

$E^2$) when there exist two or more i for which the reformable flow rate $Fi^R$ determined in step $B^2$ is equal to or more than the minimum value $Fi_{min}$, calculating $\eta i = gi(Pi^*)$ that is an electric power generation efficiency at the electrical output $Pi^*$, using the function $\eta i = gi(P)$, for each of said two or more i, and representing i that gives the largest $\eta i$ among thus calculated $\eta i$ as I, and when $PI^*$ is zero, stopping the electric power generation in the fuel cell, and when $PI^*$ exceeds zero, setting an electrical output of the fuel cell to $PI^*$, setting a reforming method performed in the reformer to an I-th reforming method, and setting a flow rate of the hydrocarbon-based fuel supplied to the reforming catalyst layer to $FI^*$; and $F^2$) when there exists only one i for which the reformable flow rate $Fi^R$ determined in step $B^2$ is equal to or more than the minimum value $Fi_{min}$, representing said only one i as I, and when $PI^*$ is zero, stopping the electric power generation in the fuel cell, and when $PI^*$ exceeds zero, setting the electrical output of the fuel cell to $PI^*$, setting the reforming method performed in the reformer to an I-th reforming method, and setting the flow rate of the hydrocarbon-based fuel supplied to the reforming catalyst layer to $FI^*$.

Steps $A^2$ to $F^2$ may be repeatedly performed during the load following operation.

The hydrocarbon-based fuel may include a hydrocarbon-based fuel(s) with a carbon number of two or more.

In this case, the concentration of a compound(s) with a carbon number of two or more in the reformed gas is preferably 50 ppb or less on a mass basis.

A third embodiment of the present invention provides a method of load following operation of a fuel cell system including a reformer for reforming a hydrocarbon-based fuel to produce a reformed gas containing hydrogen, said reformer having a reforming catalyst layer, and a high temperature fuel cell for generating electric power using the reformed gas, wherein at least two reforming methods selected from the group consisting of a steam reforming method, a partial oxidation reforming method, and an autothermal reforming method are determined as i-th reforming methods, where i is an integer of 1 or more and L or less, and L is 2 or 3, for every i, Mi different fuel cell electrical outputs $Pi_j$ and a flow rate $Fi_j$ of the hydrocarbon-based fuel that corresponds to each $Pi_j$ when a reformed gas produced by the i-th reforming method is supplied to the fuel cell to generate electric power are set beforehand, and an electric power generation efficiency $\eta i_j$ at each $Pi_j$ is obtained beforehand, where j is an integer of 1 or more and Mi or less, and Mi is an integer of 2 or more, each $Fi_j$ is a flow rate of the hydrocarbon-based fuel required to be supplied to the reforming catalyst layer, in which the i-th reforming method is performed, in order to output a corresponding electrical output $Pi_j$ from the fuel cell, each $Pi_j$ is 0 or more, $Pi_j$ increases with an increase of j, and each $Fi_j$ is larger than 0, for every i, $Pi_1$ that is $Pi_j$ when j is 1 is 0, and $Pi_{Mi}$ that is $Pi_j$ when j is Mi is a maximum electrical output of the fuel cell when the i-th reforming method is performed, and for each i, a minimum value among $Fi_j$ for all j is represented as $Fi_{min}$, the method of load following operation of the fuel cell system including:

$A^3$) measuring a temperature T of the reforming catalyst layer;

$B^3$) for every i, calculating a reformable flow rate $Fi^R$ that is a flow rate of the hydrocarbon-based fuel capable of being reformed in the reforming catalyst layer at the temperature T by the i-th reforming method;

$C^3$) when the reformable flow rate $Fi^R$ is smaller than the minimum value $Fi_{min}$ for every i, stopping electric power generation in the fuel cell;

$D^3$) when the reformable flow rate $Fi^R$ is equal to or more than the minimum value $Fi_{min}$ for at least one i, for each of said at least one i, performing step $d^31$ if a fuel cell output demand value $P_D$ is equal to or less than the maximum electrical output $Pi_{Mi}$, and performing step $d^32$ if the fuel cell output demand value $P_D$ exceeds the maximum electrical output $Pi_{Mi}$, $d^31$) if there exists, among $Pi_j$ for all j, $Pi_j$ that is equal to the fuel cell output demand value $P_D$, then setting $Fi_{DS} = (Fi_j$ that corresponds to $Pi_j$ that is equal to $P_D$), and if there does not exist, among $Pi_j$ for all j, $Pi_j$ that is equal to the fuel cell output demand value $P_D$, then setting $Fi_{DS} = ($not smaller one among a $Fi_j$ corresponding to the smallest $Pi_j$ that exceeds $P_D$ and a $Fi_j$ corresponding to the largest $Pi_j$ that is less than $P_D$), and when $Fi_{DS}$ is equal to or less than the reformable flow rate $Fi^R$, setting $Pi^* = P_D$ and $Fi^* = Fi_{DS}$, and when $Fi_{DS}$ exceeds the reformable flow rate $Fi^R$, if there exists $Pi_j$ corresponding to $Fi_j$ that is equal to or less than $Fi^R$ within a range of less than the fuel cell output demand value $P_D$, then setting $Pi^* = ($the maximum value among the $Pi_j$ corresponding to $Fi_j$ that is equal to or less than $Fi^R$ and existing within the range of less than $P_D$) and $Fi^* = (Fi_j$ that corresponds to the maximum value among the $Pi_j$ corresponding to $Fi_j$ that is equal to or less than $Fi^R$ and existing within the range of less than $P_D$), and if there does not exist $Pi_j$ corresponding to $Fi_j$ that is equal to or less than $Fi^R$ within the range of less than the fuel cell output demand value $P_D$, then setting $Pi^* = 0$ and $Fi^* = Fi^R$, $d^32$) when $Fi_{Mi}$, that is $Fi_j$ corresponding to the maximum electrical output $Pi_{Mi}$, is equal to or less than the reformable flow rate $Fi^R$, setting $Pi^* = Pi_{Mi}$ and $Fi^* = Fi_{Mi}$, and when $Fi_{Mi}$, that is $Fi_j$ corresponding to the maximum electrical output $Pi_{Mi}$, exceeds the reformable flow rate $Fi^R$, setting $Pi^* = ($the maximum value among $Pi_j$ corresponding to $Fi_j$ that is equal to or less than $Fi^R$) and $Fi^* = (Fi_j$ that corresponds to the maximum value among $Pi_j$ corresponding to $Fi_j$ that is equal to or less than $Fi^R$);

$E^3$) when there exist two or more i for which the reformable flow rate $Fi^R$ is equal to or more than the minimum value $Fi_{min}$, obtaining $\eta i$ that corresponds to $Pi^*$ for each of said two or more i, and representing i that gives the largest $\eta i$ among thus obtained $\eta i$ as I, and when PI* is zero, stopping the electric power generation in the fuel cell, and when PI* exceeds zero, setting an electrical output of the fuel cell to PI*, setting a reforming method performed in the reformer to an I-th reforming method, and setting a flow rate of the hydrocarbon-based fuel supplied to the reforming catalyst layer to FI*; and $F^3$) when there exists only one i for which the reformable flow rate $Fi^R$ is equal to or more than the minimum value $Fi_{min}$, representing said only one i as I, and when PI* is zero, stopping the electric power generation in the fuel cell, and when PI* exceeds zero, setting the electrical output of the fuel cell to PI*, setting the reforming method performed in the reformer to an I-th reforming method, and setting the flow rate of the hydrocarbon-based fuel supplied to the reforming catalyst layer to FI*.

Steps $A^3$ to $F^3$ may be repeatedly performed during the load following operation.

The hydrocarbon-based fuel may include a hydrocarbon-based fuel(s) with a carbon number of two or more.

In this case, the concentration of a compound(s) with a carbon number of two or more in the reformed gas is preferably 50 ppb or less on a mass basis.

A fourth embodiment of the present invention provides a method of load following operation of a fuel cell system including a reformer for reforming a hydrocarbon-based fuel to produce a reformed gas containing hydrogen, said reformer having a reforming catalyst layer, and a high temperature fuel cell for generating electric power using the reformed gas, wherein at least two reforming methods selected from the group consisting of a steam reforming method, a partial oxidation reforming method, and an autothermal reforming method are determined as i-th reforming methods, where i is an integer of 1 or more and L or less, and L is 2 or 3, for every i, Mi different fuel cell electrical outputs $Pi_j$ and a flow rate $Fi_j$ of the hydrocarbon-based fuel that corresponds to each $Pi_j$ when a reformed gas produced by the i-th reforming method is supplied to the fuel cell to generate electric power are set beforehand, and an electric power generation efficiency $\eta i_j$ at each $Pi_j$ is obtained beforehand, where j is an integer of 1 or more and Mi or less, and Mi is an integer of 2 or more, each $Fi_j$ is a flow rate of the hydrocarbon-based fuel required to be supplied to the reforming catalyst layer, in which the i-th reforming method is performed, in order to output a corresponding electrical output $Pi_j$ from the fuel cell, each $Pi_j$ is 0 or more, $Pi_j$ increases with an increase of j, and each $Fi_j$ is larger than 0, for every i, $Pi_1$ that is $Pi_j$ when j is 1 is 0, and $Pi_{Mi}$ that is $Pi_j$ when j is Mi is a maximum electrical output of the fuel cell when the i-th reforming method is performed, for each i, a minimum value among $Fi_j$ for all j is represented as $Fi_{min}$, and Ni different reforming catalyst layer temperatures $Ti_k$ and a flow rate $Gi_k$ of the hydrocarbon-based fuel that corresponds to each $Ti_k$ are set beforehand for every i, where k is an integer of 1 or more and Ni or less, and Ni is an integer of 2 or more, each $Gi_k$ is a flow rate of the hydrocarbon-based fuel capable of being reformed in the reforming catalyst layer at a corresponding reforming catalyst layer temperature $Ti_k$ by the i-th reforming method, each $Gi_k$ is larger than 0, and $Gi_k$ is the same value or increases with an increase of k, the method of load following operation of the fuel cell system including:

$A^4$) measuring a temperature T of the reforming catalyst layer;

$B^4$) for every i, adopting $Gi_k$ corresponding to a largest $Ti_k$ that is equal to or less than the temperature T as a reformable flow rate $Fi^R$ that is a flow rate of the hydrocarbon-based fuel capable of being reformed in the reforming catalyst layer at the temperature T by the i-th reforming method;

$C^4$) when the reformable flow rate $Fi^R$ is smaller than the minimum value $Fi_{min}$ for every i, stopping electric power generation in the fuel cell;

$D^4$) when the reformable flow rate $Fi^R$ is equal to or more than the minimum value $Fi_{min}$ for at least one i, for each of said at least one i, performing step $d^41$ if a fuel cell output demand value $P_D$ is equal to or less than the maximum electrical output $PI_{Mi}$, and performing step $d^42$ if the fuel cell output demand value $P_D$ exceeds the maximum electrical output $Pi_{Mi}$, $d^41$) if there exists, among $Pi_j$ for all j, $Pi_j$ that is equal to the fuel cell output demand value $P_D$, then setting $Fi_{DS}$=($Fi_j$ that corresponds to $Pi_j$ that is equal to $P_D$), and if there does not exist, among $Pi_j$ for all j, $Pi_j$ that is equal to the fuel cell output demand value $P_D$, then setting $Fi_{DS}$=(not smaller one among a $Fi_j$ corresponding to the smallest $Pi_j$ that exceeds $P_D$ and a $Fi_j$ corresponding to the largest $Pi_j$ that is less than $P_D$), and when $Fi_{DS}$ is equal to or less than the reformable flow rate $Fi^R$, setting Pi*=$P_D$ and Fi*=$Fi_{DS}$, and when $FI_{DS}$ exceeds the reformable flow rate $Fi^R$, if there exists $Pi_j$ corresponding to $Fi_j$ that is equal to or less than $Fi^R$ within a range of less than the fuel cell output demand value $P_D$, then setting Pi*=(the maximum value among the $Pi_j$ corresponding to $Fi_j$ that is equal to or less than $Fi^R$ and existing within the range of less than $P_D$) and Fi*=($Fi_j$ that corresponds to the maximum value among the $Pi_j$ corresponding to $Fi_j$ that is equal to or less than $Fi^R$ and existing within the range of less than $P_D$), and if there does not exist $Pi_j$ corresponding to $Fi_j$ that is equal to or less than $Fi^R$ within the range of less than the fuel cell output demand value $P_D$, then setting Pi*=0 and Fi*=$Fi^R$, $d^42$) when $Fi_{Mi}$, that is $Fi_j$ corresponding to the maximum electrical output $Pi_{Mi}$, is equal to or less than the reformable flow rate $Fi^R$, setting Pi*=$Pi_{Mi}$ and Fi*=$Fi_{Mi}$, and when $Fi_{Mi}$, that is $Fi_j$ corresponding to the maximum electrical output $Pi_{Mi}$, exceeds the reformable flow rate $Fi^R$, setting Pi*=(the maximum value among $Pi_j$ corresponding to $Fi_j$ that is equal to or less than $Fi^R$) and Fi*=($Fi_j$ that corresponds to the maximum value among $Pi_j$ corresponding to $Fi_j$ that is equal to or less than $Fi^R$);

$E^4$) when there exist two or more i for which the reformable flow rate $Fi^R$ is equal to or more than the minimum value $Fi_{min}$, obtaining $\eta i$ that corresponds to Pi* for each of said two or more i, and representing i that gives the largest $\eta i$ among thus obtained $\eta i$ as I, and when PI* is zero, stopping the electric power generation in the fuel cell, and when PI* exceeds zero, setting an electrical output of the fuel cell to PI*, setting a reforming method performed in the reformer to an I-th reforming method, and setting a flow rate of the hydrocarbon-based fuel supplied to the reforming catalyst layer to FI*; and $F^4$) when there exists only one i for which the reformable flow rate $Fi^R$ is equal to or more than the minimum value $Fi_{min}$, representing said only one i as I, and when PI* is zero, stopping the electric power generation in the fuel cell, and when PI* exceeds zero, setting the electrical output of the fuel cell to PI*, setting the reforming method performed in the reformer to an I-th reforming method, and setting the flow rate of the hydrocarbon-based fuel supplied to the reforming catalyst layer to FI*.

Steps $A^4$ to $F^4$ may be repeatedly performed during the load following operation.

The hydrocarbon-based fuel may include a hydrocarbon-based fuel(s) with a carbon number of two or more.

In this case, the concentration of a compound(s) with a carbon number of two or more in the reformed gas is preferably 50 ppb or less on a mass basis.

Advantages of the Invention

The present invention provides a method in which, when performing load following operation of a fuel cell system including a reformer having a reforming catalyst layer and a high temperature fuel cell, reforming can be more reliably performed to more reliably prevent flow blockage and anode degradation and higher electric power generation efficiency can be obtained.

BRIEF DESCRIPTION OF THE DRAWINGS

FIG. 1-2 is a schematic graph showing a correlation between the electrical output P of the fuel cell, and the flow rate Fi of the hydrocarbon-based fuel required to be supplied to the reforming catalyst layer in order to output the electrical output P from the fuel cell when the reformed gas produced by the i-th reforming method is supplied to the fuel cell, for explaining the first embodiment of the method of the present invention.

FIG. 1-3 is a schematic graph showing a correlation between the electrical output P of the fuel cell, and the flow rate Fi of the hydrocarbon-based fuel required to be supplied to the reforming catalyst layer in order to output the electrical output P from the fuel cell when the reformed gas produced by the i-th reforming method is supplied to the fuel cell, for explaining the first embodiment of the method of the present invention.

FIG. 1-4 is a schematic graph showing a correlation between the electrical output P of the fuel cell, and the flow rate Fi of the hydrocarbon-based fuel required to be supplied to the reforming catalyst layer in order to output the electrical output P from the fuel cell when the reformed gas produced by the i-th reforming method is supplied to the fuel cell, for explaining the first embodiment of the method of the present invention.

FIG. 1-5 is a schematic graph showing a correlation between the electrical output P of the fuel cell, and the flow rate Fi of the hydrocarbon-based fuel required to be supplied to the reforming catalyst layer in order to output the electrical output P from the fuel cell when the reformed gas produced by the i-th reforming method is supplied to the fuel cell, for explaining the first embodiment of the method of the present invention.

FIG. 1-6 is a schematic graph showing a correlation between the electrical output P of the fuel cell, and the flow rate Fi of the hydrocarbon-based fuel required to be supplied to the reforming catalyst layer in order to output the electrical output P from the fuel cell when the reformed gas produced by the i-th reforming method is supplied to the fuel cell, for explaining the first embodiment of the method of the present invention.

FIG. 1-7 is a schematic graph showing a correlation between the electrical output P of the fuel cell, and the electric power generation efficiency $\eta i$ of the fuel cell when the reformed gas produced by the i-th reforming method is supplied to the fuel cell to output the electrical output P from the fuel cell, for explaining the first embodiment of the method of the present invention.

FIG. 2-1 is a flow chart for explaining the second embodiment of the method of the present invention.

FIG. 2-2 is a schematic graph showing a correlation between the electrical output P of the fuel cell, and the flow rate Fi of the hydrocarbon-based fuel required to be supplied to the reforming catalyst layer in order to output the electrical output P from the fuel cell when the reformed gas produced by the i-th reforming method is supplied to the fuel cell, for explaining the second embodiment of the method of the present invention.

FIG. 2-3 is a schematic graph showing a correlation between the electrical output P of the fuel cell, and the flow rate Fi of the hydrocarbon-based fuel required to be supplied to the reforming catalyst layer in order to output the electrical output P from the fuel cell when the reformed gas produced by the i-th reforming method is supplied to the fuel cell, for explaining the second embodiment of the method of the present invention.

FIG. 2-4 is a schematic graph showing a correlation between the electrical output P of the fuel cell, and the flow rate Fi of the hydrocarbon-based fuel required to be supplied to the reforming catalyst layer in order to output the electrical output P from the fuel cell when the reformed gas produced by the i-th reforming method is supplied to the fuel cell, for explaining the second embodiment of the method of the present invention.

FIG. 2-5 is a schematic graph showing a correlation between the electrical output P of the fuel cell, and the flow rate Fi of the hydrocarbon-based fuel required to be supplied to the reforming catalyst layer in order to output the electrical output P from the fuel cell when the reformed gas produced by the i-th reforming method is supplied to the fuel cell, for explaining the second embodiment of the method of the present invention.

FIG. 2-6 is a schematic graph showing a correlation between the electrical output P of the fuel cell, and the flow rate Fi of the hydrocarbon-based fuel required to be supplied to the reforming catalyst layer in order to output the electrical output P from the fuel cell when the reformed gas produced by the i-th reforming method is supplied to the fuel cell, for explaining the Second embodiment of the method of the present invention.

FIG. 2-7 is a schematic graph showing a correlation between the electrical output P of the fuel cell, and the electric power generation efficiency $\eta i$ of the fuel cell when the reformed gas produced by the i-th reforming method is supplied to the fuel cell to output the electrical output P from the fuel cell, for explaining the second embodiment of the method of the present invention.

FIG. 3 is a flow chart for explaining the third embodiment of the method of the present invention.

FIG. 4 is a flow chart for explaining the fourth embodiment of the method of the present invention.

FIG. 5 is a schematic diagram showing the outline of an example of an indirect internal reforming SOFC system in which the present invention can be carried out.

EMBODIMENTS FOR CARRYING OUT THE INVENTION

A fuel cell system used in the present invention includes a reformer for reforming a hydrocarbon-based fuel to produce a hydrogen-containing gas, and a high temperature fuel cell. The reformer includes a reforming catalyst layer. The hydrogen-containing gas obtained from the reformer is referred to as reformed gas. The reforming catalyst layer is composed of a reforming catalyst that can promote a reforming reaction. The high temperature fuel cell generates electric power, using the hydrogen-containing gas (reformed gas) obtained from the reformer.

The embodiments of the present invention will be described below, using drawings, but the present invention is not limited thereto.

[Indirect Internal Reforming SOFC]

Figure 1:
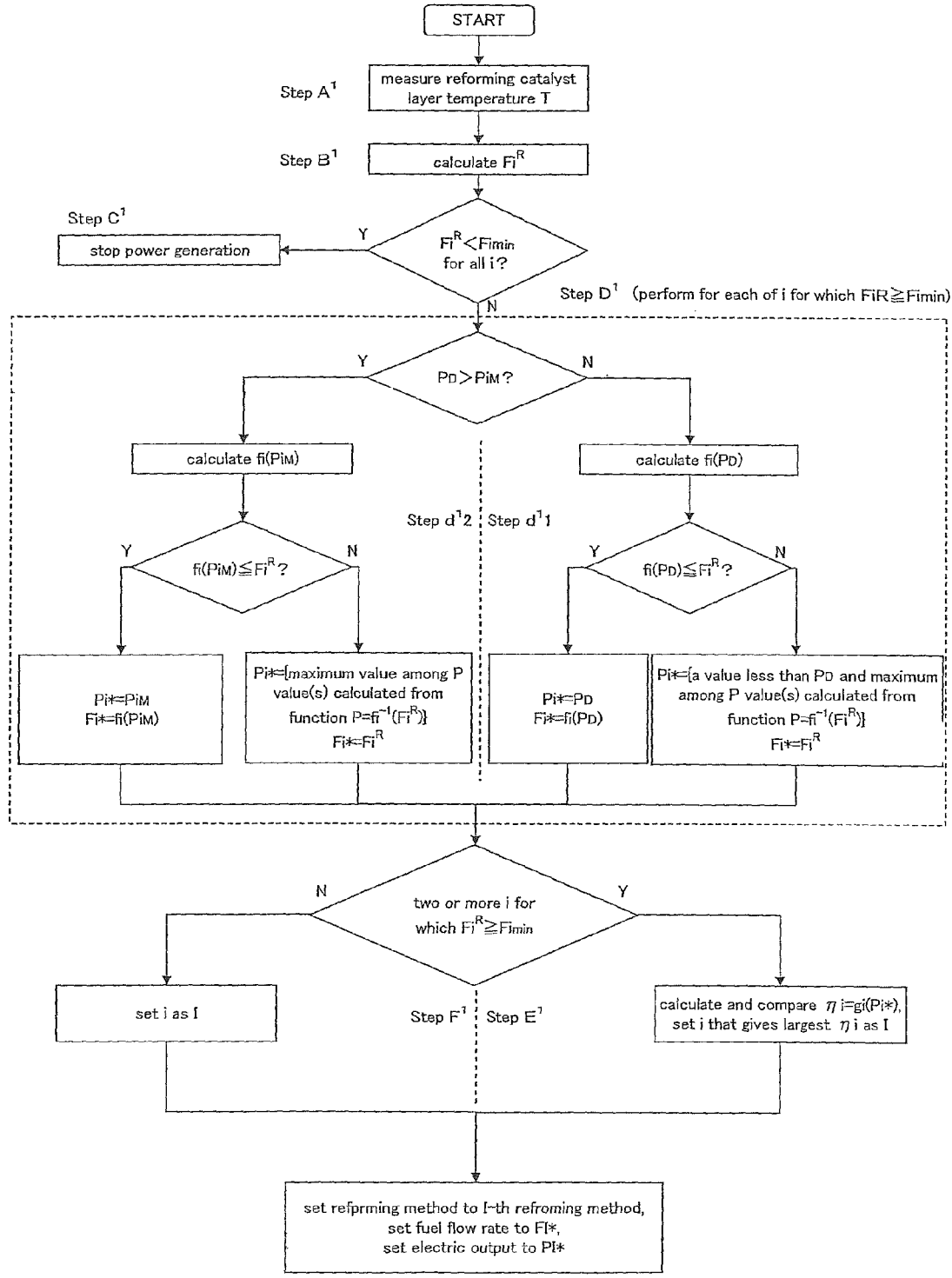
FIG. 1-1 is a flow chart for explaining the first embodiment of the method of the present invention.
Figures 1, 2:
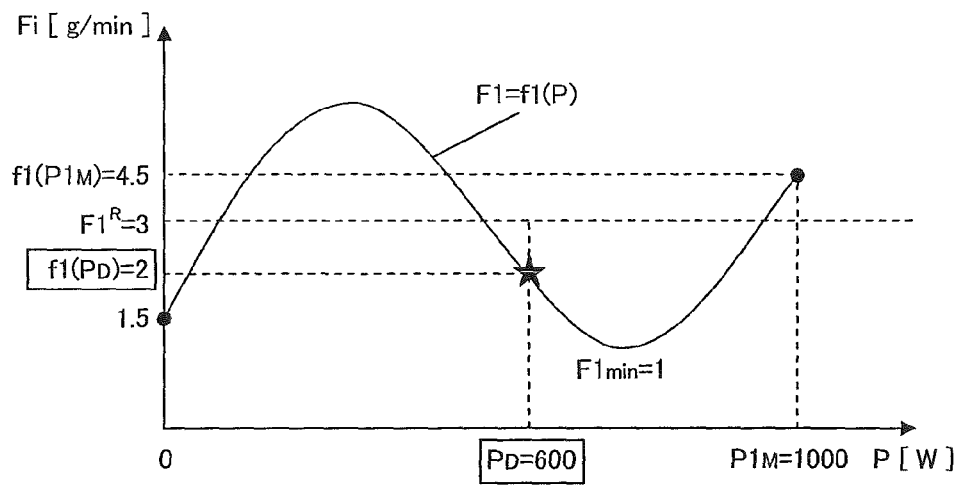
Figures 1, 2, 3:
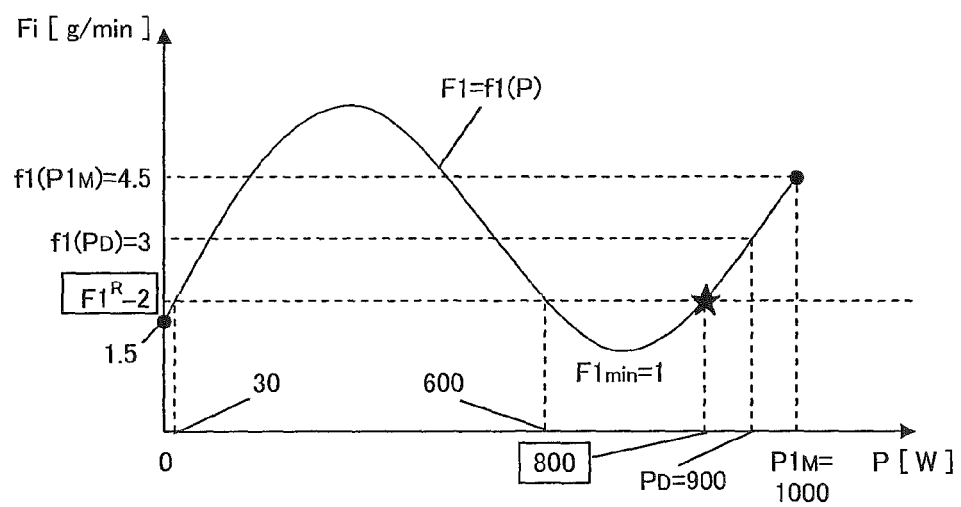
Figures 1, 2, 3, 4:
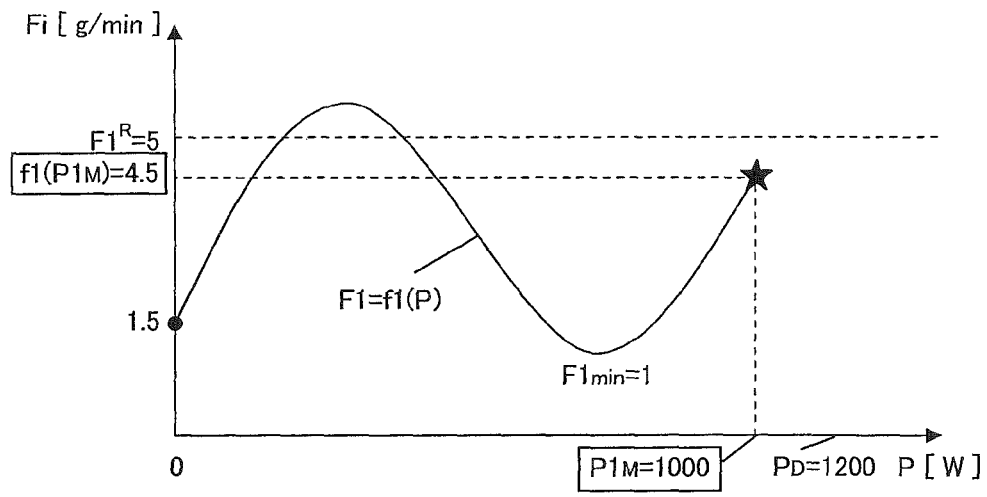
Figures 1, 2, 3, 4, 5:
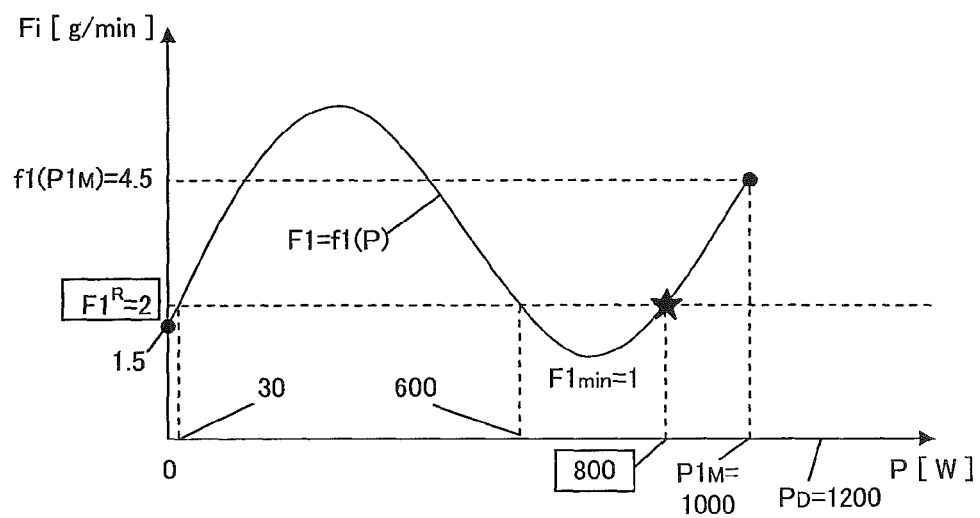
Figures 1, 2, 3, 4, 5, 6:
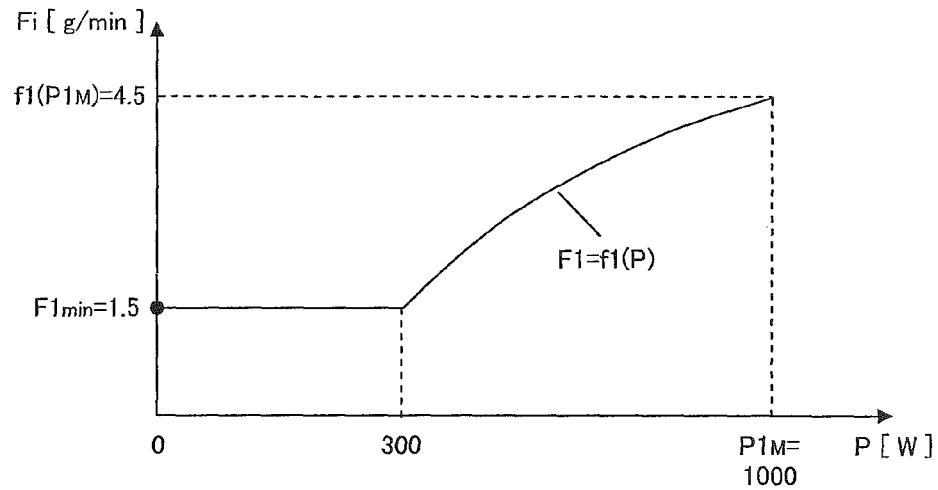
Figures 1, 2, 3, 4, 5, 6, 7:
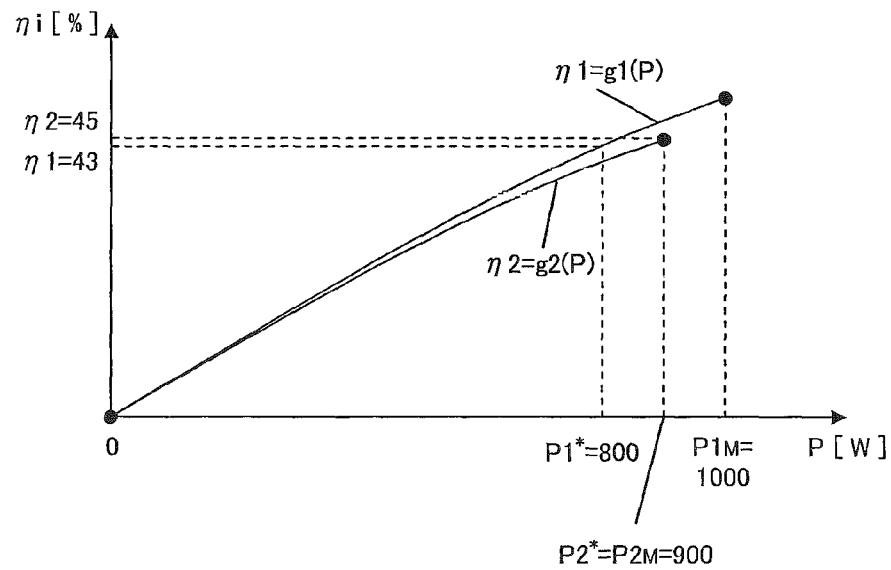
Figures 1, 2:
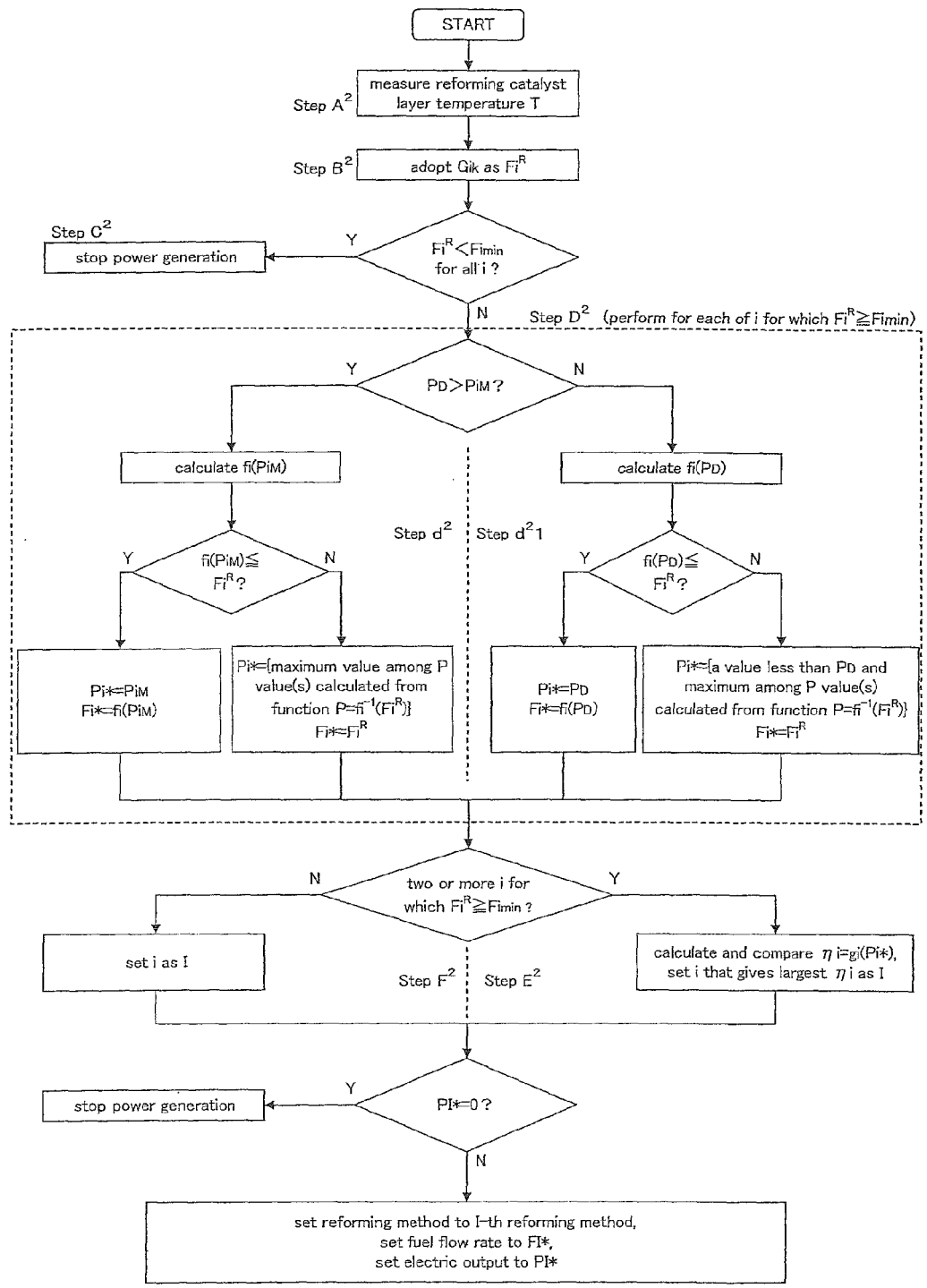
Figure 2:
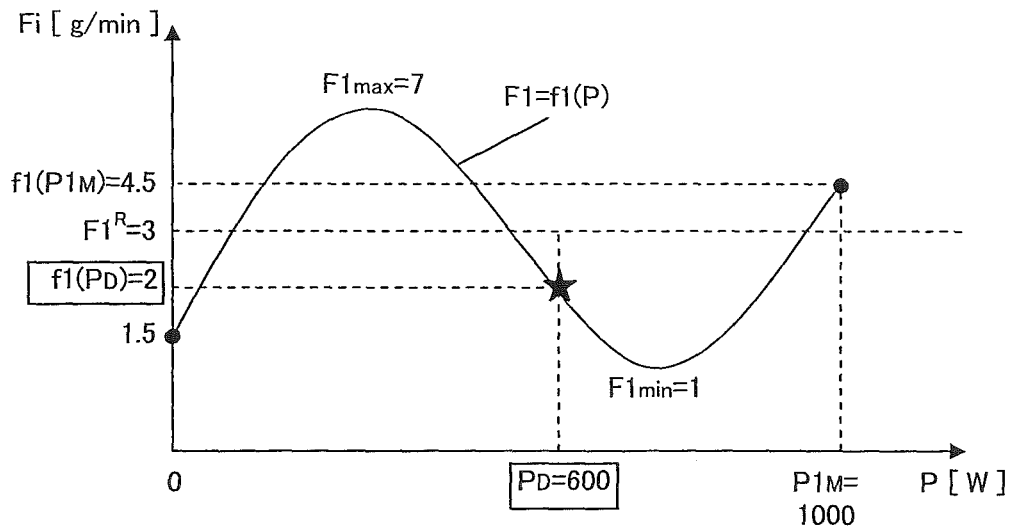
Figures 2, 3:
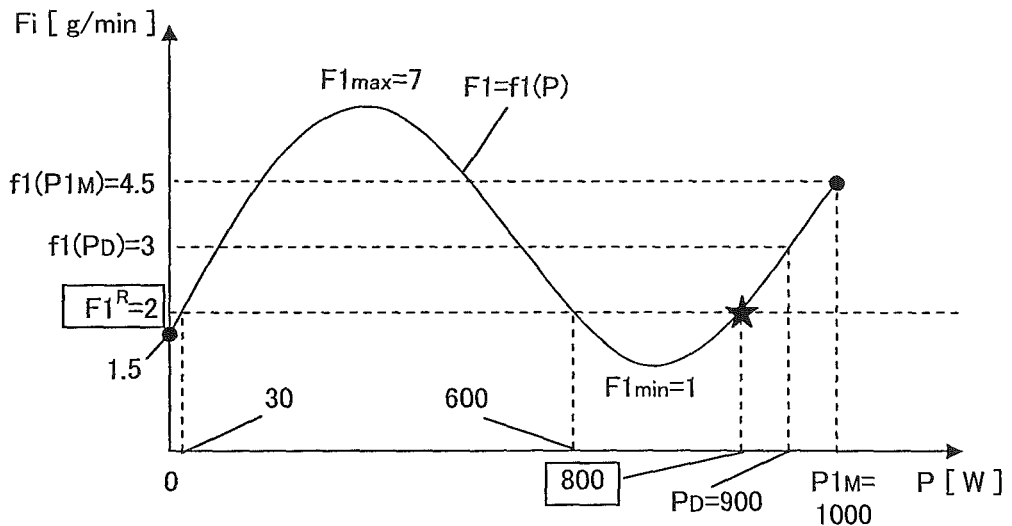
Figures 2, 3, 4:
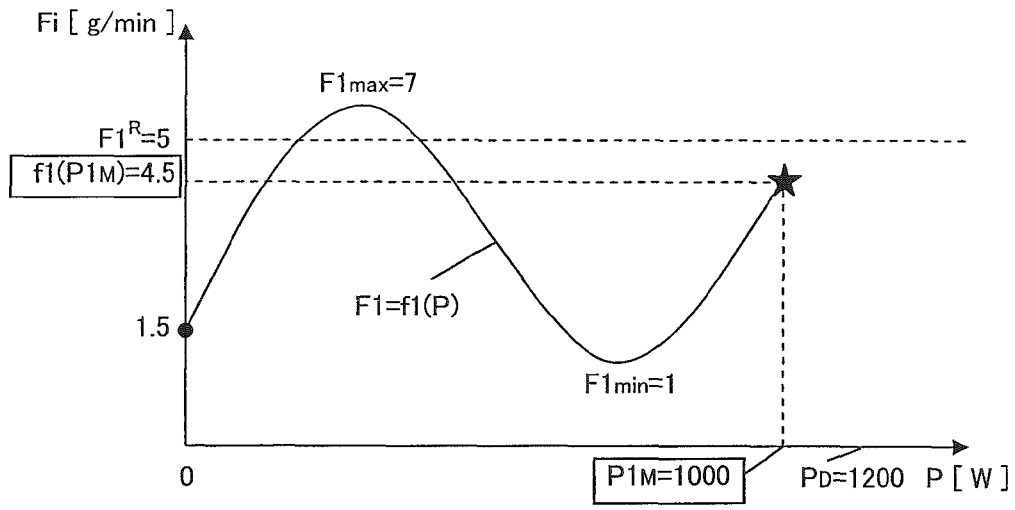
Figures 2, 3, 4, 5:
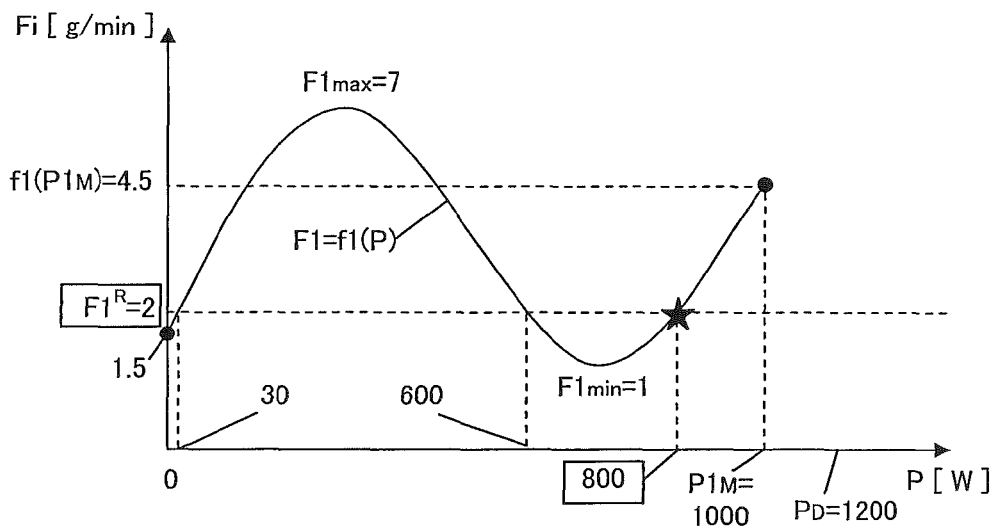
Figures 2, 3, 4, 5, 6:
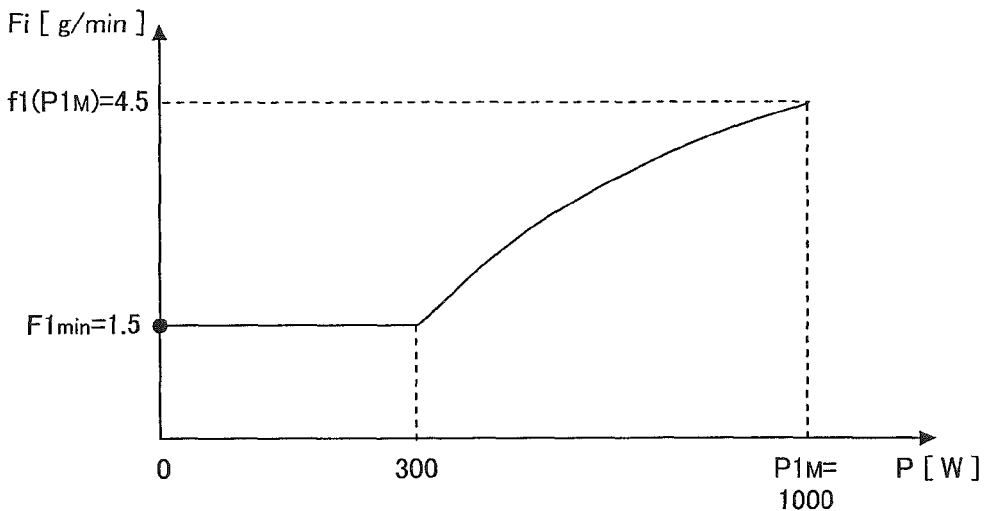
Figures 2, 3, 4, 5, 6, 7:
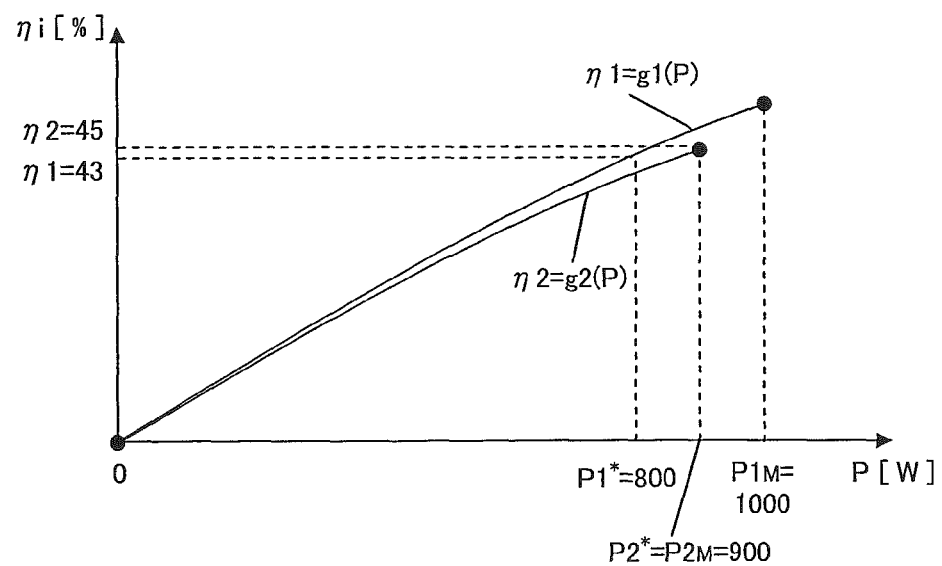
Figure 3:
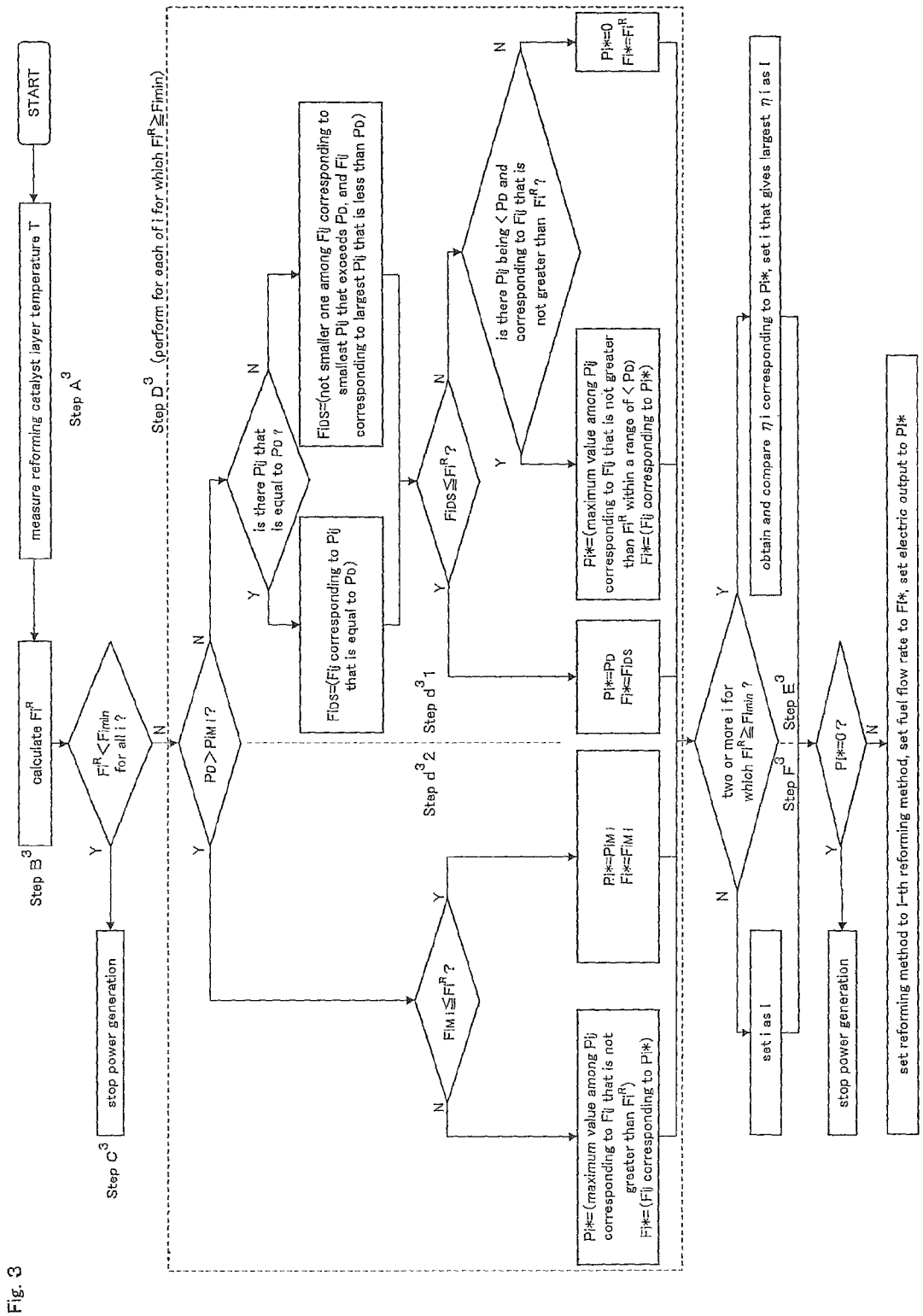
Figure 4:
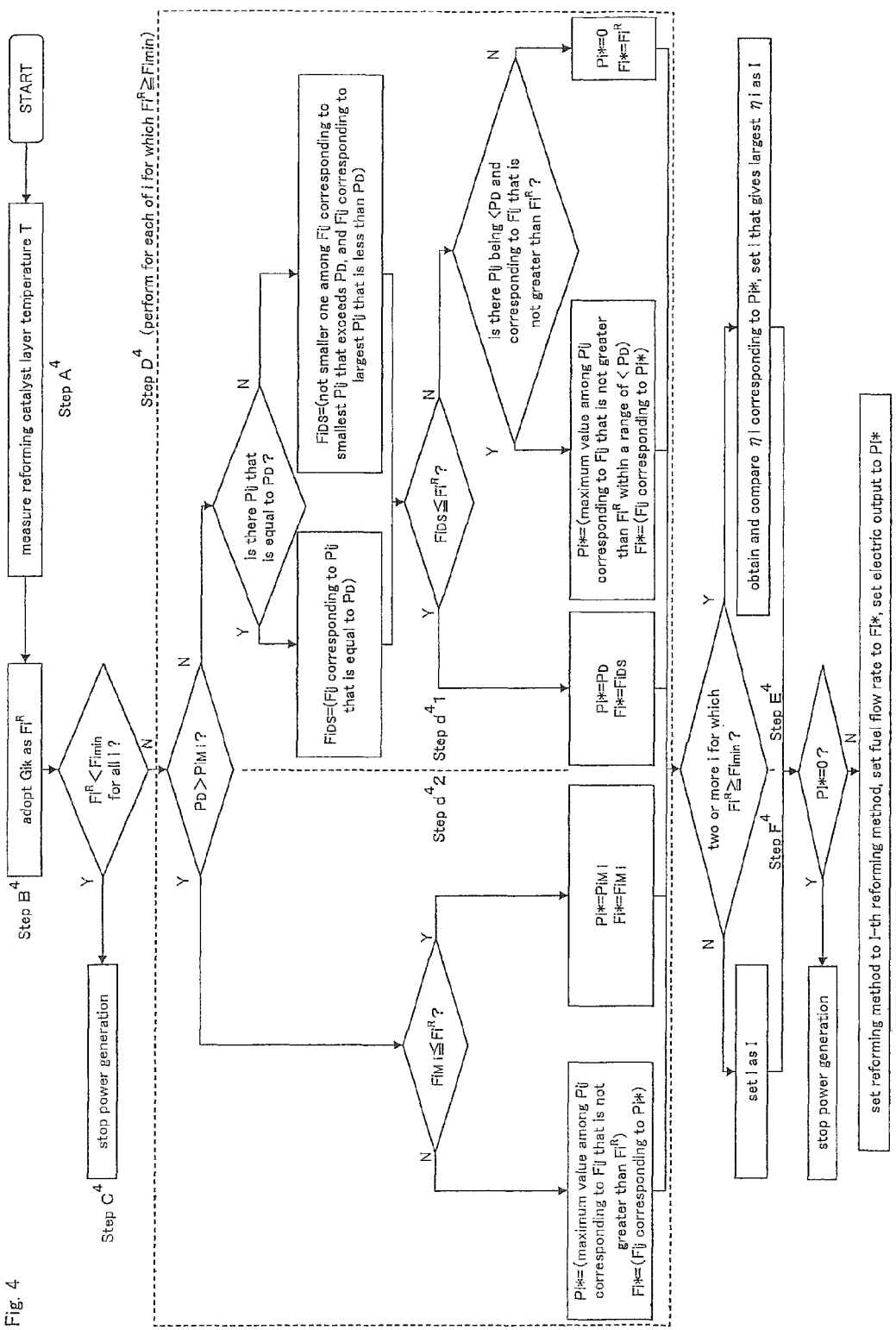

One embodiment of an indirect internal reforming SOFC in which the present invention can be carried out is schematically shown in FIG. 5. Here, an indirect internal reforming SOFC system will be described, but the present invention can also be applied to an external reforming SOFC system or an MCFC system.

An indirect internal reforming SOFC includes a reformer 3 for reforming a hydrocarbon-based fuel to produce a reformed gas (hydrogen-containing gas). The reformer includes a reforming catalyst layer 4.

The indirect internal reforming SOFC includes an SOFC 6 for generating electric power using the above reformed gas, and also includes a combustion region 5 for combusting an anode off-gas discharged from the SOFC (particularly the anode of the SOFC).

The indirect internal reforming SOFC includes an enclosure 8 for housing the reformer, the solid oxide fuel cell, and the combustion region.

The indirect internal reforming SOFC refers to the enclosure (module container) 8 and equipment included in the interior of the enclosure.

In the indirect internal reforming SOFC in the embodiment shown in FIG. 5, an igniter 7 that is an ignition means for igniting the anode off-gas is provided, and also, the reformer is equipped with an electrical heater 9.

Each supply gas is supplied to the reformer or the SOFC, after being appropriately preheated as required.

A water vaporizer 1 equipped with an electrical heater 2 is connected to the indirect internal reforming SOFC, and piping for supplying the hydrocarbon-based fuel to the reformer is connected to the midstream of connection piping for the water vaporizer 1. The water vaporizer 1 generates steam by heating with the electrical heater 2. The steam may be supplied to the reforming catalyst layer after being appropriately superheated in the water vaporizer or downstream thereof.

Also, air (for a partial oxidation reforming reaction) may be supplied to the reforming catalyst layer, and here, air can be supplied to the reforming catalyst layer after being preheated in the water vaporizer. Steam or a mixed gas of air and steam can be obtained from the water vaporizer.

The steam or the mixed gas of air and steam is mixed with the hydrocarbon-based fuel and supplied to the reformer 3, particularly to the reforming catalyst layer 4 of the reformer 3. When a liquid fuel, such as kerosene, is used as the hydrocarbon-based fuel, the hydrocarbon-based fuel may be supplied to the reforming catalyst layer after being appropriately vaporized.

The reformed gas obtained from the reformer is supplied to the SOFC 6, particularly to the anode of the SOFC 6. Although not shown, air is appropriately preheated and supplied to the cathode of the SOFC.

Combustible components in the anode off-gas (gas discharged from the anode) are combusted by oxygen contained in a cathode off-gas (gas discharged from the cathode) at the SOFC outlet. In order to do this, ignition using the igniter 7 is possible. The outlets of both the anode and the cathode are open in the module container 8. The combustion gas is appropriately discharged from the module container.

The reformer and the SOFC are housed in one module container and modularized. The reformer is disposed at a position where it can receive heat from the SOFC. For example, when the reformer is located at a position where it receives thermal radiation from the SOFC, the reformer is heated by thermal radiation from the SOFC during electric power generation.

In the indirect internal reforming SOFC, the reformer is preferably disposed at a position where radiation heat can be directly transferred from the SOFC to the outer surface of the reformer. Therefore, it is preferred that there is substantially no obstacle between the reformer and the SOFC, that is, it is preferred to make the region between the reformer and the SOFC be an empty space. Also, the distance between the reformer and the SOFC is preferably as short as possible.

The reformer 3 is heated by the combustion heat of the anode off-gas generated in the combustion region 5. Also, when the temperature of the SOFC is higher than that of the reformer, the reformer is also heated by radiation heat from the SOFC.

Further, the reformer may be heated by heat generation by reforming. When the reforming is partial oxidation reforming, or when the reforming is autothermal reforming and heat generation by a partial oxidation reforming reaction is larger than endothermic heat by a steam reforming reaction, heat is generated with the reforming.

[Load Following Operation Method]

According to the present invention, it is possible to select a suitable flow rate of the hydrocarbon-based fuel (flow rate supplied to the reformer) and a suitable electrical output of the fuel cell in order to reliably perform reforming, and to select a suitable reforming method in order to obtain higher electric power generation efficiency. Procedures for doing so will be described in detail below.

[i-th Reforming Methods]

In the present invention, at least two reforming methods selected from the group consisting of a steam reforming method (SR), a partial oxidation reforming method (PDX), and an autothermal reforming method (ATR) are determined as i-th reforming methods. Here, i is an integer of 1 or more and L or less, and L is 2 or 3. When two reforming methods are selected (When L=2), a first reforming method and a second reforming method are determined as the i-th reforming methods. When three reforming methods are selected (When L=3), first, second, and third reforming methods are determined as the i-th reforming methods. When i=2, for example, SR is selected as the first reforming method, and ATR is selected as the second reforming method. It is possible that ATR is selected as the first reforming method, and SR is selected as the second reforming method. When i=3, for example, SR is selected as the first reforming method, ATR is selected as the second reforming method, and PDX is selected as the third reforming method. Examples of the i-th reforming methods are shown in Table 1.

TABLE 1

Examples of i-th Reforming Methods

| | L (number of reforming method types) | | | |
|---|---|---|---|---|
| | 2 | 2 | 2 | 3 |
| First reforming method (i = 1) | SR | ATR | SR | SR |
| Second reforming method (i = 2) | ATR | POX | POX | ATR |
| Third reforming method (i = 3) | | | | POX |

First Embodiment

The first embodiment of the method of the present invention will be described below.

[Functions $Fi=fi(P)$ and $P=fi^{-1}(Fi)$]

In this embodiment, functions $Fi=fi(P)$ and $P=fi^{-1}(Fi)$ are beforehand obtained for all i. Functions $Fi=fi(P)$ and $P=fi^{-1}(Fi)$ are functions of an electrical output P of the fuel cell, and a flow rate Fi of the hydrocarbon-based fuel required to be supplied to the reforming catalyst layer in order to output the electrical output P from the fuel cell when a reformed gas produced by the i-th reforming method is supplied to the fuel cell. $P=fi^{-1}(F)$ is the inverse function of $Fi=fi(P)$. For example, when L=2, the following functions are beforehand obtained.

A function $F1=f1(P)$ and its inverse function $P=f1^{-1}(F1)$. Here, F1 is a flow rate of the hydrocarbon-based fuel required to be supplied to the reforming catalyst layer, in which the first reforming method is performed, in order to output the electrical output P from the fuel cell.

A function $F2=f2(P)$ and its inverse function $P=f2^{-1}(F2)$. Here, F2 is a flow rate of the hydrocarbon-based fuel required to be supplied to the reforming catalyst layer, in which the second reforming method is performed, in order to output the electrical output P from the fuel cell.

Here, for each reforming method, that is, for each i, a Fi is uniquely determined for a certain electrical output P, and there may be one or a plurality of P for a certain Fi. For example, a Fi for a certain electrical output P is inevitably uniquely determined by beforehand determining an electric current and a fuel utilization rate for the certain electrical output P by preliminary experiment, simulation, or the like so that the electric power generation efficiency is as high as possible while the SOFC is maintained at a temperature at which electric power can be suitably generated. Also, for example, there is a case where the flow rate of the hydrocarbon-based fuel for a certain electrical output P or less is set to a fixed value, as shown in FIG. 1-6, in order to maintain the SOFC at a temperature at which electric power can be suitably generated even when the electrical output is small (including zero). In this case, there are a plurality of P for a certain Fi.

[Operation Conditions Other than Fuel Flow Rate and Fuel Cell Electrical Output]

For each reforming method, the flow rates of fluids supplied to the indirect internal reforming SOFC, other than the hydrocarbon-based fuel, and the input and output of electricity to and from the indirect internal reforming SOFC, other than the output of the fuel cell, may be beforehand obtained as functions of the electrical output P, as required. For example, in order to suppress carbon deposition, the flow rate of water supplied to the reformer may be beforehand obtained so that the steam/carbon ratio (ratio of the number of moles of water molecules to the number of carbon atoms in the gas supplied to the reforming catalyst layer) has a predetermined value. The flow rate of air supplied to the reformer may be beforehand obtained so that the oxygen/carbon ratio (ratio of the number of moles of oxygen molecules to the number of moles of carbon atoms in the gas supplied to the reforming catalyst layer) has a predetermined value. The flow rates of fluids supplied to the indirect internal reforming SOFC, other than the water and air supplied to the reformer, and the input and output of electricity to and from the indirect internal reforming SOFC may be beforehand obtained by preliminary experiment, simulation, or the like so that the electric power generation efficiency is as high as possible, while the SOFC is maintained at a temperature at which electric power can be suitably generated, in the case of P>0, and so that the input energy is as little as possible, while the SOFC is maintained at a temperature at which electric power can be suitably generated, in the case of P=0. By doing so, these flow rates and electrical input and output may be determined using beforehand obtained functions, when the output of the fuel cell is set to a certain value P.

Or, the flow rates of fluids supplied to the indirect internal reforming SOFC, other than the hydrocarbon-based fuel, and the input and output of electricity to and from the indirect internal reforming SOFC, other than the output of the fuel cell, may be functions of the flow rate of the hydrocarbon-based fuel. For example, the flow rate of water supplied to the reformer may be a flow rate at which the steam/carbon ratio has a constant value, in order to suppress carbon deposition. The flow rate of air supplied to the reformer may be a flow rate at which the oxygen/carbon ratio has a constant value.

Or, the flow rates of fluids supplied to the indirect internal reforming SOFC, other than the hydrocarbon-based fuel, and the input and output of electricity to and from the indirect internal reforming SOFC, other than the output of the fuel cell, may be values obtained by appropriate control techniques according to the control purposes.

For example, the flow rate of air supplied to the cathode may be set so that the SOFC may be maintained at a temperature at which electric power can be suitably generated.

The output of the electrical heater annexed to the reformer may be set so that the reforming catalyst layer can be maintained at a predetermined temperature (for example, so that the reforming catalyst layer can be maintained at a temperature preferred for reforming).

When a burner for heating the catalyst layer is annexed to the reformer, the fuel flow rate may be set so that the reforming catalyst layer can be maintained at a predetermined temperature, and the air flow rate may be a flow rate at which the air ratio is a predetermined value (for example, a value preferred for combustion).

The output of the electrical heater annexed to the vaporizer may be set so that the steam can be maintained at a predetermined temperature (for example, so that the steam temperature at the reformer inlet can be maintained at a temperature preferred for reforming).

When a burner for heating is annexed to the vaporizer, the fuel flow rate may be set so that the steam can be maintained at a predetermined temperature, and the air flow rate may be a flow rate at which the air ratio is a predetermined value.

When a burner for heating is annexed in the vicinity of the SOFC, the fuel flow rate may be set so that the SOFC can be maintained at a temperature at which electric power can be suitably generated, and the air flow rate may be a flow rate at which the air ratio is a predetermined value.

When a heat exchanger for cooling the SOFC is disposed in the vicinity of the SOFC, the flow rate of a cooling fluid supplied to the heat exchanger may be set so that the SOFC can be maintained at a temperature at which electric power can be suitably generated.

When a heat exchanger for cooling the reforming catalyst layer is annexed in the vicinity of the reforming catalyst layer closest to the SOFC, in order to cool the SOFC by increasing the methane concentration in the reformed gas by an equilibration reaction and causing an endothermic reaction on the anode of the SOFC, the flow rate of a cooling fluid supplied to the heat exchanger may be set so that the SOFC can be maintained at a temperature at which electric power can be suitably generated.

[Function $\eta i = gi(P)$]

A function $\eta i = gi(P)$ is beforehand obtained for all i. The function $\eta i = gi(P)$ is a function of the electrical output P of the fuel cell, and an electric power generation efficiency $\eta i$ of the fuel cell when the reformed gas produced by the i-th reforming method is supplied to the fuel cell to output the electrical output P from the fuel cell. For example, when L=2, the following functions are beforehand obtained.

$\eta 1 = g1(P)$. Here, $\eta 1$ is an electric power generation efficiency of the fuel cell when a reformed gas produced by the first reforming method is supplied to the fuel cell to output the electrical output P from the fuel cell.

$\eta 2 = g2(P)$. Here, $\eta 2$ is an electric power generation efficiency of the fuel cell when a reformed gas produced by the second reforming method is supplied to the fuel cell to output the electrical output P from the fuel cell.

The function $\eta i = gi(P)$ may be simultaneously obtained when the above-described functions $Fi = fi(P)$ and $P = fi^{-1}(Fi)$ are obtained. For example, a Fi for a certain electrical output P is inevitably uniquely determined by beforehand determining an electric current and a fuel utilization rate for the certain electrical output P by preliminary experiment, simulation, or the like so that the electric power generation efficiency is as high as possible while the SOFC is maintained at a temperature at which electric power can be suitably generated, and in doing so, $\eta i$ for the electrical output P is simultaneously uniquely determined.

[$Pi_M$]

$Pi_M$ is the maximum electrical output of the fuel cell when the reformed gas produced by the i-th reforming method is supplied to the fuel cell. $Pi_M$ is beforehand determined as one of the specifications of the fuel cell system. For example, $P1_M$ represents the maximum electrical output of the fuel cell when the reformed gas produced by the first reforming method is supplied to the fuel cell.

[$Fi_{min}$]

$Fi_{min}$ is the minimum value of the flow rate of the hydrocarbon-based fuel determined by the function $Fi = fi(P)$ when P is within a range of 0 or more and $Pi_M$ or less. For example, $F1_{min}$ represents the minimum value of the flow rate F1 of the hydrocarbon-based fuel determined by the function $F1 = f1(P)$ when P is within the range of 0 or more and $P1_M$ or less.

Further, $Fi_{max}$ is the maximum value of the flow rate of the hydrocarbon-based fuel determined by the function $Fi = fi(P)$ when P is within a range of 0 or more and $Pi_M$ or less. For example, $F1_{max}$ represents the maximum value of the flow rate of the hydrocarbon-based fuel determined by the function $F1 = f1(P)$ when P is within the range of 0 or more and $P1_M$ or less.

Here, it is enough that the functions $Fi = fi(P)$ and $P = fi^{-1}(Fi)$ are determined within the ranges of $0 \leq P \leq Pi_M$ and $Fi_{min} \leq F \leq Fi_{max}$.

[Steps $A^1$ to $F^1$]

By preferably repeatedly performing steps $A^1$ to $F^1$, that is, repeatedly performing the steps $A^1$, $B^1$, $C^1$, and $D^1$, and the step $E^1$ or $F^1$ in this order, during load following operation, reforming can be more reliably performed to more reliably prevent the degradation of the anode and higher electric power generation efficiency can be obtained.

FIG. 1-1 shows a flowchart for explaining the steps $A^1$ to $F^1$.

[Step $A^1$]

When load fluctuation operation is actually performed, the step $A^1$ of measuring a temperature of the reforming catalyst layer is performed. This measurement may be continuously performed while the load following operation is performed.

The step $A^1$ is performed to find the temperature T of the reforming catalyst layer. Temperature T is used when a reformable flow rate $Fi^R$ described later is calculated. The step $A^1$ is preferably started in a time as short as possible from the point of time of the start of the load following operation. The step $A^1$ is preferably started immediately after the load following operation is started. When the monitoring (continuous measurement) of the temperature of the reforming catalyst layer has been performed since before the start of the load following operation, the temperature monitoring may be continuously performed as it has been.

An appropriate temperature sensor, such as a thermocouple, may be used for the temperature measurement.

[Step $B^1$]

In the step $B^1$, a flow rate of the hydrocarbon-based fuel that can be reformed in the reforming catalyst layer by the i-th reforming method (reformable flow rate $Fi^R$) is calculated for every i, based on the measured temperature T of the reforming catalyst layer. In other words, when L=2, $F1^R$ and $F2^R$ are calculated. The calculation method will be described in detail later.

[Step $C^1$]

When the reformable flow rate $Fi^R$ calculated in the step $B^1$ is smaller than the minimum value $Fi_{min}$ for every i, electric power generation in the fuel cell is stopped. In other words, when $Fi^R < Fi_{min}$ for all i, it is considered that the requisite minimum reformed gas cannot be reformed, and therefore, the electrical output of the fuel cell is set to zero. In this case, the following operation may be performed. Namely, among the plurality of reforming methods determined as the i-th reforming methods, a reforming method in which the ratio of the amount of heat generation to the amount of endothermic heat of a reaction is the largest is adopted. The flow rate of the hydrocarbon-based fuel supplied to the reformer is set to $Fi^R$ of this reforming method. Then, it is possible to increase the temperature of the reforming catalyst layer by a heater, a burner or the like annexed to the reformer, until at least $Fi^R \geq Fi_{min}$ is satisfied ($Fi^R$ is obtained in the steps A and B) for at least one i. When $Fi^R \geq Fi_{min}$ for at least one i, the step $D^1$ and the subsequent steps may be performed.

[Step $D^1$]

When the reformable flow rate $Fi^R$ calculated in the step $B^1$ is equal to or more than the above minimum value $Fi_{min}$ for at least one i, the step $D^1$ is performed. In other words, when there is even one i for which $Fi^R \geq Fi_{min}$, for example, when $F1^R \geq F1_{min}$, the step $D^1$ is performed.

In the step $D^1$, for each of this at least one i, that is, for each of i for which $Fi^R \geq Fi_{min}$, step $d^1 1$ is performed if a fuel cell output demand value $P_D$ is equal to or less than the maximum electrical output $Pi_M$ of the fuel cell. $P_D \leq Pi_M$ is considered to mean that when the i-th reforming method is performed in the reformer, the fuel cell can output the fuel cell output demand value $P_D$.

Or, for each of this at least one i, that is, for each of i for which $Fi^R \geq Fi_{min}$, step $d^1 2$ is performed if the fuel cell output demand value $P_D$ exceeds the maximum electrical output $Pi_M$ of the fuel cell. $P_D > Pi_M$ is considered to mean that when the i-th reforming method is performed in the reformer, the electrical output of the fuel cell is insufficient for the fuel cell output demand value $P_D$.

Step $d^1 1$

A flow rate $fi(P_D)$ of the hydrocarbon-based fuel required to be supplied to the reforming catalyst layer, in which the i-th reforming method is performed, in order to output the fuel cell output demand value $P_D$ from the fuel cell is calculated using the above function $Fi=fi(P)$.

Then, when the calculated $fi(P_D)$ is equal to or less than the reformable flow rate $Fi^R$ calculated in the step $B^1$, $Pi^*=P_D$ is set, and $Fi^*=fi(P_D)$ is set. $fi(P_D) \leq Fi^R$ is considered to mean that when the i-th reforming method is performed in the reformer, the hydrocarbon-based fuel at the flow rate $fi(P_D)$ required to output an electrical output of the fuel cell output demand value $P_D$ can be reformed in the reforming catalyst layer.

Pi* and Fi* are variables that are candidates for the electrical output of the fuel cell and the flow rate of the hydrocarbon-based fuel supplied to the reformer which are finally set, respectively.

On the other hand, when the calculated $fi(P_D)$ exceeds the reformable flow rate $Fi^R$ calculated in the step $B^1$, $Pi^*=\{$a value that is less than $P_D$ and the maximum among one or more P values calculated from a function $P=fi^{-1}(Fi^R)\}$ is set, and $Fi^*=Fi^R$ is set. $fi(P_D) > Fi^R$ is considered to mean that when the i-th reforming method is performed in the reformer, the hydrocarbon-based fuel at the flow rate $fi(P_D)$ required to output the electrical output of the fuel cell output demand value $P_D$ cannot be reformed in the reforming catalyst layer. There may be only one P value calculated from $P=fi^{-1}(Fi^R)$, and there may be a plurality of P values calculated from $P=fi^{-1}(Fi^R)$. When there is only one P value calculated from $P=fi^{-1}(Fi^R)$, this electrical output of the fuel cell is set as Pi*. When there are a plurality of P values calculated from $P=fi^{-1}(Fi^R)$, a value that is less than $P_D$ and is the maximum among the plurality of P values is set as Pi*.

Step $d^1 2$

As described above, when $P_D > Pi_M$ (considered that when the i-th reforming method is performed in the reformer, the electrical output of the fuel cell is insufficient for the fuel cell output demand value $P_D$), the step $d^1 2$ is performed.

A flow rate $fi(Pi_M)$ of the hydrocarbon-based fuel supplied to the reforming catalyst layer required to be supplied to the reforming catalyst layer, in which the i-th reforming method is performed, in order to output the above maximum electrical output $Pi_M$ from the fuel cell is calculated using the above function $Fi=fi(P)$.

When $fi(Pi_M)$ is equal to or less than the reformable flow rate $Fi^R$ calculated in the step $B^1$, $Pi^*=Pi_M$ is set, and $Fi^*=fi(Pi_M)$ is set. $fi(Pi_M) \leq Fi^R$ is considered to mean that when the i-th reforming method is performed in the reformer, the hydrocarbon-based fuel at the flow rate $fi(Pi_M)$ can be reformed in the reforming catalyst layer.

On the other hand, when $fi(Pi_M)$ exceeds the reformable flow rate $Fi^R$ calculated in the step $B^1$, $Pi^*=\{$the maximum value among one or more P values calculated from the function $P=fi^{-1}(Fi^R)\}$ is set, and $Fi^*=Fi^R$ is set. The maximum value among one or more P values calculated from $P=fi^{-1}(Fi^R)$ is inevitably less than $P_D$. $fi(Pi_M) > Fi^R$ is considered to mean that when the i-th reforming method is performed in the reformer, the hydrocarbon-based fuel at the flow rate $fi(Pi_M)$ cannot be reformed in the reforming catalyst layer.

[Step $E^1$]

When there are two or more i for which the reformable flow rate $Fi^R$ calculated in the step $B^1$ is equal to or more than the above minimum value $Fi_{min}$, an electric power generation efficiency at the electrical output Pi*, that is $\eta i=gi(Pi^*)$, is calculated using the function $\eta i=gi(P)$ for each of these two or more i. i that gives the largest $\eta i$ among two or more $\eta i$ calculated in this manner is represented as I. Then, the electrical output of the fuel cell is set to PI*, the reforming method performed in the reformer is set to an I-th reforming method, and the flow rate of the hydrocarbon-based fuel supplied to the reforming catalyst layer is set to FI*.

For example, when there are two i (1 and 2) for which $Fi^R \geq Fi_{min}$, that is, when $F1^R \leq F1_{min}$ and $F2^R \geq F2_{min}$, and $F3^R < F3_{min}$ even if i can be 3, $\eta 1 = g1(P1^*)$ and $\eta 2 = g2(P2^*)$ are calculated. When the largest $\eta i$ among these $\eta 1$ and $\eta 2$ is $\eta 1$, i that gives the largest $\eta i$ (represented as I) is 1. Then, the electrical output of the fuel cell is set to P1*, the reforming method performed in the reformer is set to the first reforming method, and the flow rate of the hydrocarbon-based fuel supplied to the reforming catalyst layer is set to F1*.

[Step $F^1$]

When there is only one i for which the reformable flow rate $Fi^R$ calculated in the step $B^1$ is equal to or more than the above minimum value $Fi_{min}$, this only one i is represented as I. Then, the electrical output of the fuel cell is set to PI*, the reforming method performed in the reformer is set to an I-th reforming method, and the flow rate of the hydrocarbon-based fuel supplied to the reforming catalyst layer is set to FI*.

For example, when i for which $Fi^R \geq Fi_{min}$ is only 1, that is, when $F1^R \geq F1_{min}$ and $F2^R < F2_{min}$, and further, when $F3^R < F3_{min}$ even if i can be 3, the electrical output of the fuel cell is set to P1*, the reforming method performed in the reformer is set to the first reforming method, and the flow rate of the hydrocarbon-based fuel supplied to the reforming catalyst layer is set to F1*.

[Example of Load Following Operation]

How operation is performed under various conditions, when the load following operation of one certain fuel cell system is performed, will be described below by giving specific examples using FIGS. 1-2 to 1-5 and 1-7. However, the present invention is not limited thereto.

Correlations between the electrical output and the electric power generation efficiency, when L=2, are shown in FIG. 1-7. At the same electrical output, the electric power generation efficiency is higher in the first reforming method than in the second reforming method. But, when the electrical output is different, the magnitude relationship of the electric power generation efficiency is different. For example, there is a case where the maximum electrical output capable of being generated in a state in which complete reforming is ensured is larger and the electric power generation efficiency is higher in the second reforming method than in the first reforming method. In the present embodiment, it is possible to calculate the electrical output and the hydrocarbon-based fuel flow rate in a state in which complete reforming is ensured and select a reforming method in which the electric power generation efficiency is higher in real time, and therefore, it is possible to maintain the electric power generation efficiency higher, while making the electrical output during the load following operation as large as possible.

<Examples of Calculation of Pi* and Fi*>

First, a procedure until Pi* and Fi* are calculated in the step $D^1$ will be described. However, here, only the first reforming method will be specifically described. For the second reforming method, and also for the third reforming method when there is the third reforming method, Pi* and Fi* can be calculated by the same procedure.

It is assumed that the correlation between the electrical output P of the fuel cell and the flow rate F1 of the hydrocarbon-based fuel required to be supplied to the reforming catalyst layer in order to obtain the electrical output P when the reformed gas produced by the first reforming method is supplied to the fuel cell, that is, the functions F1=f1(P) and P=f1$^{-1}$(F1) have been beforehand obtained as shown in FIG. 1-2 (the correlation is also the same in FIGS. 1-3 to 1-5).

Also, it is assumed that $P1_M$=1000 W and $F1_{min}$=1 g/min have been obtained.

The temperature of the reforming catalyst layer is measured in the step $A^1$, and the reformable flow rate $F1^R$ is calculated in the step $B^1$.

(Case 1-1)

A case where
$P_D$=600 W and $F1^R$=3 g/min,
as shown in FIG. 1-2, is considered.

In this case, $F1^R$=3 g/min≥1 g/min=$F1_{min}$, and therefore, the step $C^1$ is not performed, and the step $D^1$ is performed.

Then, $P_D$=600 W≤1000 W=$P1_M$, and therefore, the step $d^1 1$, rather than the step $d^1 2$, is performed.

In the step $d^1 1$, the flow rate f1($P_D$) of the hydrocarbon-based fuel required to be supplied to the reforming catalyst layer, in which the first reforming method is performed, in order to output an electric power of $P_D$ is calculated using the function F1=f1(P). This value is 2 g/min.

f1($P_D$)=2 g/min≤3 g/min=$F1^R$, and therefore, $P1^*$=$P_D$=600 W is set, and $F1^*$=f1($P_D$)=2 g/min is set. In FIGS. 1-2 to 1-5, a point showing conditions obtained in this manner is marked with a star.

(Case 1-2)

A case where
$P_D$=900 W and $F1^R$=2 g/min,
as shown in FIG. 1-3, is considered. The fuel cell output demand value $P_D$ fluctuates in the load following operation, and $F1^R$ varies depending on the temperature of the reforming catalyst layer. $P1_M$=1000 W and $F1_{min}$=1 g/min are basically values inherent to the fuel cell system, and therefore are the same as the above example.

In this case, $Fi^R$=2 g/min≥1 g/min=$F1_{min}$, and therefore, the step $C^1$ is not performed, and the step $D^1$ is performed.

Then, $P_D$=900 W≤1000 W=$P1_M$, and therefore, the step $d^1 1$, rather than the step $d^1 2$, is performed.

In the step $d^1 1$, the flow rate f1($P_D$) of the hydrocarbon-based fuel required to be supplied to the reforming catalyst layer, in which the first reforming method is performed, in order to output an electric power of $P_D$ is calculated using the function F1=f1(P). This value is 3 g/min.

f1($P_D$)=3 g/min>2 g/min=$F1^R$, and therefore, $P1^*$ is set to a value that is less than $P_D$ and the maximum among one or more P values calculated from P=f1$^{-1}$($F1^R$), and $F1^*$=$F1^R$=2 g/min is set.

The P values calculated from P=f1$^{-1}$($F1^R$) are 30 W, 600 W, and 800 W. Among these values, the maximum value that is less than $P_D$ (900 W) is 800 W. Therefore, $P1^*$=800 W is set.

(Case 1-3)

A case where
$P_D$=1200 W and $F1^R$=5 g/min,
as shown in FIG. 1-4, is considered. $P1_M$=1000 W and $F1_{min}$=1 g/min are the same as the above examples.

In this case, $F1^R$=5 g/min≤1 g/min=$F1_{min}$, and therefore, the step $C^1$ is not performed, and the step $D^1$ is performed.

Then, $P_D$=1200 W>1000 W=$P1_M$, and therefore, the step $d^1 2$, rather than the step $d^1 1$, is performed.

In the step $d^1 2$, the flow rate f1($P1_M$) of the hydrocarbon-based fuel supplied to the reforming catalyst layer required to be supplied to the reforming catalyst layer, in which the first reforming method is performed, in order to output an electrical output of the maximum electrical output $P1_M$ (1000 W) is calculated using the above function F1=f1(P). This value is 4.5 g/min.

f1($P1_M$)=4.5 g/min≤5 g/min=$F1^R$, and therefore, $P1^*$=$P1_M$=1000 W is set, and $F1^*$=f1($P1_M$)=4.5 g/min is set.

(Case 1-4)

A case where
$P_D$=1200 W and $F1^R$=2 g/min,
as shown in FIG. 1-5, is considered. $P1_M$=1000 W and $F1_{min}$=1 g/min are the same as the above examples.

In this case, $F1^R$=2 g/min≥1 g/min=$F1_{min}$, and therefore, the step $C^1$ is not performed, and the step $D^1$ is performed.

Then, $P_D$=1200 W>1000 W=$P1_M$, and therefore, the step $d^1 2$, rather than the step $d^1 1$, is performed.

In the step $d^1 2$, the flow rate f1($P1_M$) of the hydrocarbon-based fuel supplied to the reforming catalyst layer required to be supplied to the reforming catalyst layer, in which the first reforming method is performed, in order to output an electrical output of the maximum electrical output $P1_M$ (1000 W) is calculated using the above function F1=f1(P). This value is 4.5 g/min.

f1($P1_M$)=4.5 g/min>2 g/min=$F1^R$, and therefore, $P1^*$ is set to the maximum value among P values calculated from P=f1$^{-1}$($F1^R$), and $F1^*$=$F1^R$=2 g/min is set.

The P values calculated from P=f1$^{-1}$($F1^R$) are 30 W, 600 W, and 800 W. Among these, the maximum value is 800 W. Therefore, $P1^*$=800 W is set.

In the explanation using FIGS. 1-2 to 1-5, the correlation between F1 and P is extreme for explanation. But, it is considered that practically, the correlation may often be close to a correlation as shown in FIG. 1-6. In FIG. 1-6, in a range in which the electrical output P is small, that is, in a range in which the electrical output P is 0 W or more and 300 W or less, the flow rate F1 of the hydrocarbon-based fuel is fixed at 1.5 g/min in order to suitably maintain the SOFC at a temperature at which electric power can be generated. Also, in a range in which the electrical output P is large, that is, in a range in which the electrical output P is greater than 300 W and the maximum electrical output $P1_M$ (1000 W) or less, the flow rate F1 of the hydrocarbon-based fuel increases from 1.5 g/min to 4.5 g/min, correspondingly to the increase of the electrical output P in order to make electric power generation efficiency higher.

<Examples of Determination of Electrical Output of Fuel Cell and Flow Rate of Fuel Supplied to Reformer>

A procedure for determining the electrical output of the fuel cell and the flow rate of the hydrocarbon-based fuel supplied to the reformer, in the step $E^1$ or $F^1$, will be described in detail below.

In the following descriptions, a case where L=2 is considered, and it is assumed that the following values have been obtained. $P1_M$=1000 W, $P2_M$=900 W,
$F1_{min}$=1 g/min, and $F2_{min}$=2 g/min.

(Case 1-5)

Here, it is assumed that
$P_D$=900 W, and
$F1^R$=2 g/min and $F2^R$=5 g/min
have been calculated in the step $B^1$. Also, it is assumed that the functions η1=g1(P) and η2=g2(P) have been obtained, as shown in FIG. 1-7, for the first and second reforming methods. Further, it is assumed that $P1^*$, $F1^*$, $P2^*$, and $F2^*$ have been obtained as follows.
$P1^*$=800 W, $F1^*$=2 g/min,
$P2^*$=900 W, and $F2^*$=4 g/min.

$F1^R=2$ g/min≥1 g/min=$F1_{min}$ and $F2^R=5$ g/min≥2 g/min=$F2_{min}$, and therefore, there are two i (that is, 1 and 2) for which $Fi^R≥Fi_{min}$. Therefore, the step $E^1$, rather than the step $F^1$, is performed.

For each of the two i (1 and 2),
η1=g1(P1*)=43%, and
η2=g2(P2*)=45%
are obtained from the functions η1=g1(P) and η2=g2(P), that is, from FIG. 1-7.

The largest ηi of these ηi is η2, and I (i that gives η2) is 2.

Therefore, the electrical output of the fuel cell is set to PI*, that is, P2* (900 W), the reforming method is set to the second reforming method, and the flow rate of the hydrocarbon-based fuel supplied to the reforming catalyst layer is set to F2*=4 g/min.

(Case 1-6)

Here, it is assumed that
$P_D$=900 W, and
$F1^R=2$ g/min and $F2^R=1.5$ g/min
have been calculated in the step $B^1$. Further, it is assumed that P1* and F1* have been obtained as follows. Here, P2* and F2* are not used. P1*=800 W and F1*=2 g/min.

$F1^R=2$ g/min≥1 g/min=$F1_{min}$, and on the other hand, $F2^R=1.5$ g/min<2 g/min=$F2_{min}$, and therefore, there is only one i (that is, 1) for which $Fi^R≥Fi_{min}$. Therefore, I (this only one i)=1.

Therefore, the electrical output of the fuel cell is set to PI*, that is, P1* (800 W), the reforming method is set to the first reforming method, and the flow rate of the hydrocarbon-based fuel supplied to the reforming catalyst layer is set to F1*=2 g/min.

(Case 1-7)

Here, it is assumed that
$P_D$=900 W, and
$F1^R=0.5$ g/min and $F2^R=5$ g/min
have been calculated in the step $B^1$. Further, it is assumed that P2* and F2* have been obtained as follows. Here, P1* and F1* are not used.
P2*=900 W and F2*=4 g/min.

$F1^R=0.5$ g/min<1 g/min=$F1_{min}$ and $F2^R=5$ g/min≥2 g/min=$F2_{min}$, and therefore, there is only one i (that is, 2) for which $Fi^R≥Fi_{min}$. Therefore, I (this only one i)=2.

Therefore, the electrical output of the fuel cell is set to PI*, that is, P2*=900 W, the reforming method is set to the second reforming method, and the flow rate of the hydrocarbon-based fuel supplied to the reforming catalyst layer is set to F2*=4 g/min.

(Case 1-8)

A case where
$F1^R=0.5$ g/min and $F2^R=1$ g/min
have been calculated in the step $B^1$, though not shown, is considered.

In this case, $F1^R=0.5$ g/min<1 g/min=$F1_{min}$ and $F2^R=1$ g/min<2 g/min=$F2_{min}$, that is, $Fi^R<Fi_{min}$, for all i, and therefore, the step $D^1$ is not performed, and the step $C^1$ is performed, and the electrical output of the fuel cell is set to zero.

In this case, if the second reforming method is a reforming method in which the ratio of the amount of heat generation to the amount of endothermic heat is the largest among the first and second reforming methods, it is possible to adopt the second reforming method and to supply the hydrocarbon-based fuel at the flow rate $F2^R$ to the reformer and increase the temperature of the reforming catalyst layer by the heater, the burner or the like annexed to the reformer, until at least $Fi^R≥Fi_{min}$ is satisfied for at least one i. When the temperature of the reforming catalyst layer increases and $Fi^R≥Fi_{min}$ is satisfied for at least one i, while the steps $A^1$ to $C^1$ are repeated, the step $D^1$ and the subsequent steps may be performed.

[Calculation of Reformable Flow Rate (Calculation of $Fi^R$)]

A method for calculating the flow rate $Fi^R$ of the hydrocarbon-based fuel that can be reformed in the reforming catalyst layer in which the i-th reforming method is performed, in the step $B^1$, based on the temperature of the reforming catalyst layer measured in the step $A^1$, will be described below.

The flow rate of the hydrocarbon-based fuel that can be reformed in the reforming catalyst layer refers to a flow rate such that when the hydrocarbon-based fuel at this flow rate is supplied to the reforming catalyst layer, the composition of the gas discharged from the reforming catalyst layer becomes a composition suitable to be supplied to the anode of the fuel cell.

For example, the reformable flow rate in the reforming catalyst layer may be any flow rate that is equal to or less than the maximum value of flow rates at which the supplied hydrocarbon-based fuel can be decomposed to a C1 compound(s) (a compound(s) having a carbon number of one). In other words, the reformable flow rate in the reforming catalyst layer may be any flow rate equal to or less than the maximum value of the flow rate of the hydrocarbon-based fuel supplied to the reforming catalyst layer when reforming can proceed in the reforming catalyst layer until a composition is obtained in which a C2+ component(s) (a component(s) having a carbon number of two or more) in the gas at the outlet of the reforming catalyst layer has a concentration which does not cause problems of anode degradation and flow blockage due to carbon deposition, or less. The reformable flow rate may be this maximum value, or may be a value obtained by dividing this maximum value by a safety factor (a value that exceeds 1, for example, 1.4). The concentration of the C2+ component(s) in this case is preferably 50 ppb or less as a mass fraction in the reformed gas. And in this case, it is enough that the gas at the outlet of the reforming catalyst layer is reducing gas. Methane is permitted to be contained in the gas at the outlet of the reforming catalyst layer. In the reforming of the hydrocarbon-based fuel, usually, methane remains in the equilibrium theory. Even if carbon is contained in the gas at the outlet of the reforming catalyst layer in the form of methane, CO, or $CO_2$, carbon deposition can be prevented by adding steam as required. When methane is used as the hydrocarbon-based fuel, it is enough that reforming proceeds so that the gas at the outlet of the reforming catalyst layer becomes reducing.

With respect to the reducing property of the gas at the outlet of the reforming catalyst layer, it is enough that the property is to the extent that if this gas is supplied to the anode, the oxidative degradation of the anode is suppressed. In order to do this, for example, the partial pressures of oxidizing $O_2$, $H_2O$, and $CO_2$, and the like contained in the gas at the outlet of the reforming catalyst layer may be lower than their equilibrium partial pressures of oxidation reactions of the anode electrode. For example, when the anode electrode material is nickel, and the anode temperature is 800° C., the partial pressure of $O_2$ contained in the gas at the outlet of the reforming catalyst layer may be less than $1.2\times10^{-14}$ atm ($1.2\times10^{-9}$ Pa), the partial pressure ratio of $H_2O$ to $H_2$ may be less than $1.7\times10^2$, and the partial pressure ratio of $CO_2$ to CO may be less than $1.8\times10^2$.

The reformable flow rate depends on the temperature of the reforming catalyst layer. Therefore, the calculation of the reformable flow rate in the reforming catalyst layer is performed based on the measured temperature of the reforming catalyst layer.

The reformable flow rate $Fi^R$ in the reforming catalyst layer may be beforehand obtained as a function of the temperature T of the reforming catalyst layer by experiment ($Fi^R$ is represented also as $Fi^R(T)$ to explicitly show that it is a function of temperature). Also, it is possible to determine the reformable flow rate by dividing the function obtained by experiment by a safety factor, or offsetting the temperature to the safe side. The unit of $Fi^R(T)$ is, for example, mol/s. The reformable flow rate $Fi^R(T)$ may be a function of only the temperature T. But, this is not limiting, and the reformable flow rate $Fi^R$ may be a function having, in addition to the temperature T, a variable, such as the volume of the catalyst layer or the concentration of the gas component, other than T. In this case, when the reformable flow rate $Fi^R$ is calculated, it is possible to appropriately obtain a variable other than T, and calculate the reformable flow rate $Fi^R$ from the variable other than T and the measured T.

The temperature measurement position in the reforming catalyst layer may be one point or a plurality of points. Also, a representative temperature, such as the average value of a plurality of points, or the like may be used as the temperature condition.

It is possible to consider a plurality of divided regions into which the reforming catalyst layer is divided along the gas flow direction, measure temperatures at a plurality of points in the reforming catalyst layer at different positions along the gas flow direction, calculate based on these temperatures one or more flow rates of the fuel that can be reformed in one or more of the plurality of divided regions, and set the total value of the calculated flow rate(s) as the flow rate of the fuel that can be reformed in the reforming catalyst layer.

[Others]

Also, by interconnecting the fuel cell to a system power supply, the shortage of the electrical output of the fuel cell with respect to an electric power load may be supplied from the system power supply.

The fuel cell output demand value $P_D$ may be a value of an electric power load measured by an appropriate electric power meter. Alternatively, when the fuel cell is interconnected to another power generator or storage battery, part of a measured electric power load may be set as the fuel cell output demand value $P_D$.

In the step $E^1$, $F^1$ or the like, when the flow rate of the hydrocarbon-based fuel is determined, it is possible to accordingly determine the flow rates of fluids supplied to the indirect internal reforming SOFC, other than the hydrocarbon-based fuel, and the input and output of electricity to and from the indirect internal reforming SOFC, other than the output of the SOFC, by calculating from functions of electrical output P obtained beforehand, as required.

The present invention is particularly effective when the hydrocarbon-based fuel supplied to the reforming catalyst layer includes a hydrocarbon-based fuel having a carbon number of two or more. According to the present invention, it is possible to allow the concentration of a compound(s) having a carbon number of two or more in the reformed gas to be 50 ppb or less on a mass basis even in load following operation. And thereby, anode degradation and flow blockage due to carbon deposition can be more reliably prevented.

In order to perform the method of the present invention, appropriate instrumentation controlling equipment, including a computing means, such as a computer, may be used.

Second Embodiment

The second embodiment of the method of the present invention will be described below.

[Functions Fi=fi(P) and P=fi$^{-1}$(Fi)]

In this embodiment, functions Fi=fi(P) and P=fi$^{-1}$(Fi) are beforehand obtained for all i. Functions Fi=fi(P) and P=fi$^{-1}$(Fi) are functions of an electrical output P of the fuel cell and a flow rate Fi of the hydrocarbon-based fuel required to be supplied to the reforming catalyst layer in order to output the electrical output P from the fuel cell when a reformed gas produced by the i-th reforming method is supplied to the fuel cell. P=fi$^{-1}$(F) is the inverse function of Fi=fi(P). For example, when L=2, the following functions are beforehand obtained.

A function F1=f1(P) and its inverse function P=f1$^{-1}$(F1). Here, F1 is a flow rate of the hydrocarbon-based fuel required to be supplied to the reforming catalyst layer, in which the first reforming method is performed, in order to output the electrical output P from the fuel cell.

A function F2=f2(P) and its inverse function P=f2$^{-1}$(F2). Here, F2 is a flow rate of the hydrocarbon-based fuel required to be supplied to the reforming catalyst layer, in which the second reforming method is performed, in order to output the electrical output P from the fuel cell.

Here, for each reforming method, that is, for each i, a Fi is uniquely determined for a certain electrical output P, and there may be one or a plurality of P for a certain Fi. For example, a Fi for a certain electrical output P is inevitably uniquely determined by beforehand determining an electric current and a fuel utilization rate for the certain electrical output P by preliminary experiment, simulation, or the like so that the electric power generation efficiency is as high as possible, while the SOFC is maintained at a temperature at which electric power can be suitably generated. Also, for example, there is a case where the flow rate of the hydrocarbon-based fuel for a certain electrical output P or less is set to a fixed value, as shown in FIG. 2-6, in order to maintain the SOFC at a temperature at which electric power can be suitably generated even when the electrical output is small (including zero), and in this case, there are a plurality of P for a certain Fi.

[Operation Conditions Other than Fuel Flow Rate and Fuel Cell Electrical Output]

For each reforming method, the flow rates of fluids supplied to the indirect internal reforming SOFC, other than the hydrocarbon-based fuel, and the input and output of electricity to and from the indirect internal reforming SOFC, other than the output of the fuel cell, may be beforehand obtained as functions of the electrical output P, as required. For example, in order to suppress carbon deposition, the flow rate of water supplied to the reformer may be beforehand obtained so that the steam/carbon ratio (ratio of the number of moles of water molecules to the number of moles of carbon atoms in the gas supplied to the reforming catalyst layer) has a predetermined value. The flow rate of air supplied to the reformer may be beforehand obtained so that the oxygen/carbon ratio (ratio of the number of moles of oxygen molecules to the number of moles of carbon atoms in the gas supplied to the reforming catalyst layer) has a predetermined value. The flow rates of fluids supplied to the indirect internal reforming SOFC, other than the water and air supplied to the reformer, and the input and output of electricity to and from the indirect internal reforming SOFC may be beforehand obtained by preliminary experiment, simulation, or the like so that the electric power generation efficiency is as high as possible, while the SOFC is maintained at a temperature at which electric power can be suitably generated, in the case of P>0, and so that the input energy is as little as possible, while the SOFC is maintained at a temperature at which electric power can be suitably generated, in the case of P=0. By doing so, these flow rates and electrical input and output may be determined using beforehand obtained functions, when the output of the fuel cell is set to a certain value P.

Or, the flow rates of fluids supplied to the indirect internal reforming SOFC, other than the hydrocarbon-based fuel, and the input and output of electricity to and from the indirect internal reforming SOFC, other than the output of the fuel cell, may be functions of the flow rate of the hydrocarbon-based fuel. For example, the flow rate of water supplied to the reformer may be a flow rate at which the steam/carbon ratio has a constant value, in order to suppress carbon deposition. The flow rate of air supplied to the reformer may be a flow rate at which the oxygen/carbon ratio has a constant value.

Or, the flow rates of fluids supplied to the indirect internal reforming SOFC, other than the hydrocarbon-based fuel, and the input and output of electricity to and from the indirect internal reforming SOFC, other than the output of the fuel cell, may be values obtained by appropriate control techniques according to the control purposes.

For example, the flow rate of air supplied to the cathode may be set so that the SOFC can be maintained at a temperature at which electric power can be suitably generated.

The output of the electrical heater annexed to the reformer may be set so that the reforming catalyst layer can be maintained at a predetermined temperature (for example, so that the reforming catalyst layer can be maintained at a temperature preferred for reforming).

When a burner for heating the catalyst layer is annexed to the reformer, the fuel flow rate may be set so that the reforming catalyst layer can be maintained at a predetermined temperature, and the air flow rate may be a flow rate at which the air ratio has a predetermined value (for example, a value preferred for combustion).

The output of the electrical heater annexed to the vaporizer may be set so that the steam can be maintained at a predetermined temperature (for example, so that the steam temperature at the reformer inlet can be maintained at a temperature preferred for reforming).

When a burner for heating is annexed to the vaporizer, the fuel flow rate may be set so that the steam can be maintained at a predetermined temperature, and the air flow rate may be a flow rate at which the air ratio has a predetermined value.

When a burner for heating is annexed in the vicinity of the SOFC, the fuel flow rate may be set so that the SOFC can be maintained at a temperature at which electric power can be suitably generated, and the air flow rate may be a flow rate at which the air ratio has a predetermined value.

When a heat exchanger for cooling the SOFC is disposed in the vicinity of the SOFC, the flow rate of a cooling fluid supplied to the heat exchanger may be set so that the SOFC can be maintained at a temperature at which electric power can be suitably generated.

When a heat exchanger for cooling the reforming catalyst layer is annexed in the vicinity of the reforming catalyst layer closest to the SOFC, in order to cool the SOFC by increasing the methane concentration in the reformed gas by an equilibration reaction and causing an endothermic reaction on the anode of the SOFC, the flow rate of a cooling fluid supplied to the heat exchanger may be set so that the SOFC can be maintained at a temperature at which electric power can be suitably generated.

[Function $\eta i=gi(P)$]

A function $\eta i=gi(P)$ is beforehand obtained for all i. The function $\eta i=gi(P)$ is a function of the electrical output P of the fuel cell and an electric power generation efficiency $\eta i$ of the fuel cell when the reformed gas produced by the i-th reforming method is supplied to the fuel cell to output the electrical output P from the fuel cell. For example, when L=2, the following functions are beforehand obtained.

$\eta 1=g1(P)$. Here, $\eta 1$ is an electric power generation efficiency of the fuel cell when a reformed gas produced by the first reforming method is supplied to the fuel cell to output the electrical output P from the fuel cell.

$\eta 2=g2(P)$. Here, $\eta 2$ is an electric power generation efficiency of the fuel cell when a reformed gas produced by the second reforming method is supplied to the fuel cell to output the electrical output P from the fuel cell.

The function $\eta i=gi(P)$ may be simultaneously obtained when the above-described functions $Fi=fi(P)$ and $P=fi^{-1}(Fi)$ are obtained. For example, a Fi for a certain electrical output P is inevitably uniquely determined by beforehand determining an electric current and a fuel utilization rate for the certain electrical output P by preliminary experiment, simulation, or the like so that the electric power generation efficiency is as high as possible, while the SOFC is maintained at a temperature at which electric power can be suitably generated, and in doing so, $\eta i$ for the electrical output P is simultaneously uniquely determined.

[$Pi_M$]

$Pi_M$ is the maximum electrical output of the fuel cell when the reformed gas produced by the i-th reforming method is supplied to the fuel cell. $Pi_M$ is beforehand determined as one of the specifications of the fuel cell system. For example, $P1_M$ represents the maximum electrical output of the fuel cell when the reformed gas produced by the first reforming method is supplied to the fuel cell.

[$Fi_{min}$]

$Fi_{min}$ is the minimum value of the flow rate of the hydrocarbon-based fuel determined by the function $Fi=fi(P)$ when P is within a range of 0 or more and $Pi_M$ or less. For example, $F1_{min}$ represents the minimum value of the flow rate F1 of the hydrocarbon-based fuel determined by the function $F1=f1(P)$ when P is within a range of 0 or more and $P1_M$ or less.

Further, $Fi_{max}$ is the maximum value of the flow rate of the hydrocarbon-based fuel determined by the function $Fi=fi(P)$ when P is within a range of 0 or more and $Pi_M$ or less. For example, $F1_{max}$ represents the maximum value of the flow rate of the hydrocarbon-based fuel determined by the function $F1=f1(P)$ when P is within the range of 0 or more and $P1_M$ or less.

Here, it is enough that the functions $Fi=fi(P)$ and $P=fi^{-1}(Fi)$ are determined within the ranges of $0 \leq P \leq Pi_M$ and $Fi_{min} \leq F \leq Fi_{max}$.

[$Ti_k$, and $Gi_k$ that Corresponds to $Ti_k$]

Further, Ni different reforming catalyst layer temperatures $Ti_k$ (k is an integer of 1 or more and Ni or less, where Ni is an integer of 2 or more) and a flow rate $Gi_k$ of the hydrocarbon-based fuel that corresponds to each $Ti_k$ are beforehand set for all i.

Here, each $Gi_k$ is a flow rate of the hydrocarbon-based fuel that can be reformed in the reforming catalyst layer at the corresponding reforming catalyst layer temperature $Ti_k$ by the i-th reforming method.

Each $Gi_k$ is larger than 0. In other words, for all i and k, $0 < Gi_k$. Also, $Gi_k$ is the same value or increases with the increase of k. In other words, $Gi_k \leq Gi_k+1$ (here, k is an integer of 1 or more and Ni−1 or less).

$Gi_k$ ($Gi_{Ni}$) when k is Ni is equal to or more than $Fi_{max}$. In other words, $Gi_{Ni} \geq Fi_{max}$. $Gi_{Ni}$ is the flow rate of the hydrocarbon-based fuel that can be reformed in the reforming catalyst layer at the highest temperature considered by the i-th reforming method, that is, the maximum value of the hydrocarbon-based fuel that can be reformed. If $Gi_{Ni} < Fi_{max}$, the hydrocarbon-based fuel at the flow rate $Fi_{max}$ cannot be reformed, and therefore, the fuel cell system is, of course, designed so that $Gi_{Ni} \geq Fi_{max}$.

[Steps $A^2$ to $F^2$]

By preferably repeatedly performing steps $A^2$ to $F^2$, that is, repeatedly performing the steps $A^2$, $B^2$, $C^2$ and $D^2$, and the step $E^2$ or $F^2$ in this order, during load following operation, reforming can be more reliably performed to more reliably prevent the degradation of the anode and higher electric power generation efficiency can be obtained.

FIG. 2-1 shows a flow chart for explaining the steps $A^2$ to $F^2$.

[Step $A^2$]

When load fluctuation operation is actually performed, the step $A^2$ of measuring the temperature of the reforming catalyst layer is performed. This measurement may be continuously performed while the load following operation is performed.

The step $A^2$ is performed to find the temperature T of the reforming catalyst layer. Temperature T is used when a reformable flow rate $Fi^R$ described later is calculated. The step $A^2$ is preferably started in a time as short as possible from the point of time of the start of the load following operation. The step $A^2$ is preferably started immediately after the load following operation is started. When the monitoring (continuous measurement) of the temperature of the reforming catalyst layer has been performed since before the start of the load following operation, the temperature monitoring may be continuously performed as it has been.

An appropriate temperature sensor, such as a thermocouple, may be used for the temperature measurement.

[Step $B^2$]

In the step $B^2$, for every i, $Gi_k$ corresponding to the largest $Ti_k$ that is equal to or less than the temperature T (the temperature measured in the step $A^2$) is adopted as a flow rate (reformable flow rate $Fi^R$) of the hydrocarbon-based fuel that can be reformed in the reforming catalyst layer at the temperature T. In other words, among beforehand set $Ti_k$, the largest $Ti_k$ within a range of the measured temperature T or less is selected. Then, $Gi_k$ corresponding to the selected $Ti_k$ is obtained from the correspondence relationship between $Ti_k$ and $Gi_k$ which has been beforehand set, and this $Gi_k$ is set as the reformable flow rate $Fi^R$.

[Step $C^2$]

When the reformable flow rate $Fi^R$ obtained in the step $B^2$ is smaller than the minimum value $Fi_{min}$, for every i, electric power generation in the fuel cell is stopped. In other words, when $Fi^R < Fi_{min}$ for all i, it is considered that the requisite minimum reformed gas cannot be reformed, and therefore, the electrical output of the fuel cell is set to zero. In this case, the following operation may be performed. Namely, among the plurality of reforming methods determined as the i-th reforming methods, a reforming method in which the ratio of the amount of heat generation to the amount of endothermic heat of a reaction is the largest is adopted. The flow rate of the hydrocarbon-based fuel supplied to the reformer is set to $Fi^R$ of this reforming method. Then, it is possible to increase the temperature of the reforming catalyst layer by the heater, the burner or the like annexed to the reformer, until at least $Fi^R \geq Fi_{min}$ is satisfied ($Fi^R$ is obtained by the steps $A^2$ and $B^2$) for at least one i. When $Fi^R \geq Fi_{min}$ for at least one i, the step $D^2$ and the subsequent steps may be performed.

[Step $D^2$]

When the reformable flow rate $Fi^R$ obtained in the step $B^2$ is equal to or more than the above minimum value $Fi_{min}$ for at least one i, step $D^2$ is performed. In other words, when there is even one i for which $Fi^R \geq Fi_{min}$, for example, when $F1^R \geq F1_{min}$, the step $D^2$ is performed.

In the step $D^2$, for each of this at least one i, that is, for each of i for which $Fi^R \geq Fi_{min}$, step $d^2 1$ is performed if a fuel cell output demand value $P_D$ is equal to or less than the maximum electrical output $Pi_M$ of the fuel cell. $P_D \leq Pi_M$ is considered to mean that when the i-th reforming method is performed in the reformer, the fuel cell can output the fuel cell output demand value $P_D$.

Or, for each of this at least one i, that is, for each of i for which $Fi^R \geq Fi_{min}$, step $d^2 2$ is performed if the fuel cell output demand value $P_D$ exceeds the maximum electrical output $Pi_M$ of the fuel cell. $P_D > Pi_M$ is considered to mean that when the i-th reforming method is performed in the reformer, the electrical output of the fuel cell is insufficient for the fuel cell output demand value $P_D$.

Step $d^2 1$

A flow rate $fi(P_D)$ of the hydrocarbon-based fuel required to be supplied to the reforming catalyst layer, in which the i-th reforming method is performed, in order to output the fuel cell output demand value $P_D$ from the fuel cell is calculated using the above function $Fi = fi(P)$.

Then, when the calculated $fi(P_D)$ is equal to or less than the reformable flow rate $Fi^R$ obtained in the step $B^2$, $Pi^* = P_D$ is set, and $Fi^* = fi(P_D)$ is set. $fi(P_D) \leq Fi^R$ is considered to mean that when the i-th reforming method is performed in the reformer, the hydrocarbon-based fuel at the flow rate $fi(P_D)$ required to output an electrical output of the fuel cell output demand value $P_D$ can be reformed in the reforming catalyst layer.

$Pi^*$ and $Fi^*$ are variables that are candidates for the electrical output of the fuel cell and the flow rate of the hydrocarbon-based fuel supplied to the reformer which are finally set, respectively.

On the other hand, when the calculated $fi(P_D)$ exceeds the reformable flow rate $Fi^R$ obtained in the step $B^2$, $Pi^* = \{$a value that is less than $P_D$ and the maximum among one or more P values calculated from a function $P = fi^{-1}(Fi^R)\}$ is set, and $Fi^* = Fi^R$ is set. $fi(P_D) > Fi^R$ is considered to mean that when the i-th reforming method is performed in the reformer, the hydrocarbon-based fuel at the flow rate $fi(P_D)$ required to output the electrical output of the fuel cell output demand value $P_D$ cannot be reformed in the reforming catalyst layer. There may be only one P value calculated from $P = fi^{-1}(Fi^R)$, and there may be a plurality of P values calculated from $P = fi^{-1}(Fi^R)$. When there is only one P value calculated from $P = fi^{-1}(Fi^R)$, this electrical output of the fuel cell is set as $Pi^*$. When there are a plurality of P values calculated from $P = fi^{-1}(Fi^R)$, a value that is less than $P_D$ and is the maximum among the plurality of P values is set as $Pi^*$.

Step $d^2 2$

As described above, when $P_D > Pi_M$ (considered that when the i-th reforming method is performed in the reformer, the electrical output of the fuel cell is insufficient for the fuel cell output demand value $P_D$), the step $d^2 2$ is performed.

A flow rate $fi(Pi_M)$ of the hydrocarbon-based fuel supplied to the reforming catalyst layer required to be supplied to the reforming catalyst layer, in which the i-th reforming method is performed, in order to output the above maximum electrical output $Pi_M$ from the fuel cell is calculated using the above function $Fi = fi(P)$.

When $fi(Pi_M)$ is equal to or less than the reformable flow rate $Fi^R$ obtained in the step $B^2$, $Pi^*=Pi_M$ is set, and $Fi^*=fi(Pi_M)$ is set. $fi(Pi_M) \leq Fi^R$ is considered to mean that when the i-th reforming method is performed in the reformer, the hydrocarbon-based fuel at the flow rate $fi(Pi_M)$ can be reformed in the reforming catalyst layer.

On the other hand, when $fi(Pi_M)$ exceeds the reformable flow rate $Fi^R$ obtained in the step $B^2$, $Pi^*=\{$the maximum value among one or more P values calculated from the function $P=fi^{-1}(Fi^R)\}$ is set, and $Fi^*=Fi^R$ is set. The maximum value among one or more P values calculated from $P=fi^{-1}(Fi^R)$ is inevitably less than $P_D$. $fi(Pi_M)>Fi^R$ is considered to mean that when the i-th reforming method is performed in the reformer, the hydrocarbon-based fuel at the flow rate $fi(Pi_M)$ cannot be reformed in the reforming catalyst layer.

[Step $E^2$]

When there are two or more i for which the reformable flow rate $Fi^R$ obtained in the step $B^2$ is equal to or more than the above minimum value $Fi_{min}$, an electric power generation efficiency at the electrical output $Pi^*$, that is $\eta i=gi(Pi^*)$, is calculated using the function $\eta i=gi(P)$ for each of these two or more i. i that gives the largest $\eta i$ among two or more $\eta i$ calculated in this manner is represented as I.

For example, when there are two i (1 and 2) for which $Fi^R \geq Fi_{min}$, that is, when $F1^R \geq F1_{min}$ and $F2^R \geq F2_{min}$, and $F3^R < F3_{min}$, even if i can be 3, $\eta 1=g1(P1^*)$ and $\eta 2=g2(P2^*)$ are calculated. When the largest $\eta i$ among these $\eta 1$ and $\eta 2$ is $\eta 1$, i that gives the largest $\eta i$ (represented as I) is 1, that is, I=1 is set.

When there are a plurality of largest $\eta i$ among two or more $\eta i$ obtained as described above, i that gives any $\eta i$ among these plurality of $\eta i$ (these have the same value) may be represented as I. For example, among two or more reforming methods in which the reformable flow rate $Fi^R$ determined in the step $B^2$ is equal to or more than the minimum value $Fi_{min}$, i for which the electrical output $Pi^*$ is larger may be set as I.

Then, when $PI^*$ exceeds zero, the electrical output of the fuel cell is set to $PI^*$, the reforming method performed in the reformer is set to an I-th reforming method, and the flow rate of the hydrocarbon-based fuel supplied to the reforming catalyst layer is set to $FI^*$.

When $PI^*$ is zero, the electric power generation in the fuel cell is stopped. In other words, the electrical output of the fuel cell is set to zero. In this case, the following operation may be performed. Namely, among the plurality of reforming methods determined as the i-th reforming methods, a reforming method in which the ratio of the amount of heat generation to the amount of endothermic heat of a reaction is the largest is adopted. The flow rate of the hydrocarbon-based fuel supplied to the reformer is set to $Fi^R$ of this reforming method. Then, it is possible to increase the temperature of the reforming catalyst layer by the heater or the burner or the like annexed to the reformer, until at least $Fi^R \geq Fi_{min}$ is satisfied ($Fi^R$ is obtained by the steps $A^2$ and $B^2$) for at least one i. When $Fi^R \geq Fi_{min}$ for at least one i, the step $D^2$ and the subsequent steps may be performed again.

[Step $F^2$]

When there is only one i for which the reformable flow rate $Fi^R$ obtained in the step $B^2$ is equal to or more than the above minimum value $Fi_{min}$, this only one i is represented as I.

For example, when i for which $Fi^R \geq Fi_{min}$ is only 1, that is, when $F1^R \geq F1_{min}$ and $F2^R < F2_{min}$, and further, when $F3^R < F3_{min}$ even if i can be 3, I=1 is set.

Then, when $PI^*$ exceeds zero, the electrical output of the fuel cell is set to $PI^*$, the reforming method performed in the reformer is set to an I-th reforming method, and the flow rate of the hydrocarbon-based fuel supplied to the reforming catalyst layer is set to $FI^*$.

When $PI^*$ is zero, the electric power generation in the fuel cell is stopped. In other words, the electrical output of the fuel cell is set to zero. In this case, the following operation may be performed. Namely, among the plurality of reforming methods determined as the i-th reforming methods, a reforming method in which the ratio of the amount of heat generation to the amount of endothermic heat of a reaction is the largest is adopted. The flow rate of the hydrocarbon-based fuel supplied to the reformer is set to $Fi^R$ of this reforming method. Then, it is possible to increase the temperature of the reforming catalyst layer by the heater, the burner or the like annexed to the reformer, until at least $Fi^R \geq Fi_{min}$ is satisfied ($Fi^R$ is obtained by the steps $A^2$ and $B^2$) for at least one i. When $Fi^R \geq Fi_{min}$ for at least one i, the step $D^2$ and the subsequent steps may be performed again.

[Example of Load Following Operation]

How operation is performed under various conditions, when the load following operation of one certain fuel cell system is performed, will be described below by giving specific examples using FIGS. 2-2 to 2-5 and 2-7. However, the present invention is not limited thereto.

Correlations between the electrical output and the electric power generation efficiency, when L=2, are shown in FIG. 2-7. At the same electrical output, the electric power generation efficiency is higher in the first reforming method than in the second reforming method. But, when the electrical output is different, the magnitude relationship of the electric power generation efficiency is different. For example, there is a case where the maximum electrical output capable of being generated in a state in which complete reforming is ensured is larger and the electric power generation efficiency is higher in the second reforming method than in the first reforming method. In the present embodiment, it is possible to calculate the electrical output and the hydrocarbon-based fuel flow rate in a state in which complete reforming is ensured and select a reforming method in which the electric power generation efficiency is higher in real time, and therefore, it is possible to maintain the electric power generation efficiency higher, while making the electrical output during the load following operation as large as possible.

<Examples of Calculation of $Pi^*$ and $Fi^*$>

First, a procedure until $Pi^*$ and $Fi^*$ are calculated in the step $D^2$ will be described. However, here, only the first reforming method will be specifically described. For the second reforming method, and also for the third reforming method when there is the third reforming method, $Pi^*$ and $Fi^*$ can be calculated by the same procedure.

It is assumed that the correlation between the electrical output P of the fuel cell and the flow rate F1 of the hydrocarbon-based fuel required to be supplied to the reforming catalyst layer in order to obtain the electrical output P when the reformed gas produced by the first reforming method is supplied to the fuel cell, that is, the functions F1=f1(P) and $P=f1^{-1}(F1)$, have been beforehand obtained as shown in FIG. 2-2 (the correlation is also the same in FIGS. 2-3 to 2-5).

Also, it is assumed that for the same fuel cell system, temperatures $T1_k$ of the reforming catalyst layer and a flow rate $G1_k$ of the hydrocarbon-based fuel corresponding to each $T1_k$ when the first reforming method is performed, have been beforehand set as shown in Table 2. Here, $T1_{N1}=700°$ C. and $G1_{N1}=8$ g/min. These are values inherent to the fuel cell system. Ni=5, that is, five different $T1_k$ have been set.

In addition, $G1_{N1}=8$ g/min≥7 g/min=$F1_{max}$.

TABLE 2

Correspondence between Reforming Catalyst Layer Temperature $T1_k$ and Flow Rate $G1_k$ of Hydrocarbon-Based Fuel That Can Be Reformed

| k | $T1_k$ °C. | $G1_k$ g/min |
|---|---|---|
| 1 | 600 | 1 |
| 2 | 625 | 2 |
| 3 | 650 | 3 |
| 4 | 675 | 5 |
| 5 (N1) | 700 | 8 |

Also, it is assumed that $P1_M=1000$ W and $F1_{min}=1$ g/min have been obtained.

The temperature T of the reforming catalyst layer is measured in the step $A^2$.

(Case 2-1)

A case where $P_D=600$ W as shown in FIG. 2-2 and T=660° C. is considered.

The step $B^2$ is performed. From Table 2, the largest $T1_k$ within the range of T (660° C.) or less is $T1_3$ (650° C.). $G1_k$ ($G1_3$) corresponding to $T1_3$ is 3 g/min. $G1_3$ is adopted as the reformable flow rate $F1^R$. Therefore, $F1^R=3$ g/min.

In this case, $F1^R=3$ g/min≥1 g/min=$F1_{min}$, and therefore, the step $C^2$ is not performed, and the step $D^2$ is performed.

Then, $P_D=600$ W≤1000 W=$P1_M$, and therefore, the step $d^21$, rather than the step $d^22$, is performed.

In the step $d^21$, the flow rate $f1(P_D)$ of the hydrocarbon-based fuel required to be supplied to the reforming catalyst layer, in which the first reforming method is performed, in order to output an electric power of $P_D$ is calculated using the function F1=f1(P). This value is 2 g/min.

$f1(P_D)=2$ g/min≤3 g/min=$F1^R$, and therefore, $P1^*=P_D=600$ W is set, and $F1^*=f1(P_D)=2$ g/min is set. In FIGS. 2-2 to 2-5, a point showing conditions obtained in this manner is marked with a star.

(Case 2-2)

A case where $P_D=900$ W as shown in FIG. 2-3 and T=640° C. is considered. The fuel cell output demand value $P_D$ fluctuates in the load following operation, and $F1^R$ varies depending on the temperature of the reforming catalyst layer. $P1_M=1000$ W and $F1_{min}=1$ g/min are basically values inherent to the fuel cell system, and therefore are the same as the above example.

The step $B^2$ is performed. From Table 2, the largest $T1_k$ within the range of T (640° C.) or less is $T1_2$ (625° C.). $G1_k$ ($G1_2$) corresponding to $T1_2$ is 2 g/min. $G1_2$ is adopted as the reformable flow rate $F1^R$. Therefore, $F1^R=2$ g/min.

In this case, $F1^R=2$ g/min≥1 g/min=$F1_{min}$, and therefore, the step $C^2$ is not performed, and the step $D^2$ is performed.

Then, $P_D=900$ W≤1000 W=$P1_M$, and therefore, the step $d^21$, rather than the step $d^22$, is performed.

In the step $d^21$, the flow rate $f1(P_D)$ of the hydrocarbon-based fuel required to be supplied to the reforming catalyst layer, in which the first reforming method is performed, in order to output an electric power of $P_D$ is calculated using the function F1=f1(P). This value is 3 g/min.

f1(PD)=3 g/min>2 g/min=$F1^R$, and therefore, $P1^*$ is set to a value that is less than $P_D$ and the maximum among one or more P values calculated from P=$f1^{-1}(F1^R)$, and $F1^*=F1^R=2$ g/min is set.

The P values calculated from P=$f1^{-1}(F1^R)$ are 30 W, 600 W, and 800 W. Among these values, the maximum value that is less than $P_D$ (900 W) is 800 W. Therefore, $P1^*=800$ W is set.

(Case 2-3)

A case where $P_D=1200$ W as shown in FIG. 2-4 and T=680° C. is considered. $P1_M=1000$ W and $F1_{min}=1$ g/min are the same as the above examples.

The step $B^2$ is performed. From Table 2, the largest $T1_k$ within the range of T (680° C.) or less is $T1_4$ (675° C.). $G1_k$ ($G1_4$) corresponding to $T1_4$ is 5 g/min. $G1_4$ is adopted as the reformable flow rate $F1^R$. Therefore, $F1^R=5$ g/min.

In this case, $F1^R=5$ g/min≥1 g/min=$F1_{min}$, and therefore, the step $C^2$ is not performed, and the step $D^2$ is performed.

Then, $P_D=1200$ W>1000 W=$P1_M$, and therefore, the step $d^22$, rather than the step $d^21$, is performed.

In the step $d^22$, the flow rate $f1(P1_M)$ of the hydrocarbon-based fuel supplied to the reforming catalyst layer required to be supplied to the reforming catalyst layer, in which the first reforming method is performed, in order to output an electrical output of the maximum electrical output $P1_M$(1000 W) is calculated using the above function F1=f1(P). This value is 4.5 g/min.

$f1(P1_M)=4.5$ g/min≤5 g/min=$F1^R$, and therefore, $P1^*=P1_M=1000$ W is set, and $F1^*=f1(P1_M)=4.5$ g/min is set.

(Case 2-4)

A case where $P_D=1200$ W as shown in FIG. 2-5 and T=640° C. is considered. $P1_M=1000$ W and $F1_{min}=1$ g/min are the same as the above examples.

The step $B^2$ is performed. From Table 2, the largest $T1_k$ within the range of T (640° C.) or less is $T1_2$ (625° C.). $G1_k$ ($G1_2$) corresponding to $T1_2$ is 2 g/min. $G1_2$ is adopted as the reformable flow rate $F1^R$. Therefore, $F1^R=2$ g/min.

In this case, $F1^R=2$ g/min≥1 g/min=$F1_{min}$, and therefore, the step $C^2$ is not performed, and the step $D^2$ is performed.

Then, $P_D=1200$ W>1000 W=$P1_M$, and therefore, the step $d^22$, rather than the step $d^21$, is performed.

In the step $d^22$, the flow rate $f1(P1_M)$ of the hydrocarbon-based fuel supplied to the reforming catalyst layer required to be supplied to the reforming catalyst layer, in which the first reforming method is performed, in order to output an electrical output of the maximum electrical output $P1_M$(1000 W) is calculated using the above function F1=f1(P). This value is 4.5 g/min.

$f1(P1_M)=4.5$ g/min>2 g/min=$F1^R$, and therefore, $P1^*$ is set to the maximum value among one or more P values calculated from P=$f1^{-1}(F1^R)$, and $F1^*=F1^R=2$ g/min is set.

The P values calculated from P=$f1^{-1}(F1^R)$ are 30 W, 600 W, and 800 W. Among these, the maximum value is 800 W. Therefore, $P1^*=800$ W is set.

In the explanation using FIGS. 2-2 to 2-5, a correlation between F1 and P is extreme for explanation. But, it is considered that practically, the correlation may often be close to a correlation as shown in FIG. 2-6. In FIG. 2-6, in a range in which the electrical output P is small, that is, in a range in which the electrical output P is 0 W or more and 300 W or less, the flow rate F1 of the hydrocarbon-based fuel is fixed at 1.5 g/min in order to suitably maintain the SOFC at a temperature at which electric power can be generated. Also, in a range in which the electrical output P is large, that is, in a range in which the electrical output P is greater than 300 W and the maximum electrical output $P1_M$ (1000 W) or less, the flow rate F1 of the hydrocarbon-based fuel increases from 1.5 g/min to 4.5 g/min, correspondingly to the increase of the electrical output P in order to make electric power generation efficiency higher.

<Examples of Determination of Electrical Output of Fuel Cell and Flow Rate of Fuel Supplied to Reformer>

A procedure for determining the electrical output of the fuel cell and the flow rate of the hydrocarbon-based fuel supplied to the reformer, in the step $E^2$ or $F^2$, will be described in detail below.

In the following descriptions, a case where L=2 is considered, and it is assumed that the following values have been obtained.

$P1_M$=1000 W, $P2_M$=900 W,
$F1_{min}$=1 g/min, and $F2_{min}$=2 g/min.

(Case 2-5)

Here, it is assumed that
$P_D$=900 W, and
$F1^R$=2 g/min and $F2^R$=5 g/min
have been determined in the step $B^2$. Also, it is assumed that the functions $\eta1=g1(P)$ and $\eta2=g2(P)$ have been obtained, as shown in FIG. 2-7, for the first and second reforming methods. Further, it is assumed that P1*, F1*, P2*, and F2* have been obtained as follows.
P1*=800 W, F1*=2 g/min,
P2*=900 W, and F2*=4 g/min.

$F1^R$=2 g/min≥1 g/min=$F1_{min}$ and $F2^R$=5 g/min≥2 g/min=$F2_{min}$, and therefore, there are two i (1 and 2) for which $Fi^R \geq Fi_{min}$. Therefore, the step $E^2$, rather than the step $F^2$, is performed.

For each of the two i (1 and 2),
$\eta1=g1(P1^*)$=43%, and
$\eta2=g2(P2^*)$=45%
are obtained from the functions $\eta1=g1(P)$ and $\eta2=g2(P)$, that is, from FIG. 2-7.

The largest $\eta i$ of these $\eta i$ is $\eta2$, and I (i that gives $\eta2$) is 2.

Therefore, the electrical output of the fuel cell is set to PI*, that is, P2* (900 W), the reforming method is set to the second reforming method, and the flow rate of the hydrocarbon-based fuel supplied to the reforming catalyst layer is set to F2*=4 g/min.

(Case 2-6)

Here, it is assumed that
$P_D$=900 W, and
$F1^R$=2 g/min and $F2^R$=1.5 g/min
have been determined in the step $B^2$. Further, it is assumed that P1* and F1* have been obtained as follows. Here, P2* and F2* are not used.
P1*=800 W and F1*=2 g/min.

$F1^R$=2 g/min≥1 g/min=$F1_{min}$, and on the other hand, $F2^R$=1.5 g/min<2 g/min=$F2_{min}$, and therefore, there is only one i (1) for which $Fi^R \geq Fi_{min}$. Therefore, I (this only one i)=1.

Therefore, the electrical output of the fuel cell is set to PI*, that is, P1* (800 W), the reforming method is set to the first reforming method, and the flow rate of the hydrocarbon-based fuel supplied to the reforming catalyst layer is set to F1*=2 g/min.

(Case 2-7)

Here, it is assumed that
$P_D$=900 W, and
$F1^R$=0.5 g/min and $F2^R$=5 g/min
have been determined in the step $B^2$. Further, it is assumed that P2* and F2* have been obtained as follows. Here, P1* and F1* are not used.
P2*=900 W and F2*=4 g/min.

$F1^R$=0.5 g/min<1 g/min=$F1_{min}$ and $F2^R$=5 g/min≥2 g/min=$F2_{min}$, and therefore, there is only one i (2) for which $Fi^R \geq Fi_{min}$. Therefore, I (this only one i)=2.

Therefore, the electrical output of the fuel cell is set to PI*, that is, P2*=900 W, the reforming method is set to the second reforming method, and the flow rate of the hydrocarbon-based fuel supplied to the reforming catalyst layer is set to F2*=4 g/min.

<Case where Step $C^2$ is Performed>

(Case 2-8)

A case where
$F1^R$=0.5 g/min and $F2^R$=1 g/min
have been determined in the step $B^2$, though not shown, is considered.

In this case, $F1^R$=0.5 g/min<1 g/min=$F1_{min}$ and $F2^R$=1 g/min<2 g/min=$F2_{min}$, that is, $Fi^R < Fi_{min}$ for all i, and therefore, the step $D^2$ is not performed, and the step $C^2$ is performed, and the electrical output of the fuel cell is set to zero.

In this case, if the second reforming method is a reforming method in which the ratio of the amount of heat generation to the amount of endothermic heat is the largest among the first and second reforming methods, it is possible to adopt the second reforming method as the reforming method performed in the reformer and to supply the hydrocarbon-based fuel at the flow rate $F2^R$ to the reformer and increase the temperature of the reforming catalyst layer by the heater, the burner or the like annexed to the reformer, until at least $Fi^R \geq Fi_{min}$ is satisfied for at least one i. When the temperature of the reforming catalyst layer increases and $Fi^R \geq Fi_{min}$ is satisfied for at least one i, while the steps $A^2$ to $C^2$ are repeated, the step $D^2$ and the subsequent steps may be performed.

[Way of Setting $Ti_k$ and $Gi_k$ Corresponding to $Ti_k$]

Way of Setting $Ti_k$

When the measured temperature T of the catalyst layer is smaller than the minimum value of $Ti_k$, the step $B^2$ cannot be performed. Therefore, the minimum value of $Ti_k$ is preferably as small as possible and may be, for example, the lowest temperature among temperatures at which the flow rate of the hydrocarbon-based fuel that can be reformed by the i-th reforming method exceeds zero.

It is preferred to make Ni as large as possible within the allowable range of the memory of a control means, in terms of electric power generation efficiency. Particularly, when the increase rate of the flow rate of the hydrocarbon-based fuel that can be reformed by the i-th reforming method increases as the catalyst layer temperature increases, it is preferred to make the interval between $Ti_k$ smaller as the temperature increases.

Way of Setting $Gi_k$ $Gi_k$ is a flow rate of the hydrocarbon-based fuel that can be reformed by the i-th reforming method in the reforming catalyst layer at the corresponding reforming catalyst layer temperature $Ti_k$. Therefore, the flow rate $Gi_k$ of the hydrocarbon-based fuel that can be reformed by the i-th reforming method in the reforming catalyst layer, when the temperature of the reforming catalyst layer is the temperature $Ti_k$, is beforehand obtained, and the correspondence relationship between $Ti_k$ and $Gi_k$ is beforehand set. The way of obtaining $Gi_k$ will be described below.

The flow rate of the hydrocarbon-based fuel that can be reformed in the reforming catalyst layer refers to a flow rate such that when the hydrocarbon-based fuel at this flow rate is supplied to the reforming catalyst layer, the composition of the gas discharged from the reforming catalyst layer becomes a composition suitable to be supplied to the anode of the fuel cell.

For example, the reformable flow rate in the reforming catalyst layer may be any flow rate that is equal to or less than the maximum value of flow rates at which the supplied hydrocarbon-based fuel can be decomposed to a C1 compound(s) (a compound(s) having a carbon number of one). In other words, the reformable flow rate in the reforming catalyst layer may be any flow rate equal to or less than the maximum value of the flow rate of the hydrocarbon-based fuel supplied to the reforming catalyst layer when reforming can proceed in the reforming catalyst layer until a composition is obtained in which a C2+ component(s) (a component(s) having a carbon number of two or more) in the gas at the outlet of the reforming catalyst layer has a concentration which does not cause problems of anode degradation and flow blockage due to carbon deposition, or less. The reformable flow rate may be this maximum value, or may be a value obtained by dividing this maximum value by a safety factor (a value that exceeds 1, for example, 1.4). The concentration of the C2+ component(s) in this case is preferably 50 ppb or less as a mass fraction in the reformed gas. And in this case, it is enough that the gas at the outlet of the reforming catalyst layer is reducing gas. Methane is permitted to be contained in the gas at the outlet of the reforming catalyst layer. In the reforming of the hydrocarbon-based fuel, usually, methane remains in the equilibrium theory. Even if carbon is contained in the gas at the outlet of the reforming catalyst layer in the form of methane, CO, or $CO_2$, carbon deposition can be prevented by adding steam as required. When methane is used as the hydrocarbon-based fuel, it is enough that reforming proceeds so that the gas at the outlet of the reforming catalyst layer becomes reducing.

With respect to the reducing property of the gas at the outlet of the reforming catalyst layer, it is enough that the property is to the extent that if this gas is supplied to the anode, the oxidative degradation of the anode is suppressed. In order to do this, for example, the partial pressures of oxidizing $O_2$, $H_2O$, and $CO_2$, and the like contained in the gas at the outlet of the reforming catalyst layer may be lower than their equilibrium partial pressures of oxidation reactions of the anode electrode. For example, when the anode electrode material is nickel, and the anode temperature is 800° C., the partial pressure of $O_2$ contained in the gas at the outlet of the reforming catalyst layer may be less than $1.2 \times 10^{-14}$ atm ($1.2 \times 10^{-9}$ Pa), the partial pressure ratio of $H_2O$ to $H_2$ may be less than $1.7 \times 10^2$, and the partial pressure ratio of $CO_2$ to CO may be less than $1.8 \times 10^2$.

The reformable flow rate depends on the temperature of the reforming catalyst layer. Therefore, the reformable flow rate in the reforming catalyst layer is obtained based on the temperature of the reforming catalyst layer.

The reformable flow rate $Gi_k$ may be beforehand obtained as a value that corresponds to the temperature $Ti_k$ of the reforming catalyst layer by experiment. Also, it is possible to determine the reformable flow rate by dividing the value obtained by experiment by a safety factor, or offsetting the temperature to the safe side. The unit of $Gi_k$ is, for example, g/min or mol/s. The reformable flow rate $Gi_k$ may be a value that corresponds to only the temperature $Ti_k$. But, this is not limiting, and the reformable flow rate $Gi_k$ may be a value that also corresponds to, in addition to the temperature $Ti_k$, a variable other than $Ti_k$, such as the volume of the catalyst layer or the concentration of the gas component. In this case, when the reformable flow rate $Gi_k$ is obtained, it is possible to appropriately obtain a variable other than $Ti_k$, and obtain the reformable flow rate $Gi_k$ from the variable other than $Ti_k$ and the measured $Ti_k$.

In preliminary experiment for obtaining $Gi_k$, the temperature measurement position in the reforming catalyst layer may be one point or a plurality of points. Also, a representative temperature, such as the average value of a plurality of points, or the like may be used as the temperature of the reforming catalyst layer.

It is possible to consider a plurality of divided regions into which the reforming catalyst layer is divided along the gas flow direction, measure temperatures at a plurality of points in the reforming catalyst layer at different positions along the gas flow direction, obtain based on these temperatures one or more flow rates of the fuel that can be reformed in one or more of the plurality of divided regions, and set the total value of the obtained flow rate(s) as the flow rate of the fuel that can be reformed in the reforming catalyst layer.

When the temperature T of the reforming catalyst layer during actual operation is obtained in the step $A^2$, it is desired to measure the temperature of the reforming catalyst layer as in the preliminary experiment for obtaining $Gi_k$. In other words, it is desired to measure the temperature of the reforming catalyst layer at the same position(s) as in the preliminary experiment. When a representative temperature or the like is used in the preliminary experiment, it is desired to use the same representative temperature as the temperature T of the reforming catalyst layer also in the step $A^2$.

[Others]

Also, by interconnecting the fuel cell to a system power supply, the shortage of the electrical output of the fuel cell with respect to an electric power load may be supplied from the system power supply.

The fuel cell output demand value $P_D$ may be a value of an electric power load measured by an appropriate electric power meter. Alternatively, when the fuel cell is interconnected to another power generator or storage battery, part of a measured electric power load may be set as the fuel cell output demand value $P_D$.

In the step $E^2$, $F^2$ or the like, when the flow rate of the hydrocarbon-based fuel is determined, it is possible to accordingly determine the flow rates of fluids supplied to the indirect internal reforming SOFC, other than the hydrocarbon-based fuel, and the input and output of electricity to and from the indirect internal reforming SOFC, other than the output of the SOFC, by calculating from functions of the electrical output P obtained beforehand, as required.

The present invention is particularly effective when the hydrocarbon-based fuel supplied to the reforming catalyst layer includes a hydrocarbon-based fuel having a carbon number of two or more. According to the present invention, it is possible to allow the concentration of a compound(s) having a carbon number of two or more in the reformed gas to be 50 ppb or less on a mass basis even in load following operation. And thereby, anode degradation and flow blockage due to carbon deposition can be more reliably prevented.

In order to perform the method of the present invention, appropriate instrumentation controlling equipment, including a computing means, such as a computer, may be used.

Third Embodiment

The third embodiment of the method of the present invention will be described below.

[$Pi_j$, and $Fi_j$ and $\eta i$ that Correspond to $Pi_j$]

In this embodiment, Mi different fuel cell electrical outputs $Pi_j$ (j is an integer of 1 or more and Mi or less, where Mi is an integer of 2 or more) and a flow rate $Fi_j$ of the hydrocarbon-based fuel that corresponds to each $Pi_j$ when a reformed gas produced by the i-th reforming method is supplied to the fuel cell to generate electric power, are beforehand set for every i. Also, an electric power generation efficiency $\eta i_j$ at each $Pi_j$ is beforehand obtained.

Each $Fi_j$ is a flow rate of the hydrocarbon-based fuel required to be supplied to the reforming catalyst layer in order to output the corresponding electrical output $Pi_j$ from the fuel cell when the i-th reforming method is performed in the reforming catalyst layer. For example, the flow rate $Fi_j$ of the hydrocarbon-based fuel that corresponds to each $Pi_j$ may be set by beforehand determining an electric current and a fuel utilization rate for each $Pi_j$ by preliminary experiment, simulation, or the like so that the electric power generation efficiency is as high as possible, while the SOFC is maintained at a temperature at which electric power can be suitably generated. In doing so, the electric power generation efficiency $\eta i_j$ at each $Pi_j$ may be simultaneously obtained.

Each $Pi_j$ is 0 or more. In other words, for all i and j, $0 \leq Pi_j$. Also, $Pi_j$ increases with the increase of j. In other words, $Pi_j < Pi_{j+1}$ (here, j is an integer of 1 or more and Mi−1 or less).

Further, each $Fi_j$ is larger than 0. In other words, for all i and j, $0 < Fi_j$.

For every i, $Pi_1$ that is $Pi_j$ when j is 1 is 0, and $Pi_j$ when j is Mi (that is, $Pi_{Mi}$) is the maximum electrical output of the fuel cell when the i-th reforming method is performed in the reforming catalyst layer. $Pi_{Mi}$ is beforehand determined as one of the specifications of the fuel cell system.

For each i, the minimum value and maximum value among $Fi_j$ for all j are represented as $Fi_{min}$ and $Fi_{max}$, respectively. In other words, when a certain i is given, the minimum value and maximum value among $Fi_j$ for all j are represented as $Fi_{min}$ and $Fi_{max}$, respectively.

It is preferred to make Mi as large as possible within the allowable range of the memory of a control means, in terms of electric power generation efficiency.

[Operation Conditions Other than Fuel Flow Rate and Fuel Cell Electrical Output]

Also, for each reforming method, the flow rates of fluids supplied to the indirect internal reforming SOFC, other than the hydrocarbon-based fuel, and the input and output of electricity to and from the indirect internal reforming SOFC, other than the output of the fuel cell, may be beforehand set correspondingly to each $Pi_j$, as required. For example, in order to suppress carbon deposition, the flow rate of water supplied to the reformer may be beforehand set so that the steam/carbon ratio (ratio of the number of moles of water molecules to the number of moles of carbon atoms in the gas supplied to the reforming catalyst layer) has a predetermined value. The flow rate of air supplied to the reformer may be beforehand set so that the oxygen/carbon ratio (ratio of the number of moles of oxygen molecules to the number of moles of carbon atoms in the gas supplied to the reforming catalyst layer) has a predetermined value. The flow rate of fluids supplied to the indirect internal reforming SOFC, other than the water and air supplied to the reformer, and the input and output of electricity to and from the indirect internal reforming SOFC may be beforehand set by preliminary experiment, simulation, or the like so that the electric power generation efficiency is as high as possible, while the SOFC is maintained at a temperature at which electric power can be suitably generated. By doing so, these flow rates and electrical input and output may be determined using beforehand obtained functions, when the output of the fuel cell is set to a certain value P.

Or, the flow rates of fluids supplied to the indirect internal reforming SOFC, other than the hydrocarbon-based fuel, and the input and output of electricity to and from the indirect internal reforming SOFC, other than the output of the fuel cell, may be functions of the flow rate of the hydrocarbon-based fuel. For example, the flow rate of water supplied to the reformer may be a flow rate at which the steam/carbon ratio has a constant value, in order to suppress carbon deposition. The flow rate of air supplied to the reformer may be a flow rate at which the oxygen/carbon ratio has a constant value.

Or, the flow rates of fluids supplied to the indirect internal reforming SOFC, other than the hydrocarbon-based fuel, and the input and output of electricity to and from the indirect internal reforming SOFC, other than the output of the fuel cell, may be values obtained by appropriate control techniques according to the control purposes.

For example, the flow rate of air supplied to the cathode may be set so that the SOFC can be maintained at a temperature at which electric power can be suitably generated.

The output of the electrical heater annexed to the reformer may be set so that the reforming catalyst layer can be maintained at a predetermined temperature (for example, so that the reforming catalyst layer can be maintained at a temperature preferred for reforming).

When a burner for heating the catalyst layer is annexed to the reformer, the fuel flow rate may be set so that the reforming catalyst layer can be maintained at a predetermined temperature, and the air flow rate may be a flow rate at which the air ratio has a predetermined value (for example, a value preferred for combustion).

The output of the electrical heater annexed to the vaporizer may be set so that the steam can be maintained at a predetermined temperature (for example, so that the steam temperature at the reformer inlet can be maintained at a temperature preferred for reforming).

When a burner for heating is annexed to the vaporizer, the fuel flow rate may be set so that the steam can be maintained at a predetermined temperature, and the air flow rate may be a flow rate at which the air ratio has a predetermined value.

When a burner for heating is annexed in the vicinity of the SOFC, the fuel flow rate may be set so that the SOFC can be maintained at a temperature at which electric power can be suitably generated, and the air flow rate may be a flow rate at which the air ratio has a predetermined value.

When a heat exchanger for cooling the SOFC is disposed in the vicinity of the SOFC, the flow rate of a cooling fluid supplied to the heat exchanger may be set so that the SOFC can be maintained at a temperature at which electric power can be suitably generated.

When a heat exchanger for cooling the reforming catalyst layer is annexed in the vicinity of the reforming catalyst layer closest to the SOFC, in order to cool the SOFC by increasing the methane concentration in the reformed gas by an equilibration reaction and causing an endothermic reaction on the anode of the SOFC, the flow rate of a cooling fluid supplied to the heat exchanger may be set so that the SOFC can be maintained at a temperature at which electric power can be suitably generated.

[Steps $A^3$ to $F^3$]

By preferably repeatedly performing steps $A^3$ to $F^3$, that is, repeatedly performing the steps $A^3$, $B^3$, $C^3$ and $D^3$, and the step $E^3$ or $F^3$ in this order, during load following operation, reforming can be more reliably performed to more reliably prevent the degradation of the anode and higher electric power generation efficiency can be obtained.

FIG. 3 shows a flow chart for explaining the steps $A^3$ to $F^3$.

[Step $A^3$]

When load fluctuation operation is actually performed, the step $A^3$ of measuring the temperature of the reforming catalyst layer is performed. This measurement may be continuously performed while the load following operation is performed.

The step $A^3$ is performed to find the temperature T of the reforming catalyst layer. Temperature T is used when a reformable flow rate $Fi^R$ described later is obtained. The step $A^3$ is preferably started in a time as short as possible from the point of time of the start of the load following operation. The step $A^3$ is preferably started immediately after the load following operation is started. When the monitoring (continuous measurement) of the temperature of the reforming catalyst layer has been performed since before the start of the load following operation, the temperature monitoring may be continuously performed as it has been.

An appropriate temperature sensor, such as a thermocouple, may be used for the temperature measurement.

[Step $B^3$]

In the step $B^3$, for every i, the flow rate (reformable flow rate $Fi^R$) of the hydrocarbon-based fuel that can be reformed in the reforming catalyst layer at the temperature T (the temperature measured in the step $A^3$) is calculated. In other words, when L=2, $F1^R$ and $F2^R$ are calculated. The calculation method will be described in detail later.

[Step $C^3$]

When the reformable flow rate $Fi^R$ obtained in the step $B^3$ is smaller than the minimum value $Fi_{min}$ for every i, electric power generation in the fuel cell is stopped. In other words, when $Fi^R < Fi_{min}$ for all i, it is considered that the requisite minimum reformed gas cannot be reformed, and therefore, the electrical output of the fuel cell is set to zero. In this case, the following operation may be performed. Namely, among the plurality of reforming methods determined as the i-th reforming methods, a reforming method in which the ratio of the amount of heat generation to the amount of endothermic heat of a reaction is the largest is adopted. The flow rate of the hydrocarbon-based fuel supplied to the reformer is set to $Fi^R$ of this reforming method. Then, it is possible to increase the temperature of the reforming catalyst layer by the heater, the burner or the like annexed to the reformer, until at least $Fi^R \geq Fi_{min}$ is satisfied ($Fi^R$ is obtained by the steps $A^3$ and $B^3$) for at least one i. When $Fi^R \geq Fi_{min}$ for at least one i, the step $D^3$ and the subsequent steps may be performed.

[Step $D^3$]

When the reformable flow rate $Fi^R$ obtained in the step $B^3$ is equal to or more than the above minimum value $Fi_{min}$ for at least one i, the step $D^3$ is performed. In other words, when there is even one i for which $Fi^R \geq Fi_{min}$, for example, when $F1^R \geq F1_{min}$, the step $D^3$ is performed.

In the step $D^3$, for each of this at least one i, that is, for each of i for which $Fi^R \geq Fi_{min}$, step $d^3 1$ is performed if a fuel cell output demand value $P_D$ is equal to or less than the maximum electrical output $Pi_{Mi}$ of the fuel cell. $P_D \leq Pi_{Mi}$ is considered to mean that when the i-th reforming method is performed in the reformer, the fuel cell can output the fuel cell output demand value $P_D$.

Or, for each of this at least one i, that is, for each of i for which $Fi^R \geq Fi_{min}$, step $d^3 2$ is performed if the fuel cell output demand value $P_D$ exceeds the maximum electrical output $Pi_{Mi}$ of the fuel cell. $P_D > Pi_{Mi}$ is considered to mean that when the i-th reforming method is performed in the reformer, the electrical output of the fuel cell is insufficient for the fuel cell output demand value $P_D$.

<Step $d^3 1$>

In the step $d^3 1$, first, in order to make a further judgment, a value of $Fi_{DS}$ is obtained. Here, $Fi_{DS}$ has a meaning of a flow rate of the hydrocarbon-based fuel corresponding to a $Pi_j$ which is close to the fuel cell output demand value $P_D$, obtained for judging on the safe side whether reforming is possible or not.

Whether there is, among $Pi_j$ for all j, a $Pi_j$ that is equal to the fuel cell output demand value $P_D$ is checked.

When there is a $Pi_j$ that is equal to $P_D$, $Fi_j$ that corresponds to this $Pi_j (=P_D)$ is obtained using the correspondence relationship between $Pi_j$ and $Fi_j$, which has been beforehand set, and this $Fi_j$ is substituted to $Fi_{DS}$. Also in the following descriptions, when obtaining $Pi_j$ that corresponds to $Fi_j$, or $Fi_j$ that corresponds to $Pi_j$, the correspondence relationship between $Pi_j$ and $Fi_j$ beforehand determined is used.

When there is, among $Pi_j$ for all j, no $Pi_j$ that is equal to $P_D$, the larger one among a $Fi_j$ corresponding to "the smallest $Pi_j$ that exceeds $P_D$" and a $Fi_j$ corresponding to "the largest $Pi_j$ that is less than $P_D$" (when these two values are equal, the very value) is set as $Fi_{DS}$ in order to judge on the safer side whether reforming is possible or not.

Next, this $Fi_{DS}$ is compared with the above calculated reformable flow rate $Fi^R$.

Case where $Fi_{DS} \leq Fi^R$

When $Fi_{DS}$ is equal to or less than the reformable flow rate $Fi^R$, $Pi^* = P_D$ and $Fi^* = Fi_{DS}$ are set. $Fi_{DS} \leq Fi^R$ is considered to mean that the hydrocarbon-based fuel at the flow rate $Fi_{DS}$ can be reformed in the reforming catalyst layer when the i-th reforming method is performed in the reformer.

$Pi^*$ and $Fi^*$ are variables that are candidates for the electrical output of the fuel cell and the flow rate of the hydrocarbon-based fuel supplied to the reformer which are finally set, respectively.

Case where $Fi_{DS} > Fi^R$

When $Fi_{DS}$ exceeds the above reformable flow rate $Fi^R$, the following step (3-1) or (3-2) is performed. $Fi_{DS} > Fi^R$ is considered to mean that the hydrocarbon-based fuel at the flow rate $Fi_{DS}$ cannot be totally reformed in the reforming catalyst layer.

(3-1) Case where there is a $Pi_j$ Corresponding to $Fi_j$ that is Equal to or Less than $Fi^R$ within a Range of Less than Fuel Cell Output Demand Value $P_D$ In this case, $PI = \{$the maximum value among the above $Pi_j$ ($Pi_j$ that is less than $P_D$ and that corresponds to $Fi_j$ that is equal to or less than $Fi^R$) and $FI^* = (Fi_j$ corresponding to this maximum value) are set.

(3-2) Case where there is no $Pi_j$ Corresponding to $Fi_j$ that is Equal to or Less than $Fi^R$ within a Range of Less than Fuel Cell Output Demand Value $P_D$ In this case, $Pi^* = 0$ and $Fi^* = Fi^R$ are set.

<Step $d^3 2$>

As described above, the step $d^3 2$ is performed when it is judged that the electrical output of the fuel cell is insufficient for the fuel cell output demand value $P_D$.

In this step, $Fi_{Mi}$ ($Fi_j$ corresponding to the maximum electrical output $Pi_{Mi}$) is compared with the above reformable flow rate $Fi^R$.

Case where $Fi_{Mi} \leq Fi^R$

When $Fi_{Mi}$ is equal to or less than the above reformable flow rate $Fi^R$, $Pi^* = Pi_{Mi}$ and $Fi^* = Fi_{Mi}$ are set. $Fi_{Mi} \leq Fi^R$ is considered to mean that the hydrocarbon-based fuel at the flow rate $Fi_{Mi}$ can be reformed in the reforming catalyst layer.

Case where $Fi_{Mi} > Fi^R$

When $Fi_{Mi}$ exceeds the above reformable flow rate $Fi^R$, $Pi^* = $ (the maximum value among $Pi_j$ corresponding to $Fi_j$ that is equal to or less than $Fi^R$), and $Fi^* = (Fi_j$ that corresponds to this maximum value)

are set. $Fi_{Mi} > Fi^R$ is considered to mean that the hydrocarbon-based fuel at the flow rate $Fi_{Mi}$ cannot be totally reformed in the reforming catalyst layer.

[Step $E^3$]

When there are two or more i for which the reformable flow rate $Fi^R$ determined in the step $B^3$ is equal to or more than the minimum value $Fi_{min}$, $\eta i$ that corresponds to $Pi^*$ determined in the step $D^3$ is obtained for each of these two or more i. i that gives the largest among two or more $\eta i$ obtained in this manner is represented as I.

For example, when there are two i (1 and 2) for which $Fi^R \geq Fi_{min}$, that is, when $F1^R \geq F1_{min}$ and $F2^R \geq F2_{min}$, and $F3^R<F3_{min}$ even if i can be 3, η1 that corresponds to P1* determined in the step $D^3$, and η2 that corresponds to P2* determined in the step $D^3$ are obtained. When the largest ηi of these η1 and η2 is η1, that gives the largest ηi (represented as I) is 1, that is, I=1 is set.

When there are a plurality of largest ηi among two or more ηi obtained as described above, i that gives any ηi among the plurality of ηi (these have the same value) may be represented as I. For example, among two or more reforming methods in which the reformable flow rate $Fi^R$ determined in the step $B^3$ is equal to or more than the minimum value $Fi_{min}$, i for which the electrical output Pi* is larger may be set as I.

Then, when PI* exceeds zero, the electrical output of the fuel cell is set to PI*, the reforming method performed in the reformer is set to an I-th reforming method, and the flow rate of the hydrocarbon-based fuel supplied to the reforming catalyst layer is set to FI*.

When PI* is zero, the electric power generation in the fuel cell is stopped. In other words, the electrical output of the fuel cell is set to zero. In this case, the following operation may be performed. Namely, among the plurality of reforming methods determined as the i-th reforming methods, a reforming method in which the ratio of the amount of heat generation to the amount of endothermic heat of a reaction is the largest is adopted. The flow rate of the hydrocarbon-based fuel supplied to the reformer is set to $Fi^R$ of this reforming method. Then, it is possible to increase the temperature of the reforming catalyst layer by the heater, the burner or the like annexed to the reformer, until at least $Fi^R \geq Fi_{min}$ is satisfied ($Fi^R$ is obtained by the steps $A^3$ and $B^3$) for at least one i. When $Fi^R \geq Fi_{min}$ for at least one i, the step $D^3$ and the subsequent steps may be performed again.

[Step $F^3$]

When there is only one i for which the reformable flow rate $Fi^R$ determined in the step $B^3$ is equal to or more than the minimum value $Fi_{min}$, this only one i is represented as I.

For example, when i for which $Fi^R \geq Fi_{min}$ is only 1, that is, when $F1^R \geq F1_{min}$ and $F2^R < F2_{min}$, and further, when $F3^R < F3_{min}$ even if i can be 3, I=1 is set.

Then, when PI* exceeds zero, the electrical output of the fuel cell is set to PI*, the reforming method performed in the reformer is set to an I-th reforming method, and the flow rate of the hydrocarbon-based fuel supplied to the reforming catalyst layer is set to FI*.

When PI* is zero, the electric power generation in the fuel cell is stopped. In other words, the electrical output of the fuel cell is set to zero. In this case, the following operation may be performed. Namely, among the plurality of reforming methods determined as the i-th reforming methods, a reforming method in which the ratio of the amount of heat generation to the amount of endothermic heat of a reaction is the largest is adopted. The flow rate of the hydrocarbon-based fuel supplied to the reformer is set to $Fi^R$ of this reforming method. Then, it is possible to increase the temperature of the reforming catalyst layer by the heater, the burner or the like annexed to the reformer, until at least $Fi^R \geq Fi_{min}$ is satisfied ($Fi^R$ is obtained by the steps $A^3$ and $B^3$) for at least one i. When $Fi^R \geq Fi_{min}$ for at least one i, the step $D^3$ and the subsequent steps may be performed again.

[Example of Load Following Operation]

How operation is performed under various conditions, when the load following operation of one certain fuel cell system is performed, will be described below by giving specific examples. However, the present invention is not limited thereto.

<Examples of Determination of Pi* and Fi*>

First, a procedure until Pi* and Fi* are determined in the step $D^3$ will be described. However, here, only the first reforming method will be specifically described. For the second reforming method, and also for the third reforming method when there is the third reforming method, Pi* and Fi* can be obtained by the same procedure.

First, it is assumed that for a fuel cell system, electrical outputs $P1_j$ and a flow rate $F1_j$ of the hydrocarbon-based fuel corresponding to each $P1_j$ in the case of performing the first reforming method have been beforehand set as shown in Table 3-1. Here, $P1_{M1}=700$ W and $F1_{min}=1$ g/min. These are values inherent to this fuel cell system. On the other hand, $P_D$ may fluctuate according to electric power demand, and $F1^R$ may fluctuate according to the reforming catalyst layer temperature. In addition, M1=7, that is, seven different $P1_j$ have been set.

TABLE 3-1

Correspondence between Electrical Output $P1_j$ and Flow Rate $F1_j$ of Hydrocarbon-Based Fuel

| j | $P1_j$ W | $F1_j$ g/min |
|---|---|---|
| 1 | 0 | 2 |
| 2 | 200 | 3 |
| 3 | 300 | 3 |
| 4 | 400 | 4 |
| 5 | 500 | 3 |
| 6 | 600 | 1 |
| 7 (M1) | 700 | 5 |

The temperature T of the reforming catalyst layer is measured in the step $A^3$, and the reformable flow rate $F1^R$ is calculated in the step $B^3$.

(Case 3-1)

A case where $P_D=450$ W and $F1^R=6$ g/min is considered.

$F1^R=6$ g/min≥1 g/min=$F1_{min}$, and therefore, the step $C^3$ is not performed, and the step $D^3$ is performed.

Then, $P_D=450$ W≥700 W=$P1_{M1}$, and therefore, the step $d^31$, rather than the step $d^32$, is performed.

In the step $d^31$, first, $F1_{DS}$ is obtained. From Table 3-1, it is seen that there is no $P_i$ that is equal to $P_D$ (450 W). Therefore, "$F1_j$ corresponding to the smallest $P1_j$ that exceeds $P_D$" and "$F1_j$ corresponding to the largest $P1_j$ that is less than $P_D$" are obtained from Table 3-1. The smallest $P1_j$ that exceeds $P_D$ is 500 W ($P1_5$), and $F1_j$ ($F1_5$) corresponding to $P1_5$ is 3 g/min. The largest $P1_j$ that is less than $P_D$ is 400 W ($P1_4$), and $F1_j$ ($F1_4$) corresponding to $P1_4$ is 4 g/min. The not smaller one among $F1_5$ and $F1_4$, that is, $F1_4$, is set as $F1_{DS}$. Therefore, $F1_{DS}=4$ g/min.

$F1_{DS}$ is compared with $F1^R$. $F1_{DS}=4$ g/min≤6 g/min=$F1^R$, and therefore, $P1^*=P_D=450$ W and $F1^*=F1_{DS}=4$ g/min are set.

(Case 3-2)

A case where $P_D=400$ W and $F1^R=6$ g/min is considered.

$F1^R=6$ g/min≥1 g/min=$F1_{min}$, and therefore, the step $C^3$ is not performed, and the step $D^3$ is performed.

Then, $P_D=400$ W≤700 W=$P1_{M1}$, and therefore, the step $d^31$, rather than the step $d^32$, is performed.

In the step $d^31$, first, $F1_{DS}$ is obtained. From Table 3-1, there is $P1_i$ ($P1_4$) that is equal to $P_D$ (400 W), therefore, $F1_4$ is set as $F1_{DS}$. Therefore, $F1_{DS}=4$ g/min.

$F1_{DS}$ is compared with $F1^R$. $F1_{DS}=4$ g/min≤6 g/min=$F1^R$, and therefore, $P1^*=P_D=400$ W and $F1^*=F1_{DS}=4$ g/min are set.

(Case 3-3)

A case where $P_D=350$ W and $F1^R=3$ g/min is considered.

$F1^R=3$ g/min≥1 g/min=$F1_{min}$, and therefore, the step $C^3$ is not performed, and the step $D^3$ is performed.

Then, $P_D=350$ W≤700 W=$P1_{M1}$, and therefore, the step $d^31$, rather than the step $d^32$, is performed.

In the step $d^31$, first, $F1_{DS}$ is obtained. From Table 3-1, it is seen that there is no $P1_j$ that is equal to $P_D$ (350 W). Therefore, "$F1_j$ corresponding to the smallest $P1_j$ that exceeds $P_D$" and "$F1_j$ corresponding to the largest $P1_j$ that is less than $P_D$" are obtained from Table 3-1. The smallest $P1_j$ that exceeds $P_D$ is 400 W ($P1_4$), and $F1_j$ ($F1_4$) corresponding to $P1_4$ is 4 g/min. The largest $P1_j$ that is less than $P_D$ is 300 W ($P1_3$), and $F1_j$ ($F1_3$) corresponding to $P1_3$ is 3 g/min. The not smaller one of $F1_4$ and $F1_3$, that is, $F1_4$ is set as $F1_{DS}$. Therefore, $F1_{DS}=4$ g/min.

$F1_{DS}$ is compared with $F1^R$. $F1_{DS}=4$ g/min>3 g/min=$F1^R$, and therefore, the above-described step (3-1) or (3-2) is performed depending on the situation. Specifically, there is a $P1_j$ that is less than $P_D$ and that corresponds to $F1_j$ that is equal to or less than $F1^R$, and therefore, the step (3-1) is performed.

$P1_j$ corresponding to $F1_j$ that is equal to or less than $F1^R$ (that is, 3 g/min) within the range of less than $P_D$ (that is, less than 350 W) are $P1_1$ (0 W), $P1_2$ (200 W), and $P1_3$ (300 W). The maximum value of these is $P1_3$ (300 W). $F1_j$ ($F1_3$) corresponding to this maximum value $P1_3$ is 3 g/min.

Therefore, PI*=$P1_3$=300 W and F1*=$F1_3$=3 g/min are set.

(Case 3-4)

A case where $P_D=350$ W and $F1^R=1$ g/min is considered.

$F1^R=1$ g/min≥1 g/min=$F1_{min}$, and therefore, the step $C^3$ is not performed, and the step $D^3$ is performed.

Then, $P_D=350$ W<700 W=$P1_{M1}$, and therefore, the step $d^31$, rather than the step $d^32$, is performed.

In the step $d^31$, first, $F1_{DS}$ is obtained. From Table 3-1, it is seen that there is no $P1_j$ that is equal to $P_D$ (350 W). Therefore, "$F1_j$ corresponding to the smallest $P1_j$ that exceeds $P_D$" and "$F1_j$ corresponding to the largest $P1_j$ that is less than $P_D$" are obtained from Table 3-1. The smallest $P1_j$ that exceeds $P_D$ is 400 W ($P1_4$), and $F1_j$ ($F1_4$) corresponding to $P1_4$ is 4 g/min. The largest $P1_j$ that is less than $P_D$ is 300 W ($P1_3$), and $F1_j$ ($F1_3$) corresponding to $P1_3$ is 3 g/min. The not smaller one among $F1_4$ and $F1_3$, that is, $F1_4$ is set as $F1_{DS}$. Therefore, $F1_{DS}=4$ g/min.

$F1_{DS}$ is compared with $F1^R$. $F1_{DS}=4$ g/min>1 g/min=$F1^R$, and therefore, the above-described step (3-1) or (3-2) is performed depending on the situation. Specifically, there is no $P1_j$ that is less than $P_D$ and that corresponds to $F1_j$ that is equal to or less than $F1^R$, and therefore, the step (3-2) is performed. More specifically, $F1_j$ corresponding to $P1_j$ within the range of less than $P_D$ are $F1_1$, $F1_2$, and $F1_3$, and these are all larger than $F1^R$ (1 g/min). Therefore, there is no $P1_j$ that is less than $P_D$ and that corresponds to $F1_j$ that is equal to or less than $F1^R$.

Therefore, in the step (3-2), P1*=0 W and F1*=$F1^R$ (1 g/min) are set.

(Case 3-5)

A case where $P_D=800$ W and $F1^R=6$ g/min is considered.

$F1^R=6$ g/min≥1 g/min=$F1_{min}$, and therefore, the step $C^3$ is not performed, and the step $D^3$ is performed.

Then, $P_D=800$ W>700 W=$P1_{M1}$, and therefore, the step $d^32$, rather than the step $d^31$, is performed.

In the step $d^32$, $F1_{M1}$ is compared with $F1^R$. $F1_{M1}=5$ g/min≤6 g/min=$F1^R$, and therefore,
P1*=$P1_{M1}$=700 W and F1*=$F1_{M1}$=5 g/min are set.

(Case 3-6)

A case where $P_D=800$ W and $F1^R=3$ g/min is considered.

$F1^R=3$ g/min≥1 g/min=$F1_{min}$, and therefore, the step $C^3$ is not performed, and the step $D^3$ is performed.

Then, $P_D=800$ W>700 W=$P1_{M1}$, and therefore, the step $d^32$, rather than the step $d^31$, is performed.

In the step $d^32$, $F1_{M1}$ is compared with $F1^R$. $F1_{M1}=5$ g/min>3 g/min=$F1^R$, and therefore, the following step is performed.

$P1_j$ corresponding to $F1_j$ that is equal to or less than $F1^R$ (that is, 3 g/min) are $P1_1$ (0 W), $P1_2$ (200 W), $P1_3$ (300 W), $P1_5$ (500 W), and $P1_6$ (600 W). The maximum value of these is $P1_6$ (600 W). $F1_j$ ($F1_6$) corresponding to this maximum value $P1_6$ is 1 g/min.

Therefore, PI*=$P1_3$=600 W and FI*=$F1_3$=1 g/min are set.

The correspondence shown in Table 3-1 is extreme for explanation. But, it is considered that practically, the correspondence may often be close to a correspondence as shown in Table 3-2. In Table 3-2, in a range in which the electrical output $Pi_j$ is small, that is, in a range in which the electrical output $Pi_j$ is 0 W or more and 300 W or less, the flow rate $Fi_j$ of the hydrocarbon-based fuel is fixed at 1.0 g/min in order to suitably maintain the SOFC at a temperature at which electric power can be generated. Also, in a range in which the electrical output $Pi_j$ is large, that is, in a range in which the electrical output $Pi_j$ is 400 W or more and the maximum electrical output $Pi_{MI}$ (1000 W) or less, the flow rate $Fi_j$ of the hydrocarbon-based fuel increases from 1.5 g/min to 4.5 g/min, correspondingly to the increase of the electrical output $Pi_j$ in order to make electric power generation efficiency higher.

TABLE 3-2

General Correspondence between Electrical Output $Pi_j$ and Flow Rate $Fi_j$ of Hydrocarbon-Based Fuel

| j | $Pi_j$ (W) | $Fi_j$ (g/min) |
|---|---|---|
| 1 | 0 | 1.0 |
| 2 | 100 | 1.0 |
| 3 | 200 | 1.0 |
| 4 | 300 | 1.0 |
| 5 | 400 | 1.5 |
| 6 | 500 | 2.0 |
| 7 | 600 | 2.5 |
| 8 | 700 | 3.0 |
| 9 | 800 | 3.5 |
| 10 | 900 | 4.0 |
| 11 (Mi) | 1000 | 4.5 |

<Examples of Determination of Electrical Output of Fuel Cell and Flow Rate of Fuel Supplied to Reformer>

A procedure for determining the electrical output of the fuel cell and the flow rate of the hydrocarbon-based fuel supplied to the reformer, in the step $E^3$ or $F^3$, will be described in detail below.

In the following descriptions, a case where L=2 is considered, and it is assumed that the following values have been obtained.

$F1_{min}=1$ g/min and $F2_{min}=2$ g/min.

It is assumed that the correspondence between a fuel cell electrical output and an electric power generation efficiency at this output has been obtained for each of the first reforming method and the second reforming method, as shown in Table 3-3 and Table 3-4. At the same electrical output, the electric power generation efficiency is higher in the first reforming method than in the second reforming method. But, when the electrical output is different, the magnitude relationship of the electric power generation efficiency is different. For example, there is a case where the maximum electrical output capable of being generated in a state in which complete reforming is ensured is larger and the electric power generation efficiency is higher in the second reforming method than in the first reforming method. In the present embodiment, it is possible to determine an electrical output and a hydrocarbon-based fuel flow rate in a state in which complete reforming is ensured and determine a reforming method in which the electric power generation efficiency is higher in real time, and therefore, it is possible to maintain the electric power generation efficiency higher, while making the electrical output during the load following operation as large as possible.

TABLE 3-3

Correspondence Table between Electrical Output $P1_j$ and Flow Rate $\eta1_j$ of Hydrocarbon-Based Fuel

| j | $P1_j$ W | $\eta1_j$ % |
|---|---|---|
| 1 | 0 | 0 |
| 2 | 200 | 12 |
| 3 | 300 | 18 |
| 4 | 400 | 24 |
| 5 | 500 | 30 |
| 6 | 600 | 36 |
| 7 (M1) | 700 | 42 |

TABLE 3-4

Correspondence Table between Electrical Output $P2_j$ and Flow Rate $\eta2_j$ of Hydrocarbon-Based Fuel

| j | $P2_j$ W | $\eta2_j$ % |
|---|---|---|
| 1 | 0 | 0 |
| 2 | 150 | 8 |
| 3 | 300 | 17 |
| 4 | 400 | 22 |
| 5 | 500 | 28 |
| 6 (M2) | 600 | 33 |

(Case 3-7)

Here, it is assumed that
$P_D$=600 W, and
$F1^R$=2 g/min and $F2^R$=5 g/min
have been calculated in the step $B^3$. Further, it is assumed that
P1*=500 W, F1*=2 g/min,
P2*=600 W, and F2*=4 g/min
have been determined in the step $D^3$.

$F1^R$=2 g/min≥1 g/min=$F1_{min}$ and $F2^R$=5 g/min≥2 g/min=$F2_{min}$, and therefore, there are two i (that is, 1 and 2) for which $Fi^R$≥$Fi_{min}$. Therefore, the step $E^3$, rather than the step $F^3$, is performed.

η1 that corresponds to P1* (500 W) is 30% from Table 3-3. η2 that corresponds to P2* (600 W) is 33% from Table 3-4.

The largest ηi of these ηi is η2, and I (i that gives η2) is 2.

PI*=P2*=600 (W)≠0. Therefore, the electrical output of the fuel cell is set to PI*, that is, P2* (600 W), the reforming method is set to the second reforming method, and the flow rate of the hydrocarbon-based fuel supplied to the reforming catalyst layer is set to F2*=4 g/min.

(Case 3-8)

Here, it is assumed that
$P_D$=600 W, and
$F1^R$=2 g/min and $F2^R$=1.5 g/min
have been calculated in the step $B^3$. Further, it is assumed that
P1*=500 W and F1*=2 g/min
have been determined in the step $D^3$.

$F1^R$=2 g/min≥1 g/min=$F1_{min}$, and on the other hand, $F2^R$=1.5 g/min<2 g/min=$F2_{min}$, and therefore, there is only one i (that is, 1) for which $Fi^R$≥$Fi_{min}$. Therefore, I (this only one i)=1.

PI*=P1*=500 (W)≠0. Therefore, the electrical output of the fuel cell is set to PI*, that is, P1* (500 W), the reforming method is set to the first reforming method, and the flow rate of the hydrocarbon-based fuel supplied to the reforming catalyst layer is set to F1*=2 g/min.

(Case 3-9)

Here, it is assumed that
$P_D$=600 W, and
$F1^R$=0.5 g/min and $F2^R$=5 g/min
have been calculated in the step $B^3$. Further, it is assumed that
P2*=600 W and F2*=4 g/min
have been determined in the step $D^3$.

$F2^R$=5 g/min≥2 g/min=$F2_{min}$, and on the other hand, $F1^R$=0.5 g/min<1 g/min=$F1_{min}$, and therefore, there is only one i (that is, 2) for which $Fi^R$≥$Fi_{min}$. Therefore, I (this only one i)=2.

PI*=P2*=600 (W)≠0. Therefore, the electrical output of the fuel cell is set to PI*, that is, P2*=600 W, the reforming method is set to the second reforming method, and the flow rate of the hydrocarbon-based fuel supplied to the reforming catalyst layer is set to F2*=4 g/min.

<Example in which Step $C^3$ is Performed>

(Case 3-10)

Here, it is assumed that
$F1^R$=0.5 g/min and $F2^R$=1.5 g/min
have been calculated in the step $B^3$.

In this case, $F1^R$=0.5 g/min<1 g/min=$F1_{min}$ and $F2^R$=1.5 g/min<2 g/min=$F2_{min}$, in other words, $Fi^R$<$Fi_{min}$ for all i, and therefore, the step $D^3$ is not performed, and the step $C^3$ is performed, and the electrical output of the fuel cell is set to zero.

In this case, if the second reforming method is a reforming method in which the ratio of the amount of heat generation to the amount of endothermic heat is the largest among the first and second reforming methods, it is possible to adopt the second reforming method and to supply the hydrocarbon-based fuel at the flow rate $F2^R$ to the reformer and increase the temperature of the reforming catalyst layer by the heater, the burner or the like annexed to the reformer, until at least $Fi^R$≥$Fi_{min}$ is satisfied for at least one i. When the temperature of the reforming catalyst layer increases and $Fi^R$≥$Fi_{min}$ is satisfied for at least one i, while the steps $A^3$ to $C^3$ are repeated, the step $D^3$ and the subsequent steps may be performed.

[Calculation of Reformable Flow Rate (Calculation of $Fi^R$)]

A method for calculating the flow rate $Fi^R$ of the hydrocarbon-based fuel that can be reformed in the reforming catalyst layer in which the i-th reforming method is performed, in the step $B^3$, based on the temperature of the reforming catalyst layer measured in the step $A^3$, will be described below.

The flow rate of the hydrocarbon-based fuel that can be reformed in the reforming catalyst layer refers to a flow rate such that when the hydrocarbon-based fuel at this flow rate is supplied to the reforming catalyst layer, the composition of the gas discharged from the reforming catalyst layer becomes a composition suitable to be supplied to the anode of the fuel cell.

For example, the reformable flow rate in the reforming catalyst layer may be any flow rate that is equal to or less than the maximum value of flow rates at which the supplied hydrocarbon-based fuel can be decomposed to a C1 compound(s) (a compound(s) having a carbon number of one). In other words, the reformable flow rate in the reforming catalyst layer may be any flow rate that is equal to or less than the maximum value of the flow rate of the hydrocarbon-based fuel supplied to the reforming catalyst layer when reforming can proceed in the reforming catalyst layer until a composition is obtained in which a C2+ component(s) (a component(s) having a carbon number of two or more) in the gas at the outlet of the reforming catalyst layer has a concentration which does not cause problems of anode degradation and flow blockage due to carbon deposition, or less. The reformable flow rate may be this maximum value, or may be a value obtained by dividing this maximum value by a safety factor (a value that exceeds 1, for example, 1.4). The concentration of the C2+ component(s) in this case is preferably 50 ppb or less as a mass fraction in the reformed gas. And in this case, it is enough that the gas at the outlet of the reforming catalyst layer is reducing gas. Methane is permitted to be contained in the gas at the outlet of the reforming catalyst layer. In the reforming of the hydrocarbon-based fuel, usually, methane remains in the equilibrium theory. Even if carbon is contained in the gas at the outlet of the reforming catalyst layer in the form of methane, CO, or $CO_2$, carbon deposition can be prevented by adding steam as required. When methane is used as the hydrocarbon-based fuel, it is enough that reforming proceeds so that the gas at the outlet of the reforming catalyst layer becomes reducing.

With respect to the reducing property of the gas at the outlet of the reforming catalyst layer, it is enough that the property is to the extent that if this gas is supplied to the anode, the oxidative degradation of the anode is suppressed. In order to do this, for example, the partial pressures of oxidizing $O_2$, $H_2O$, and $CO_2$, and the like contained in the gas at the outlet of the reforming catalyst layer may be lower than their equilibrium partial pressures of the oxidation reactions of the anode electrode. For example, when the anode electrode material is nickel, and the anode temperature is 800° C., the partial pressure of $O_2$ contained in the gas at the outlet of the reforming catalyst layer may be less than $1.2 \times 10^{-14}$ atm ($1.2 \times 10^{-9}$ Pa), the partial pressure ratio of $H_2O$ to $H_2$ may be less than $1.7 \times 10^2$, and the partial pressure ratio of $CO_2$ to CO may be less than $1.8 \times 10^2$.

The reformable flow rate depends on the temperature of the reforming catalyst layer. Therefore, the calculation of the reformable flow rate in the reforming catalyst layer is performed based on the temperature of the measured reforming catalyst layer.

The reformable flow rate $Fi^R$ in the reforming catalyst layer may be beforehand obtained as a function of the temperature T of the reforming catalyst layer by experiment ($Fi^R$ is represented also as $Fi^R(T)$ to explicitly show that it is a function of temperature). Also, it is possible to determine the reformable flow rate by dividing the function obtained by experiment by a safety factor, or offsetting the temperature to the safe side. The unit of $Fi^R(T)$ is, for example, mol/s. The reformable flow rate $Fi^R(T)$ may be a function of only the temperature T. But, this is not limiting, and the reformable flow rate $Fi^R$ may be a function having, in addition to the temperature T, a variable, such as the volume of the catalyst layer or the concentration of the gas component, other than T. In this case, when the reformable flow rate $Fi^R$ is calculated, it is possible to appropriately obtain a variable other than T, and calculate the reformable flow rate $Fi^R$ from the variable other than T and the measured T.

The temperature measurement position in the reforming catalyst layer may be one point or a plurality of points. Also, a representative temperature, such as the average value of a plurality of points, or the like may be used as the temperature condition.

It is possible to consider a plurality of divided regions into which the reforming catalyst layer is divided along the gas flow direction, measure temperatures at a plurality of points in the reforming catalyst layer at different positions along the gas flow direction, calculate based on these temperatures one or more flow rates of the fuel that can be reformed in one or more of the plurality of divided regions, and set the total value of the calculated flow rate(s) as the flow rate of the fuel that can be reformed in the reforming catalyst layer.

[Others]

Also, by interconnecting the fuel cell to a system power supply, the shortage of the electrical output of the fuel cell with respect to an electric power load may be supplied from the system power supply.

The fuel cell output demand value $P_D$ may be a value of an electric power load measured by an appropriate electric power meter. Alternatively, when the fuel cell is interconnected to another power generator or storage battery, part of a measured electric power load may be set as the fuel cell output demand value $P_D$.

In the steps $E^3$, $F^3$ or the like, when the flow rate of the hydrocarbon-based fuel is determined, it is possible to accordingly determine the flow rates of fluids supplied to the indirect internal reforming SOFC, other than the hydrocarbon-based fuel, and the input and output of electricity to and from the indirect internal reforming SOFC, other than the output of the SOFC, to values beforehand set correspondingly to each $Pi_j$ (the same j-th values as that of the determined flow rate of the hydrocarbon-based fuel in the i-th reforming method), as required.

The present invention is particularly effective when the hydrocarbon-based fuel supplied to the reforming catalyst layer includes a hydrocarbon-based fuel having a carbon number of two or more. According to the present invention, it is possible to allow the concentration of a compound(s) having a carbon number of two or more in the reformed gas to be 50 ppb or less on a mass basis even in load following operation. And thereby, anode degradation and flow blockage due to carbon deposition can be more reliably prevented.

In order to perform the method of the present invention, appropriate instrumentation controlling equipment, including a computing means, such as a computer, may be used.

Fourth Embodiment

The fourth embodiment of the method of the present invention will be described below.

[$Pi_j$, and $Fi_j$ and $\eta i$ that Correspond to $Pi_j$]

In this embodiment, Mi different fuel cell electrical outputs $Pi_j$ (j is an integer of 1 or more and Mi or less, where Mi is an integer of 2 or more) and a flow rate $Fi_j$ of the hydrocarbon-based fuel that corresponds to each $Pi_j$ when a reformed gas produced by the i-th reforming method is supplied to the fuel cell to generate electric power, are beforehand set for every i. Also, an electric power generation efficiency $\eta i_j$ at each $Pi_j$ is beforehand obtained.

Each $Fi_j$ is a flow rate of the hydrocarbon-based fuel required to be supplied to the reforming catalyst layer in order to output the corresponding electrical output $Pi_j$ from the fuel cell when the i-th reforming method is performed in the reforming catalyst layer. For example, the flow rate $Fi_j$ of the hydrocarbon-based fuel that corresponds to each $Pi_j$ may be set by beforehand determining an electric current and a fuel utilization rate for each by preliminary experiment, simulation, or the like so that the electric power generation efficiency is as high as possible, while the SOFC is maintained at a temperature at which electric power can be suitably generated. In doing so, the electric power generation efficiency $\eta i_j$ at each $Pi_j$ may be simultaneously obtained.

Each $Pi_j$ is 0 or more. In other words, for all i and j, $0 \leq Pi_j$. Also, $Pi_j$ increases with the increase of j. In other words, $Pi_j < Pi_{j+1}$ (here, j is an integer of 1 or more and Mi−1 or less).

Further, each $Fi_j$ is larger than 0. In other words, for all i and j, $0 < Fi_j$.

For every i, $Pi_1$ that is $Pi_j$ when j is 1 is 0, and $Pi_j$ when j is Mi (that is, $Pi_{Mi}$) is the maximum electrical output of the fuel cell when the i-th reforming method is performed in the reforming catalyst layer. $Pi_{Mi}$ is beforehand determined as one of the specifications of the fuel cell system.

For each i, the minimum value and maximum value among $Fi_j$ for all j are represented as $Fi_{min}$ and $Fi_{max}$, respectively. In other words, when a certain i is given, the minimum value and maximum value among $Fi_j$ for all j are represented as $Fi_{min}$ and $Fi_{max}$, respectively.

It is preferred to make Mi as large as possible within the allowable range of the memory of a control means, in terms of electric power generation efficiency.

[$Ti_k$, and $Gi_k$ That Corresponds to $Ti_k$]

Further, Ni different reforming catalyst layer temperatures $Ti_k$ (k is an integer of 1 or more and Ni or less, where Ni is an integer of 2 or more) and a flow rate $Gi_k$ of the hydrocarbon-based fuel that corresponds to each $Ti_k$ are beforehand set for all i.

Here, each $Gi_k$ is a flow rate of the hydrocarbon-based fuel that can be reformed in the reforming catalyst layer at the corresponding reforming catalyst layer temperature $Ti_k$ by the i-th reforming method.

Each $Gi_k$ is larger than 0. In other words, for all i and k, $0 < Gi_k$. Also, $Gi_k$ is the same value or increases with the increase of k. In other words, $Gi_k \leq Gi_k+1$ (here, k is an integer of 1 or more and Ni-1 or less).

$Gi_k$ ($Gi_{Ni}$) when k is Ni is equal to or more than $Fi_{max}$. In other words, $Gi_{Ni} \geq Fi_{max}$. $Gi_{Ni}$ is the flow rate of the hydrocarbon-based fuel that can be reformed in the reforming catalyst layer at the highest temperature considered by the i-th reforming method, that is, the maximum value of the hydrocarbon-based fuel that can be reformed. If $Gi_{Ni} \geq Fi_{max}$, the hydrocarbon-based fuel at the flow rate $Fi_{max}$ cannot be reformed, and therefore, the fuel cell system is, of course, designed so that $Gi_{Ni} \geq Fi_{max}$.

[Operation Conditions Other than Fuel Flow Rate and Fuel Cell Electrical Output]

Also, for each reforming method, the flow rates of fluids supplied to the indirect internal reforming SOFC, other than the hydrocarbon-based fuel, and the input and output of electricity to and from the indirect internal reforming SOFC, other than the output of the fuel cell, may be beforehand set correspondingly to each $Pi_j$, as required. For example, in order to suppress carbon deposition, the flow rate of water supplied to the reformer may be beforehand set so that the steam/carbon ratio (ratio of the number of moles of water molecules to the number of moles of carbon atoms in the gas supplied to the reforming catalyst layer) has a predetermined value. The flow rate of air supplied to the reformer may be beforehand set so that the oxygen/carbon ratio (ratio of the number of moles of oxygen molecules to the number of moles of carbon atoms in the gas supplied to the reforming catalyst layer) has a predetermined value. The flow rate of fluids supplied to the indirect internal reforming SOFC, other than the water and air supplied to the reformer, and the input and output of electricity to and from the indirect internal reforming SOFC may be beforehand set by preliminary experiment, simulation, or the like so that the electric power generation efficiency is as high as possible, while the SOFC is maintained at a temperature at which electric power can be suitably generated. By doing so, these flow rates and electrical input and output may be determined using beforehand obtained functions, when the output of the fuel cell is set to a certain value P.

Or, the flow rates of fluids supplied to the indirect internal reforming SOFC, other than the hydrocarbon-based fuel, and the input and output of electricity to and from the indirect internal reforming SOFC, other than the output of the fuel cell, may be functions of the flow rate of the hydrocarbon-based fuel. For example, the flow rate of water supplied to the reformer may be a flow rate at which the steam/carbon ratio has a constant value, in order to suppress carbon deposition. The flow rate of air supplied to the reformer may be a flow rate at which the oxygen/carbon ratio has a constant value.

Or, the flow rates of fluids supplied to the indirect internal reforming SOFC, other than the hydrocarbon-based fuel, and the input and output of electricity to and from the indirect internal reforming SOFC, other than the output of the fuel cell, may be values obtained by appropriate control techniques according to the control purposes.

For example, the flow rate of air supplied to the cathode may be set so that the SOFC can be maintained at a temperature at which electric power can be suitably generated.

The output of the electrical heater annexed to the reformer may be set so that the reforming catalyst layer can be maintained at a predetermined temperature (for example, so that the reforming catalyst layer can be maintained at a temperature preferred for reforming).

When a burner for heating the catalyst layer is annexed to the reformer, the fuel flow rate may be set so that the reforming catalyst layer can be maintained at a predetermined temperature, and the air flow rate may be a flow rate at which the air ratio has a predetermined value (for example, a value preferred for combustion).

The output of the electrical heater annexed to the vaporizer may be set so that the steam can be maintained at a predetermined temperature (for example, so that the steam temperature at the reformer inlet can be maintained at a temperature preferred for reforming).

When a burner for heating is annexed to the vaporizer, the fuel flow rate may be set so that the steam can be maintained at a predetermined temperature, and the air flow rate may be a flow rate at which the air ratio has a predetermined value.

When a burner for heating is annexed in the vicinity of the SOFC, the fuel flow rate may be set so that the SOFC can be maintained at a temperature at which electric power can be suitably generated, and the air flow rate may be a flow rate at which the air ratio has a predetermined value.

When a heat exchanger for cooling the SOFC is disposed in the vicinity of the SOFC, the flow rate of a cooling fluid supplied to the heat exchanger may be set so that the SOFC can be maintained at a temperature at which electric power can be suitably generated.

When a heat exchanger for cooling the reforming catalyst layer is annexed in the vicinity of the reforming catalyst layer closest to the SOFC, in order to cool the SOFC by increasing the methane concentration in the reformed gas by an equilibration reaction and causing an endothermic reaction on the anode of the SOFC, the flow rate of a cooling fluid supplied to the heat exchanger may be set so that the SOFC can be maintained at a temperature at which electric power can be suitably generated.

[Steps $A^4$ to $F^4$]

By preferably repeatedly performing steps $A^4$ to $F^4$, that is, repeatedly performing the steps $A^4$, $B^4$, $C^4$ and $D^4$, and the step $E^4$ or $F^4$ in this order, during load following operation, reforming can be more reliably performed to more reliably prevent the degradation of the anode and higher electric power generation efficiency can be obtained.

FIG. 4 show a flowchart for explaining the steps $A^4$ to $F^4$.

[Step $A^4$]

When load fluctuation operation is actually performed, the step $A^4$ of measuring the temperature of the reforming catalyst layer is performed. This measurement may be continuously performed while the load following operation is performed.

The step $A^4$ is performed to find the temperature T of the reforming catalyst layer. Temperature T is used when a reformable flow rate $Fi^R$ described later is obtained. The step $A^4$ is preferably started in a time as short as possible from the point of time of the start of the load following operation. The step $A^4$ is preferably started immediately after the load following operation is started. When the monitoring (continuous measurement) of the temperature of the reforming catalyst layer has been performed since before the start of the load following operation, the temperature monitoring may be continuously performed as it has been.

An appropriate temperature sensor, such as a thermocouple, may be used for the temperature measurement.

[Step $B^4$]

In the step $B^4$, for all i, $Gi_k$ corresponding to the largest $Ti_k$ that is equal to or less than the temperature T (the temperature measured in the step $A^4$) is adopted as the flow rate (reformable flow rate $Fi^R$) of the hydrocarbon-based fuel that can be reformed in the reforming catalyst layer at the temperature T. In other words, among beforehand set $Ti_k$, the largest $Ti_k$ within a range of the measured temperature T or less is selected. Then, $Gi_k$ corresponding to the selected $Ti_k$ is obtained from the correspondence relationship between $Ti_k$ and $Gi_k$, which has been beforehand set, and this $Gi_k$ is set as the reformable flow rate $Fi^R$.

[Step $C^4$]

When the reformable flow rate $Fi^R$ obtained in the step $B^4$ is smaller than the minimum value $Fi_{min}$ for every i, electric power generation in the fuel cell is stopped. In other words, when $Fi^R < Fi_{min}$ for all i, it is considered that the requisite minimum reformed gas cannot be reformed, and therefore, the electrical output of the fuel cell is set to zero. In this case, the following operation may be performed. Namely, among the plurality of reforming methods determined as the i-th reforming methods, a reforming method in which the ratio of the amount of heat generation to the amount of endothermic heat of a reaction is the largest is adopted. The flow rate of the hydrocarbon-based fuel supplied to the reformer is set to $Fi^R$ of this reforming method. Then, it is possible to increase the temperature of the reforming catalyst layer by the heater, the burner or the like annexed to the reformer, until at least $Fi^R \geq Fi_{min}$ is satisfied ($Fi^R$ is obtained by the steps $A^4$ and $B^4$) for at least one i. When $Fi^R \geq Fi_{min}$ for at least one i, the step $D^4$ and the subsequent steps may be performed.

[Step $D^4$]

When the reformable flow rate $Fi^R$ obtained in the step $B^4$ is equal to or more than the above minimum value $Fi_{min}$ for at least one i, the step $D^4$ is performed. In other words, when there is even one i for which $Fi^R \geq Fi_{min}$, for example, when $F1^R \geq F1_{min}$, the step $D^4$ is performed.

In the step $D^4$, for each of this at least one i, that is, for each of i for which $Fi^R \geq Fi_{min}$, step $d^41$ is performed if a fuel cell output demand value $P_D$ is equal to or less than the maximum electrical output $Pi_{Mi}$ of the fuel cell. $P_D \leq Pi_{Mi}$ is considered to mean that when the i-th reforming method is performed in the reformer, the fuel cell can output the fuel cell output demand value $P_D$.

Or, for each of this at least one i, that is, for each of i for which $Fi^R \geq Fi_{min}$, step $d^42$ is performed if the fuel cell output demand value $P_D$ exceeds the maximum electrical output $Pi_{Mi}$ of the fuel cell. $P_D > Pi_{Mi}$ is considered to mean that when the i-th reforming method is performed in the reformer, the electrical output of the fuel cell is insufficient for the fuel cell output demand value $P_D$.

<Step $d^41$>

In the step $d^41$, first, in order to make a further judgment, a value of $Fi_{DS}$ is obtained. Here, $Fi_{DS}$ has a meaning of a flow rate of the hydrocarbon-based fuel corresponding to a $Pi_j$ which is close to the fuel cell output demand value $P_D$, obtained for judging on the safe side whether reforming is possible or not.

Whether there is, among $Pi_j$ for all j, a $Pi_j$ that is equal to the fuel cell output demand value $P_D$ is checked.

When there is a $Pi_j$ that is equal to $P_D$, $Fi_j$ that corresponds to this $Pi_j$ (=$P_D$) is obtained using the correspondence relationship between $Pi_j$ and $Fi_j$, which has been beforehand set, and this $Fi_j$ is substituted to $Fi_{DS}$. Also in the following descriptions, when obtaining $Fi_j$ that corresponds to $Pi_j$, or $Pi_j$ that corresponds to $Fi_j$, the correspondence relationship between $Pi_j$ and $Fi_j$ beforehand determined is used.

When there is, among $Pi_j$ for all j, no $Pi_j$ that is equal to $P_D$, the larger one among a $Fi_j$ corresponding to "the smallest $Pi_j$ that exceeds $P_D$" and a $Fi_j$ corresponding to "the largest $Pi_j$ that is less than $P_D$" (when these two values are equal, the very value) is set as $Fi_{DS}$ in order to judge on the safer side whether reforming is possible or not.

Next, this $Fi_{DS}$ is compared with the above calculated reformable flow rate $Fi^R$.

Case where $Fi_{DS} \leq Fi^R$

When $Fi_{DS}$ is equal to or less than the reformable flow rate $Fi^R$, $Pi^* = P_D$ and $Fi^* = Fi_{DS}$ are set. $Fi_{DS} \leq Fi^R$ is considered to mean that the hydrocarbon-based fuel at the flow rate Fins can be reformed in the reforming catalyst layer when the i-th reforming method is performed in the reformer.

$Pi^*$ and $Fi^*$ are variables that are candidates for the electrical output of the fuel cell and the flow rate of the hydrocarbon-based fuel supplied to the reformer which are finally set, respectively.

Case where $Fi_{DS} > Fi^R$

When $Fi_{DS}$ exceeds the above reformable flow rate $Fi^R$, the following step (4-1) or (4-2) is performed. $Fi_{DS} > Fi^R$ is considered to mean that the hydrocarbon-based fuel at the flow rate $Fi_{DS}$ cannot be totally reformed in the reforming catalyst layer.

(4-1) Case Where There is a $Pi_j$ Corresponding to $Fi_j$ that is Equal to or Less than $Fi^R$ within a Range of Less than Fuel Cell Output Demand Value $P_D$ In this case, $PI^* = \{$the maximum value among the above $Pi_j$ ($Pi_j$ that is less than $P_D$ and that corresponds to $Fi_j$ that is equal to or less than $Fi^R$) and $FI^* = (Fi_j$ corresponding to this maximum value) are set.

(4-2) Case Where There is No $Pi_j$ Corresponding to $Fi_j$ that is Equal to or Less than $Fi^R$ within a Range of Less than Fuel Cell Output Demand Value $P_D$ In this case, $PI^* = 0$ and $Fi^* = Fi^R$ are set <Step $d^42$>

As described above, the step $d^42$ is performed when it is judged that the electrical output of the fuel cell is insufficient for the fuel cell output demand value $P_D$.

In this step, $Fi_{Mi}$ ($Fi_j$ corresponding to the maximum electrical output $Pi_{Mi}$) is compared with the above reformable flow rate $Fi^R$.

Case where $Fi_{Mi} \leq Fi^R$

When $Fi_{Mi}$ is equal to or less than the above reformable flow rate $Fi^R$, $Pi^* = Pi_{Mi}$ and $Fi^* = Fi_{Mi}$ are set. $Fi_{Mi} \leq Fi^R$ is considered to mean that the hydrocarbon-based fuel at the flow rate $Fi_{Mi}$ can be reformed in the reforming catalyst layer.

Case where $Fi_{Mi} > Fi^R$

When $Fi_{Mi}$ exceeds the above reformable flow rate $Fi^R$, $Pi^* =$ (the maximum value among $Pi_j$ corresponding to $Fi_j$ that is equal to or less than $Fi^R$), and
$Fi^* = (Fi_j$ that corresponds to this maximum value)
are set. $Fi_{Mi} > Fi^R$ is considered to mean that the hydrocarbon-based fuel at the flow rate $Fi_{Mi}$ cannot be totally reformed in the reforming catalyst layer.

[Step $E^4$]

When there are two or more i for which the reformable flow rate $Fi^R$ determined in the step $B^4$ is equal to or more than the minimum value $Fi_{min}^*$, $\eta i$ that corresponds to $Pi^*$ determined in the step $D^4$ is obtained for each of these two or more i. i that gives the largest $\eta i$ among two or more $\eta i$ obtained in this manner is represented as I.

For example, when there are two i (1 and 2) for which $Fi^R \geq Fi_{min}$, that is, when $F1^R \geq F1_{min}$ and $F2^R \geq F2_{min}$, and $F3^R < F3_{min}$ even if i can be 3, $\eta 1$ that corresponds to $P1^*$ determined in the step $D^4$, and $\eta 2$ that corresponds to $P2^*$ determined in the step $D^4$ are obtained. When the largest $\eta i$ of these $\eta 1$ and $\eta 2$ is $\eta 1$, i that gives the largest $\eta i$ (represented as I) is 1, that is, I=1 is set.

When there are a plurality of largest $\eta i$ among two or more $\eta i$ obtained as described above, i that gives any $\eta i$ among the plurality of $\eta i$ (these have the same value) may be represented as I. For example, among two or more reforming methods in which the reformable flow rate $Fi^R$ determined in the step $B^4$ is equal to or more than the minimum value $Fi_{min}$, i for which the electrical output $Pi^*$ is larger may be set as I.

Then, when $PI^*$ exceeds zero, the electrical output of the fuel cell is set to $PI^*$, the reforming method performed in the reformer is set to an I-th reforming method, and the flow rate of the hydrocarbon-based fuel supplied to the reforming catalyst layer is set to $FI^*$.

When $PI^*$ is zero, the electric power generation in the fuel cell is stopped. In other words, the electrical output of the fuel cell is set to zero. In this case, the following operation may be performed. Namely, among the plurality of reforming methods determined as the i-th reforming methods, a reforming method in which the ratio of the amount of heat generation to the amount of endothermic heat of a reaction is the largest is adopted. The flow rate of the hydrocarbon-based fuel supplied to the reformer is set to $Fi^R$ of this reforming method. Then, it is possible to increase the temperature of the reforming catalyst layer by the heater, the burner or the like annexed to the reformer, until at least $Fi^R \geq Fi_{min}$ is satisfied ($Fi^R$ is obtained by the steps $A^4$ and $B^4$) for at least one i. When $Fi^R \geq Fi_{min}$ for at least one i, the step $D^4$ and the subsequent steps may be performed again.

[Step $F^4$]

When there is only one i for which the reformable flow rate $Fi^R$ determined in the step $B^4$ is equal to or more than the minimum value $Fi_{min}$, this only one i is represented as I.

For example, when i for which $Fi^R \geq Fi_{min}$ is only 1, that is, when $F1^R \geq F1_{min}$ and $F2^R < F2_{min}$, and further, when $F3^R < F3_{min}$ even if i can be 3, I=1 is set.

Then, when $PI^*$ exceeds zero, the electrical output of the fuel cell is set to $PI^*$, the reforming method performed in the reformer is set to an I-th reforming method, and the flow rate of the hydrocarbon-based fuel supplied to the reforming catalyst layer is set to $FI^*$.

When $PI^*$ is zero, the electric power generation in the fuel cell is stopped. In other words, the electrical output of the fuel cell is set to zero. In this case, the following operation may be performed. Namely, among the plurality of reforming methods determined as the i-th reforming methods, a reforming method in which the ratio of the amount of heat generation to the amount of endothermic heat of a reaction is the largest is adopted. The flow rate of the hydrocarbon-based fuel supplied to the reformer is set to $Fi^R$ of this reforming method. Then, it is possible to increase the temperature of the reforming catalyst layer by the heater, the burner or the like annexed to the reformer, until at least $Fi^R \geq Fi_{min}$ is satisfied ($Fi^R$ is obtained by the steps $A^4$ and $B^4$) for at least one i. When $Fi^R \geq Fi_{min}$ for at least one i, the step $D^4$ and the subsequent steps may be performed again.

[Example of Load Following Operation]

How operation is performed under various conditions, when the load following operation of one certain fuel cell system is performed, will be described below by giving specific examples. However, the present invention is not limited thereto.

<Examples of Determination of $Pi^*$ and $Fi^*$>

First, a procedure until $Pi^*$ and $Fi^*$ are determined in the step $D^4$ will be described. However, here, only the first reforming method will be specifically described. For the second reforming method, and also for the third reforming method when there is the third reforming method, $Pi^*$ and $Fi^*$ can be obtained by the same procedure.

First, it is assumed that for a fuel cell system, electrical outputs $P1_j$ and a flow rate $F1_j$ of the hydrocarbon-based fuel corresponding to each $P1_j$ when the first reforming method is performed have been beforehand set as shown in Table 4-1. Here, $P1_{M1} = 700$ W and $F1_{min} = 1$ g/min. These are values inherent to this fuel cell system. On the other hand, $P_D$ may fluctuate according to electric power demand, and $F1^R$ may fluctuate according to the reforming catalyst layer temperature. In addition, M1=7, that is, seven different $P1_j$ have been set.

TABLE 4-1

Correspondence between Electrical Output $P1_j$ and Flow Rate $F1_j$ of Hydrocarbon-Based Fuel

| j | $P1_j$ W | $F1_j$ g/min |
|---|---|---|
| 1 | 0 | 2 |
| 2 | 200 | 3 |
| 3 | 300 | 3 |
| 4 | 400 | 4 |
| 5 | 500 | 3 |
| 6 | 600 | 1 |
| 7 (M1) | 700 | 5 |

Also, it is assumed that for the same fuel cell system, temperatures $T1_k$ of the reforming catalyst layer, and a flow rate $G1_k$ of the hydrocarbon-based fuel corresponding to each $T1_k$ when the first reforming method is performed have been beforehand set as shown in Table 4-2. Here, $T1_{N1} = 700°$ C. and $G1_{N1} = 15$ g/min. These are values inherent to the fuel cell system. Ni=5, that is, five different $T1_k$ have been set.

In addition, $G1_{Ni}=15$ g/min≥5 g/min=$F1_{M1}=F1_{max}$.

TABLE 4-2

Correspondence between Reforming Catalyst Layer Temperature $T1_k$ and Flow Rate $G1_k$ of Hydrocarbon-Based Fuel That Can Be Reformed

| k | $T1_k$ °C. | $G1_k$ g/min |
|---|---|---|
| 1 | 600 | 1 |
| 2 | 625 | 3 |
| 3 | 650 | 6 |
| 4 | 675 | 10 |
| 5 (N1) | 700 | 15 |

The temperature T of the reforming catalyst layer is measured in the step $A^4$.

(Case 4-1)

A case where $P_D=450$ W and T=660° C. is considered.

The step $B^4$ is performed. From Table 4-2, the largest $T1_k$ within the range of T (660° C.) or less is $T1_3$ (650° C.). $G1_k(G1_3)$ corresponding to $T1_3$ is 6 g/min. $G1_3$ is adopted as the reformable flow rate $F1^R$. Therefore, $F1^R=6$ g/min.

$F1^R=6$ g/min≥1 g/min=$F1_{min}$, and therefore, the step $C^4$ is not performed, and the step $D^4$ is performed.

Then, $P_D=450$ W<700 W=$P1_{M1}$, and therefore, the step $d^41$, rather than the step $d^42$, is performed.

In the step $d^41$, first, $F1_{DS}$ is obtained. From Table 4-1, it is seen that there is no $P_j$ that is equal to $P_D$ (450 W). Therefore, "$F1_j$ corresponding to the smallest $P1_j$ that exceeds $P_D$" and "$F1_j$ corresponding to the largest $P1_j$ that is less than $P_D$" are obtained from Table 4-1. The smallest $P1_j$ that exceeds $P_D$ is 500 W ($P1_5$), and $F1_j$ ($F1_5$) corresponding to $P1_5$ is 3 g/min. The largest $P1_j$ that is less than $P_D$ is 400 W ($P1_4$), and $F1_j$ ($F1_4$) corresponding to $P1_4$ is 4 g/min. The not smaller one of $F1_5$ and $F1_4$, that is, $F1_4$, is set as $F1_{DS}$. Therefore, $F1_{DS}=4$ g/min.

$F1_{DS}$ is compared with $F1^R$. $F1_{DS}=4$ g/min≤6 g/min=$F1^R$, and therefore, $P1^*=P_D=450$ W and $F1^*=F1_{DS}=4$ g/min are set.

(Case 4-2)

A case where $P_D=400$ W and T=660° C. is considered.

The step $B^4$ is performed. From Table 4-2, the largest $T1_k$ within the range of T (660° C.) or less is $T1_3$ (650° C.). $G1_k$ ($G1_3$) corresponding to $T1_3$ is 6 g/min. $G1_3$ is adopted as the reformable flow rate $F1^R$. Therefore, $F1^R=6$ g/min.

$F1^R=6$ g/min≥1 g/min=$F1_{min}$, and therefore, the step $C^4$ is not performed, and the step $D^4$ is performed.

Then, $P_D=400$ W≤700 W=$P1_{M1}$, and therefore, the step $d^41$, rather than the step $d^42$, is performed.

In the step $d^41$, first, $F1_{DS}$ is obtained. From Table 4-1, there is $P1_j$ ($P1_4$) that is equal to $P_D$ (400 W), therefore, $F1_4$ is set as $F1_{DS}$. Therefore, $F1_{DS}=4$ g/min.

$F1_{DS}$ is compared with $F1^R$. $F1_{DS}=4$ g/min≤6 g/min=$F1^R$, and therefore, $P1^*=P_D=400$ W and $F1^*=F1_{DS}=4$ g/min are set.

(Case 4-3)

A case where $P_D=350$ W and T=630° C. is considered.

The step $B^4$ is performed. From Table 4-2, the largest $T1_k$ within the range of T (630° C.) or less is $T1_2$ (625° C.). $G1_k$ ($G1_2$) corresponding to $T1_2$ is 3 g/min. $G1_2$ is adopted as the reformable flow rate $F1^R$. Therefore, $F1^R=3$ g/min.

$F1^R=3$ g/min≥1 g/min=$F1_{min}$, and therefore, the step $C^4$ is not performed, and the step $D^4$ is performed.

Then, $P_D=350$ W≤700 W=$P1_{M1}$, and therefore, the step $d^41$, rather than the step $d^42$, is performed.

In the step $d^41$, first, $F1_{DS}$ is obtained. From Table 4-1, it is seen that there is no $P1_j$ that is equal to $P_D$ (350 W). Therefore, "$F1_j$ corresponding to the smallest $P1_j$ that exceeds $P_D$" and "$F1_j$ corresponding to the largest $P1_j$ that is less than $P_D$" are obtained from Table 4-1. The smallest $P1_j$ that exceeds $P_D$ is 400 W ($P1_4$), and $F1_j$ ($F1_4$) corresponding to $P1_4$ is 4 g/min. The largest $P1_j$ that is less than $P_D$ is 300 W ($P1_3$), and $F1_j$ ($F1_3$) corresponding to $P1_3$ is 3 g/min. The not smaller one of $F1_4$ and $F1_3$, that is, $F1_4$, is set as $F1_{DS}$. Therefore, $F1_{DS}=4$ g/min.

$F1_{DS}$ is compared with $F1^R$. $F1_{DS}=4$ g/min>3 g/min=$F1^R$, and therefore, the above-described step (4-1) or (4-2) is performed depending on the situation. Specifically, there is a $P1_j$ that is less than $P_D$ and that corresponds to $F1_j$ that is equal to or less than $F1^R$, and therefore, the step (4-1) is performed.

$P1_j$ corresponding to $F1_j$ that is equal to or less than $F1^R$ (that is, 3 g/min) within the range of less than $P_D$ (that is, less than 350 W) are $P1_1$ (0 W), $P1_2$ (200 W), and $P1_3$ (300 W). The maximum value of these is $P1_3$ (300 W). $F1_j$ ($F1_3$) corresponding to this maximum value $P1_3$ is 3 g/min.

Therefore, $P1^*=P1_3=300$ W and $F1^*=F1_3=3$ g/min are set.

(Case 4-4)

A case where $P_D=350$ W and T=610° C. is considered.

The step $B^4$ is performed. From Table 4-2, the largest $T1_k$ within the range of T (610° C.) or less is $T1_1$ (600° C.). $G1_k$ ($G1_1$) corresponding to $T1_1$ is 1 g/min. $G1_1$ is adopted as the reformable flow rate $F1^R$. Therefore, $F1^R=1$ g/min.

$F1^R=1$ g/min≥1 g/min=$F1_{min}$, and therefore, the step $C^4$ is not performed, and the step $D^4$ is performed.

Then, $P_D=350$ W≤700 W=$P1_{M1}$, and therefore, the step $d^41$, rather than the step $d^42$, is performed.

In the step $d^41$, first, $F1_{DS}$ is obtained. From Table 4-1, it is seen that there is no $P1_j$ that is equal to $P_D$ (350 W). Therefore, "$F1_j$ corresponding to the smallest $P1_j$ that exceeds $P_D$" and "$F1_j$ corresponding to the largest $P1_j$ that is less than $P_D$" are obtained from Table 4-1. The smallest $P1_j$ that exceeds $P_D$ is 400 W ($P1_4$), and $F1_j$ ($F1_4$) corresponding to $P1_4$ is 4 g/min. The largest $P1_j$ that is less than $P_D$ is 300 W ($P1_3$), and $F1_j$ ($F1_3$) corresponding to $P1_3$ is 3 g/min. The not smaller one of $F1_4$ and $F1_3$, that is, $F1_4$, is set as $F1_{DS}$. Therefore, $F1_{DS}=4$ g/min.

$F1_{DS}$ is compared with $F1^R$. $F1_{DS}=4$ g/min>1 g/min=$F1^R$, and therefore, the above-described step (4-1) or (4-2) is performed depending on the situation. Specifically, there is no $P1_j$ that is less than $P_D$ and that corresponds to $F1_j$ that is equal to or less than $F1^R$, and therefore, the step (4-2) is performed. More specifically, $F1_j$ corresponding to $P1_j$ within the range of less than $P_D$ are $F1_1$, $F1_2$, and $F1_3$, and these are all larger than $F1^R$ (1 g/min). Therefore, there is no $P1_j$ that is less than $P_D$ and that corresponds to $F1_j$ that is equal to or less than $F1^R$.

Therefore, in the step (4-2), $P1^*=0$ W and $F1^*=F1^R$ (1 g/min) are set.

(Case 4-5)

A case where $P_D=800$ W and T=660° C. is considered.

The step $B^4$ is performed. From Table 4-2, the largest $T1_k$ within the range of T (660° C.) or less is $T1_3$ (650° C.). $G1_k$ ($G1_3$) corresponding to $T1_3$ is 6 g/min. $G1_3$ is adopted as the reformable flow rate $F1^R$. Therefore, $F1^R=6$ g/min.

$F1^R=6$ g/min≥1 g/min=$F1_{min}$, and therefore, the step $C^4$ is not performed, and the step $D^4$ is performed.

Then, $P_D=800$ W>700 W=$P1_{M1}$, and therefore, the step $d^42$, rather than the step $d^41$, is performed.

In the step $d^42$, $F1_{M1}$ is compared with $F1^R$. $F1_{M1}=5$ g/min≤6 g/min=$F1^R$, and therefore, $P1^*=P1_{M1}$ 700 W and $F1^*=F1_{M1}=5$ g/min are set.

(Case 4-6)

A case where $P_D$=800 W and T=630° C. is considered.

The step $B^4$ is performed. From Table 4-2, the largest $T1_k$ within the range of T (630° C.) or less is $T1_2$ (625° C.). $G1_k$ ($G1_2$) corresponding to $T1_2$ is 3 g/min. $G1_k$ is adopted as the reformable flow rate $F1^R$. Therefore, $F1^R$=3 g/min.

$F1^R$=3 g/min≥1 g/min=$F1_{min}$, and therefore, the step $C^4$ is not performed, and the step $D^4$ is performed.

Then, $P_D$=800 W>700 W=$P1_{M1}$, and therefore, the step $d^42$, rather than the step $d^41$, is performed.

In the step $d^42$, $F1_{M1}$ is compared with $F1^R$. $F1_{M1}$=5 g/min>3 g/min=$F1^R$, and therefore, the following step is performed.

$P1_j$ corresponding to $F1_j$ that is equal to or less than $F1^R$ (that is, 3 g/min) are $P1_1$ (0 W), $P1_2$ (200 W), $P1_3$ (300 W), $P1_5$ (500 W), and $P1_6$ (600 W). The maximum value of these is $P1_6$ (600 W). $F1_j$ ($F1_6$) corresponding to this maximum value $P1_6$ is 1 g/min.

Therefore, PI=$P1_6$=600 W and FI*=$F1_6$=1 g/min are set.

The correspondence shown in Table 4-1 is extreme for explanation. But, it is considered that practically, the correspondence may often be close to a correspondence as shown in Table 4-3. In Table 4-3, in a range in which the electrical output $Pi_j$ is small, that is, in a range in which the electrical output $Pi_j$ is 0 W or more and 300 W or less, the flow rate $Fi_j$ of the hydrocarbon-based fuel is fixed at 1.0 g/min in order to suitably maintain the SOFC at a temperature at which electric power can be generated. Also, in a range in which the electrical output $P_j$ is large, that is, in a range in which the electrical output $Pi_j$ is 400 W or more and the maximum electrical output $Pi_{M1}$ (1000 W) or less, the flow rate $Fi_j$ of the hydrocarbon-based fuel increases from 1.5 g/min to 4.5 g/min, correspondingly to the increase of the electrical output $Pi_j$ in order to make electric power generation efficiency higher.

TABLE 4-3

General Correspondence between Electrical Output $Pi_j$ and Flow Rate $Fi_j$ of Hydrocarbon-Based Fuel

| j | $Pi_j$ (W) | $Fi_j$ (g/min) |
|---|---|---|
| 1 | 0 | 1.0 |
| 2 | 100 | 1.0 |
| 3 | 200 | 1.0 |
| 4 | 300 | 1.0 |
| 5 | 400 | 1.5 |
| 6 | 500 | 2.0 |
| 7 | 600 | 2.5 |
| 8 | 700 | 3.0 |
| 9 | 800 | 3.5 |
| 10 | 900 | 4.0 |
| 11 (Mi) | 1000 | 4.5 |

<Examples of Determination of Electrical Output of Fuel Cell and Flow Rate of Fuel Supplied to Reformer>

A procedure for determining the electrical output of the fuel cell and the flow rate of the hydrocarbon-based fuel supplied to the reformer, in the step $E^4$ or $F^4$, will be described in detail below.

In the following descriptions, a case where L=2 is considered, and it is assumed that the following values have been obtained.

$F1_{min}$=1 g/min and $F2_{min}$=2 g/min.

It is assumed that the correspondence between a fuel cell electrical output and an electric power generation efficiency at this output has been obtained for each of the first reforming method and the second reforming method, as shown in Table 4-4 and Table 4-5. At the same electrical output, the electric power generation efficiency is higher in the first reforming method than in the second reforming method. But, when the electrical output is different, the magnitude relationship of the electric power generation efficiency is different. For example, there is a case where the maximum electrical output capable of being generated in a state in which complete reforming is ensured is larger and the electric power generation efficiency is higher in the second reforming method than in the first reforming method. In the present embodiment, it is possible to determine an electrical output and a hydrocarbon-based fuel flow rate in a state in which complete reforming is ensured and determine a reforming method in which the electric power generation efficiency is higher in real time, and therefore, it is possible to maintain the electric power generation efficiency higher, while making the electrical output during the load following operation as large as possible.

TABLE 4-4

Correspondence Table between Electrical Output $P1_j$ and Flow Rate $\eta 1_j$ of Hydrocarbon-Based Fuel

| j | $P1_j$ W | $\eta 1_j$ % |
|---|---|---|
| 1 | 0 | 0 |
| 2 | 200 | 12 |
| 3 | 300 | 18 |
| 4 | 400 | 24 |
| 5 | 500 | 30 |
| 6 | 600 | 36 |
| 7 (M1) | 700 | 42 |

TABLE 4-5

Correspondence Table between Electrical Output $P2_j$ and Flow Rate $\eta 2_j$ of Hydrocarbon-Based Fuel

| j | $P2_j$ W | $\eta 2_j$ % |
|---|---|---|
| 1 | 0 | 0 |
| 2 | 150 | 8 |
| 3 | 300 | 17 |
| 4 | 400 | 22 |
| 5 | 500 | 28 |
| 6 (M2) | 600 | 33 |

(Case 4-7)

Here, it is assumed that $P_D$=600 W, and $F1^R$=2 g/min and $F2^R$=5 g/min have been determined in the step $B^4$. Further, it is assumed that P1*=500 W, F1*=2 g/min, P2*=600 W, and F2*=4 g/min have been determined in the step $D^4$.

$F1^R$=2 g/min≥1 g/min=$F1_{min}$ and $F2^R$=5 g/min≥2 g/min=$F2_{min}$, and therefore, there are two i (that is, 1 and 2) for which $Fi^R$≥$Fi_{min}$. Therefore, the step $E^4$, rather than the step $F^4$, is performed.

η1 that corresponds to P1*(500 W) is 30% from Table 4-4.
η2 that corresponds to P2*(600 W) is 33% from Table 4-5.

The largest ηi of these ηi is η2, and I (i that gives η2) is 2.

PI*=P2*=600 (W)≠0. Therefore, the electrical output of the fuel cell is set to PI*, that is, P2*(600 W), the reforming method is set to the second reforming method, and the flow rate of the hydrocarbon-based fuel supplied to the reforming catalyst layer is set to F2*=4 g/min.

(Case 4-8)

Here, it is assumed that $P_D$=600 W, and $F1^R$=2 g/min and $F2^R$=1.5 g/min have been determined in the step $B^4$. Further, it is assumed that P1*=500 W and F1*=2 g/min have been determined in the step $D^4$.

$F1^R$=2 g/min≥1 g/min=$F1_{min}$, and on the other hand, $F2^R$=1.5 g/min<2 g/min=$F2_{min}$, and therefore, there is only one i (that is, 1) for which $Fi^R$≥$Fi_{min}$. Therefore, I (this only one i)=1.

PI*=P1*=500 (W)≠0. Therefore, the electrical output of the fuel cell is set to PI*, that is, P1*(500 W), the reforming method is set to the first reforming method, and the flow rate of the hydrocarbon-based fuel supplied to the reforming catalyst layer is set to F1*=2 g/min.

(Case 4-9)

Here, it is assumed that $P_D$=600 W, and $F1^R$=0.5 g/min and $F2^R$=5 g/min have been determined in the step $B^4$. Further, it is assumed that P2*=600 W and F2*=4 g/min have been determined in the step $D^4$.

$F2^R$=5 g/min≥2 g/min=$F2_{min}$, and on the other hand, $F1^R$=0.5 g/min<1 g/min=$F1_{min}$, and therefore, there is only one i (that is, 2) for which $Fi^R$≥$Fi_{min}$. Therefore, I (this only one i)=2.

PI*=P2*=600 (W)≠0. Therefore, the electrical output of the fuel cell is set to PI*, that is, P2*=600 W, the reforming method is set to the second reforming method, and the flow rate of the hydrocarbon-based fuel supplied to the reforming catalyst layer is set to F2*=4 g/min.

<Example in which Step $C^4$ is Performed>

(Case 4-10)

Here, it is assumed that $F1^R$=0.5 g/min and $F2^R$=1.5 g/min have been determined in the step $B^4$.

In this case, $F1^R$=0.5 g/min<1 g/min=$F1_{min}$ and $F2^R$=1.5 g/min<2 g/min=$F2_{min}$; in other words, $Fi^R$<$Fi_{min}$ for all i, and therefore, the step $D^4$ is not performed, and the step $C^4$ is performed, and the electrical output of the fuel cell is set to zero.

In this case, if the second reforming method is a the reforming method in which the ratio of the amount of heat generation to the amount of endothermic heat is the largest among the first and second reforming methods, it is possible to adopt the second reforming method and to supply the hydrocarbon-based fuel at the flow rate $F2^R$ to the reformer and increase the temperature of the reforming catalyst layer by the heater, the burner or the like annexed to the reformer, until at least $Fi^R$≥$Fi_{min}$ is satisfied for at least one i. When the temperature of the reforming catalyst layer increases and $Fi^R$≥$Fi_{min}$ is satisfied for at least one i, while the steps $A^4$ to $C^4$ are repeated, the step $D^4$ and the subsequent steps may be performed.

[Way of Setting $Ti_k$ and $Gi_k$ Corresponding to $Ti_k$]

Way of Setting $Ti_k$

When the measured temperature T of the catalyst layer is smaller than the minimum value of $Ti_k$, the step $B^4$ cannot be performed. Therefore, the minimum value of $Ti_k$ is preferably as small as possible and may be, for example, the lowest temperature among temperatures at which the flow rate of the hydrocarbon-based fuel that can be reformed by the i-th reforming method exceeds zero.

It is preferred to make Ni as large as possible within the allowable range of the memory of a control means, in terms of electric power generation efficiency. Particularly, when the increase rate of the flow rate of the hydrocarbon-based fuel that can be reformed by the i-th reforming method increases as the catalyst layer temperature increases, it is preferred to make the interval between $Ti_k$ smaller as the temperature increases.

Way of Setting $Gi_k$ $Gi_k$ is a flow rate of the hydrocarbon-based fuel that can be reformed by the i-th reforming method in the reforming catalyst layer at the corresponding reforming catalyst layer temperature $Ti_k$. Therefore, the flow rate $Gi_k$ of the hydrocarbon-based fuel that can be reformed by the i-th reforming method in the reforming catalyst layer, when the temperature of the reforming catalyst layer is the temperature $Ti_k$, is beforehand obtained, and the correspondence relationship between $Ti_k$ and $Gi_k$ is beforehand set. The way of obtaining $Gi_k$ will be described below.

The flow rate of the hydrocarbon-based fuel that can be reformed in the reforming catalyst layer refers to a flow rate such that when the hydrocarbon-based fuel at this flow rate is supplied to the reforming catalyst layer, the composition of the gas discharged from the reforming catalyst layer becomes a composition suitable to be supplied to the anode of the fuel cell.

For example, the reformable flow rate in the reforming catalyst layer may be any flow rate that is equal to or less than the maximum value of flow rates at which the supplied hydrocarbon-based fuel can be decomposed to a C1 compound(s) (a compound(s) having a carbon number of one). In other words, the reformable flow rate in the reforming catalyst layer may be any flow rate that is equal to or less than the maximum value of the flow rate of the hydrocarbon-based fuel supplied to the reforming catalyst layer when reforming can proceed in the reforming catalyst layer until a composition is obtained in which a C2+ component(s) (a component(s) having a carbon number of two or more) in the gas at the outlet of the reforming catalyst layer has a concentration which does not cause problems of anode degradation and flow blockage due to carbon deposition, or less. The reformable flow rate may be this maximum value, or may be a value obtained by dividing this maximum value by a safety factor (a value that exceeds 1, for example, 1.4). The concentration of the C2+ component(s) in this case is preferably 50 ppb or less as a mass fraction in the reformed gas. And in this case, it is enough that the gas at the outlet of the reforming catalyst layer is reducing gas. Methane is permitted to be contained in the gas at the outlet of the reforming catalyst layer. In the reforming of the hydrocarbon-based fuel, usually, methane remains in the equilibrium theory. Even if carbon is contained in the gas at the outlet of the reforming catalyst layer in the form of methane, CO, or $CO_2$, carbon deposition can be prevented by adding steam as required. When methane is used as the hydrocarbon-based fuel, it is enough that reforming proceeds so that the gas at the outlet of the reforming catalyst layer becomes reducing.

With respect to the reducing property of the gas at the outlet of the reforming catalyst layer, it is enough that the property is to the extent that if this gas is supplied to the anode, the oxidative degradation of the anode is suppressed. In order to do this, for example, the partial pressures of oxidizing $O_2$, $H_2O$, and $CO_2$, and the like contained in the gas at the outlet of the reforming catalyst layer may be lower than their equilibrium partial pressures of the oxidation reactions of the anode electrode. For example, when the anode electrode material is nickel, and the anode temperature is 800° C., the partial pressure of $O_2$ contained in the gas at the outlet of the reforming catalyst layer may be less than $1.2 \times 10^{-14}$ atm (1.2×

$10^{-9}$ Pa), the partial pressure ratio of $H_2O$ to $H_2$ may be less than $1.7 \times 10^2$, and the partial pressure ratio of $CO_2$ to CO may be less than $1.8 \times 10^2$.

The reformable flow rate depends on the temperature of the reforming catalyst layer. Therefore, the reformable flow rate in the reforming catalyst layer is obtained based on the temperature of the reforming catalyst layer.

The reformable flow rate $Gi_k$ may be beforehand obtained as a value corresponding to the temperature $Ti_k$ of the reforming catalyst layer by experiment. Also, it is possible to determine the reformable flow rate by dividing the value obtained by experiment by a safety factor, or offsetting the temperature to the safe side. The unit of $Gi_k$ is, for example, g/min or mol/s. The reformable flow rate $Gi_k$ may be a value corresponding only to the temperature $Ti_k$. But, this is not limiting, and the reformable flow rate $Gi_k$ may be a value corresponding to, in addition to the temperature $Ti_k$, a variable other than $Ti_k$, such as the volume of the catalyst layer or the concentration of the gas component. In this case, when the reformable flow rate $Gi_k$ is obtained, it is possible to appropriately obtain a variable other than $Ti_k$, and obtain the reformable flow rate $Gi_k$ from the variable other than $Ti_k$ and the measured $Ti_k$.

In preliminary experiment for obtaining $Gi_k$, the temperature measurement position in the reforming catalyst layer may be one point or a plurality of points. Also, a representative temperature, such as the average value of a plurality of points, or the like may be used as the temperature of the reforming catalyst layer.

It is possible to consider a plurality of divided regions into which the reforming catalyst layer is divided along the gas flow direction, measure temperatures at a plurality of points in the reforming catalyst layer at different positions along the gas flow direction, obtain based on these temperatures one or more flow rates of the fuel that can be reformed in one or more of the plurality of divided regions, and set the total value of the obtained flow rate(s) as the flow rate of the fuel that can be reformed in the reforming catalyst layer.

When the temperature T of the reforming catalyst layer during actual operation is obtained in the step $A^4$, it is desired to measure the temperature of the reforming catalyst layer as in the preliminary experiment for obtaining $Gi_k$. In other words, it is desired to measure the temperature of the reforming catalyst layer at the same position(s) as in the preliminary experiment. When a representative temperature or the like is used in the preliminary experiment, it is desired to use the same representative temperature as the temperature T of the reforming catalyst layer also in the step $A^4$.

[Others]

Also, by interconnecting the fuel cell to a system power supply, the shortage of the electrical output of the fuel cell with respect to an electric power load may be supplied from the system power supply.

The fuel cell output demand value $P_D$ may be a value of an electric power load measured by an appropriate electric power meter. Alternatively, when the fuel cell is interconnected to another power generator or storage battery, part of a measured electric power load may be set as the fuel cell output demand value $P_D$.

In the step $E^4$, $F^4$ or the like, when the flow rate of the hydrocarbon-based fuel is determined, it is possible to accordingly determine the flow rates of fluids supplied to the indirect internal reforming SOFC, other than the hydrocarbon-based fuel, and the input and output of electricity to and from the indirect internal reforming SOFC, other than the output of the SOFC, to values beforehand set correspondingly to each $Pi_j$ (the same j-th values as that of the determined flow rate of the hydrocarbon-based fuel in the i-th reforming method), as required.

The present invention is particularly effective when the hydrocarbon-based fuel supplied to the reforming catalyst layer includes a hydrocarbon-based fuel having a carbon number of two or more. According to the present invention, it is possible to allow the concentration of a compound(s) having a carbon number of two or more in the reformed gas to be 50 ppb or less on a mass basis even in load following operation. And thereby, anode degradation and flow blockage due to carbon deposition can be more reliably prevented.

In order to perform the method of the present invention, appropriate instrumentation controlling equipment, including a computing means, such as a computer, may be used.

[Hydrocarbon-Based Fuel]

It is possible to use a hydrocarbon-based fuel appropriately selected from compounds of which molecules contain carbon and hydrogen (may also contain other elements, such as oxygen) or mixtures thereof that are publicly known as raw materials of reformed gas in the field of high temperature fuel cells. It is possible to use compounds of which molecules contain carbon and hydrogen, such as hydrocarbons and alcohols. For example, hydrocarbon fuels, such as methane, ethane, propane, butane, natural gas, LPG (liquefied petroleum gas), city gas, gasoline, naphtha, kerosene and gas oil, alcohols, such as methanol and ethanol, ethers, such as dimethylether, and the like may be used.

Particularly, kerosene and LPG are preferred because they are readily available. In addition, they can be stored in a stand-alone manner, and therefore, they are useful in areas where the city gas pipeline is not built. Further, a high temperature fuel cell power generating equipment using kerosene or LPG is useful as an emergency power supply. Particularly, kerosene is preferred because it is easy to handle.

[High Temperature Fuel Cell]

The present invention may be suitably applied to a system equipped with a high temperature fuel cell in which anode degradation and flow blockage due to carbon deposition may occur. Such a fuel cell includes an SOFC and an MCFC.

The SOFC may be appropriately selected for use from publicly known SOFCs having various shapes, such as planar and tubular SOFCs. In the SOFC, generally, an oxygen-ion conductive ceramic or a proton-ion conductive ceramic is used as the electrolyte.

The MCFC may also be appropriately selected for use from publicly known MCFCs.

The SOFC or the MCFC may be a single cell, but practically, a stack in which a plurality of single cells are arrayed (the stack is sometimes referred to as a bundle in the case of a tubular type, and the stack in this specification includes a bundle) is preferably used. In this case, one stack or a plurality of stacks may be used.

Among high temperature fuel cells, an indirect internal reforming SOFC is excellent in that the thermal efficiency of the system can be increased. The indirect internal reforming SOFC has a reformer for producing a reformed gas containing hydrogen from a hydrocarbon-based fuel using a reforming reaction such as a steam reforming reaction and an SOFC. In this reformer, a steam reforming reaction may be performed, and a partial oxidation reaction and autothermal reforming in which a steam reforming reaction is accompanied by a partial oxidation reaction may be performed. Heat required for the reforming reaction is supplied from the SOFC. The reformer and the SOFC are housed in one module container and modularized. The reformer is disposed at a position where it receives thermal radiation from the SOFC. Thus, the reformer is heated by thermal radiation from the SOFC during electric power generation. Also, the SOFC may be heated by combusting an anode off-gas, which is discharged from the SOFC, at the cell outlet.

In the indirect internal reforming SOFC, the reformer is preferably disposed at a position where radiation heat can be directly transferred from the SOFC to the outer surface of the reformer. Therefore, it is preferred that there is substantially no obstacle between the reformer and the SOFC, that is, it is preferred to make the region between the reformer and the SOFC be an empty space. Also, the distance between the reformer and the SOFC is preferably as short as possible.

Each supply gas is supplied to the reformer or the SOFC, after being appropriately preheated as required.

The module container may be any appropriate container capable of housing the SOFC and the reformer. An appropriate material having resistance to the environment used, for example, stainless steel, may be used as the material of the container. A connection port is appropriately provided for the container for gas interfacing or the like.

Particularly when a cell outlet opens in the module container, the module container is preferably hermetic in order to prevent communication between the interior of the module container and the surroundings (atmosphere).

A combustion region is a region where the anode off-gas discharged from the anode of the SOFC can be combusted. For example, the anode outlet is opened in the enclosure, and a space near the anode outlet may be the combustion region. This combustion may be performed using, for example, a cathode off-gas, as an oxygen-containing gas. In order to do this, a cathode outlet may be opened in the enclosure.

In order to combust a combustion fuel or the anode off-gas, an ignition means, such as an igniter, may be appropriately used.

[Reformer]

The reformer produces a reformed gas containing hydrogen from a hydrocarbon-based fuel.

In the reformer, any of steam reforming, partial oxidation reforming and autothermal reforming in which a steam reforming reaction is accompanied by a partial oxidation reaction may be performed.

In the reformer, an autothermal reforming catalyst having both partial oxidation reforming activity and steam reforming activity may be used.

With respect to the structure of the reformer, a structure publicly known as that of a reformer may be appropriately used. For example, the structure of the reformer may be a structure having a region for housing a reforming catalyst in a vessel which can be closed to the atmosphere, and having an introduction port for fluids required for reforming and a discharge port for a reformed gas.

The material of the reformer may be appropriately selected for use from materials publicly known as those of reformers, considering resistance in the environment used.

The shape of the reformer may be an appropriate shape, such as a rectangular parallelepiped shape or a circular tube shape.

A hydrocarbon-based fuel (vaporized beforehand as required) and steam, and further an oxygen-containing gas, such as air, as required, may be supplied to the reformer (the reforming catalyst layer), each independently, or appropriately mixed beforehand. The reformed gas is supplied to the anode of the SOFC.

[Reforming Catalyst]

For example, a publicly known autothermal reforming catalyst, such as a rhodium-based catalyst, may be used as the reforming catalyst used in the reformer.

[Operation Conditions of Reformer]

The conditions during load following operation of the reformer for each of steam reforming, autothermal reforming, and partial oxidation reforming will be described below.

In steam reforming, steam is added to a reforming raw material, such as kerosene. The reaction temperature of the steam reforming may be in the range of, for example, 400° C. to 1000° C., preferably 500° C. to 850° C., and further preferably 550° C. to 800° C. An amount of the steam introduced into the reaction system is defined as a ratio of the number of moles of water molecules to the number of moles of carbon atoms contained in the hydrocarbon-based fuel (steam/carbon ratio). This value is preferably 1 to 10, more preferably 1.5 to 7, and further preferably 2 to 5. When the hydrocarbon-based fuel is liquid, a space velocity (LHSV) can be represented as NB, wherein a flow velocity of the hydrocarbon-based fuel in a liquid state is represented as A (L/h), and a volume of the catalyst layer is represented as B (L). This value is set in the range of preferably 0.05 to 20 $h^{-1}$, more preferably 0.1 to 10 $h^{-1}$, and further preferably 0.2 to 5 $h^{-1}$.

In autothermal reforming, in addition to the steam, an oxygen-containing gas is added to the reforming raw material. The oxygen-containing gas may be pure oxygen, but in terms of the ease of availability, air is preferred. The oxygen-containing gas may be added so that the endothermic reaction accompanying the steam reforming reaction is balanced, and an amount of heat generation such that the temperature of the reforming catalyst layer and the SOFC can be maintained or increased is obtained. With respect to the amount of the oxygen-containing gas added, a ratio of the number of moles of oxygen molecules to the number of moles of carbon atoms contained in the hydrocarbon-based fuel (oxygen/carbon ratio) is preferably 0.005 to 1, more preferably 0.01 to 0.75, and further preferably 0.02 to 0.6. A reaction temperature of the autothermal reforming reaction is set in the range of, for example, 400° C. to 1000° C., preferably 450° C. to 850° C., and further preferably 500° C. to 800° C. When the hydrocarbon-based fuel is liquid, the space velocity (LHSV) is selected in the range of preferably 0.05 to 20 $h^{-1}$, more preferably 0.1 to 10 $h^{-1}$, and further preferably 0.2 to 5 $h^{-1}$. With respect to an amount of the steam introduced into the reaction system, the steam/carbon ratio is preferably 1 to 10, more preferably 1.5 to 7, and further preferably 2 to 5.

In partial oxidation reforming, an oxygen-containing gas is added to the reforming raw material. The oxygen-containing gas may be pure oxygen, but in terms of the ease of availability, air is preferred. An amount of the oxygen-containing gas added is appropriately determined in terms of heat loss and the like to ensure a temperature at which the reaction proceeds. With respect to this amount, the ratio of the number of moles of oxygen molecules to the number of moles of carbon atoms contained in the hydrocarbon-based fuel (oxygen/carbon ratio) is preferably 0.1 to 3 and more preferably 0.2 to 0.7. A reaction temperature of the partial oxidation reaction may be set in the range of, for example, 450° C. to 1000° C., preferably 500° C. to 850° C., and further preferably 550° C. to 800° C. When the hydrocarbon-based fuel is liquid, the space velocity (LHSV) is selected in the range of preferably 0.1 to 30 $h^{-1}$. Steam can be introduced into the reaction system to suppress the generation of soot, and with respect to an amount of the steam, the steam/carbon ratio is preferably 0.1 to 5, more preferably 0.1 to 3, and further preferably 1 to 2.

[Other Equipment]

In the high temperature fuel cell system used in the present invention, publicly known components of a high temperature fuel cell system may be appropriately provided as required.

Specific examples of the publicly known components include a desulfurizer for reducing a sulfur content of a hydrocarbon-based fuel; a vaporizer for vaporizing a liquid; pressure increasing means for pressurizing various fluids, such as a pump, a compressor, and a blower; flow rate controlling means or flow path blocking/switching means for controlling the flow rate of a fluid, or blocking/switching the flow of a fluid, such as a valve; a heat exchanger for performing heat exchange and heat recovery; a condenser for condensing a gas; heating/warming means for externally heating various equipment with steam or the like; storage means of a hydrocarbon-based fuel and combustibles; an air or electrical system for instrumentation; a signal system for control; a control device; and an electrical system for output and powering; and the like.

INDUSTRIAL APPLICABILITY

The present invention can be applied to a high temperature fuel cell system used for, for example, a stationary or mobile electric power generation system and a cogeneration system.

DESCRIPTION OF SYMBOLS 1 water vaporizer
2 electrical heater annexed to water vaporizer
3 reformer
4 reforming catalyst layer
5 combustion region
6 SOFC
7 igniter
8 module container
9 electrical heater annexed to reformer

The invention claimed is:
1. A method of load following operation of a fuel cell system comprising a reformer for reforming a hydrocarbon-based fuel to produce a reformed gas containing hydrogen, said reformer having a reforming catalyst layer, and a high temperature fuel cell for generating electric power using the reformed gas, wherein
at least two reforming methods selected from the group consisting of a steam reforming method, a partial oxidation reforming method, and an autothermal reforming method are determined as i-th reforming methods, where i is an integer of 1 or more and L or less, and L is 2 or 3, functions $Fi=fi(P)$ and $P=fi^{-1}(Fi)$ are obtained beforehand for every i, said functions $Fi=fi(P)$ and $P=fi^{-1}(Fi)$ being functions of an electrical output P of the fuel cell and a flow rate Fi of the hydrocarbon-based fuel required to be supplied to the reforming catalyst layer in order to output the electrical output P from the fuel cell when a reformed gas produced by the i-th reforming method is supplied to the fuel cell,
where $P=fi^{-1}(Fi)$ is an inverse function of $Fi=fi(P)$,
a function $\eta i=gi(P)$ is obtained beforehand for every i, said function $\eta i=gi(P)$ being a function of the electrical output P of the fuel cell and an electric power generation efficiency hi of the fuel cell when a reformed gas produced by the i-th reforming method is supplied to the fuel cell to output the electrical output P from the fuel cell,
$Pi_M$ represents a maximum electrical output of the fuel cell when a reformed gas produced by the i-th reforming method is supplied to the fuel cell, and

$Fi_{min}$ represents a minimum value of a flow rate of the hydrocarbon-based fuel determined by the function $Fi=fi(P)$ when P is within a range of 0 or more and $Pi_M$ or less,
the method of load following operation of the fuel cell system comprising:
$A^1$) measuring a temperature T of the reforming catalyst layer;
$B^1$) for every i, calculating a reformable flow rate $Fi^R$ that is a flow rate of the hydrocarbon-based fuel capable of being reformed in the reforming catalyst layer at the temperature T by the i-th reforming method;
$C^1$) when the reformable flow rate $Fi^R$ calculated in step $B^1$ is smaller than the minimum value $Fi_{min}$ for every i, stopping electric power generation in the fuel cell;
$D^1$) when the reformable flow rate $Fi^R$ calculated in step $B^1$ is equal to or more than the minimum value $Fi_{min}$ for at least one i,
for each of said at least one i, performing step $d^11$ if a fuel cell output demand value $P_D$ is equal to or less than the maximum electrical output $Pi_M$, and performing step $d^12$ if the fuel cell output demand value $P_D$ exceeds the maximum electrical output $Pi_M$,
$d^11$) calculating a flow rate $fi(P_D)$ of the hydrocarbon-based fuel required to be supplied to the reforming catalyst layer, in which the i-th reforming method is performed, in order to output the fuel cell output demand value $P_D$ from the fuel cell, using the function $Fi=fi(P)$, and
if $fi(P_D)$ is equal to or less than the reformable flow rate $Fi^R$ calculated in step $B^1$, then setting $Pi^*=P_D$, and setting $Fi^*=fi(P_D)$, and
if $fi(P_D)$ exceeds the reformable flow rate $Fi^R$ calculated in step $B^1$, then setting $Pi^*=\{$a value that is less than $P_D$ and the maximum among one or more P values calculated from a function $P=fi^{-1}(Fi^R)\}$ and setting $Fi^*=Fi^R$,
$d^12$) calculating a flow rate $fi(Pi_M)$ of the hydrocarbon-based fuel supplied to the reforming catalyst layer required to be supplied to the reforming catalyst layer, in which the i-th reforming method is performed, in order to output the maximum electrical output $Pi_M$ from the fuel cell, using the function $Fi=fi(P)$, and
if $fi(Pi_M)$ is equal to or less than the reformable flow rate $Fi^R$ calculated in step $B^1$, then setting $Pi^*=Pi_M$, and setting $Fi^*=fi(Pi_M)$, and
if $fi(Pi_M)$ exceeds the reformable flow rate $Fi^R$ calculated in step $B^1$, then setting $Pi^*=\{$a value that is the maximum among one or more P values calculated from the function $P=fi^{-1}(Fi^R)\}$, and setting $Fi^*=Fi^R$;
$E^1$) when there exist two or more i for which the reformable flow rate $Fi^R$ calculated in step $B^1$ is equal to or more than the minimum value $Fi_{min}$, calculating $\eta i=gi(Pi^*)$ that is an electric power generation efficiency at the electrical output $Pi^*$, using the function $\eta i=gi(P)$, for each of said two or more i, and representing i that gives the largest hi among thus calculated $\eta i$ as I, and setting an electrical output of the fuel cell to $PI^*$, setting a reforming method performed in the reformer to an I-th reforming method, and setting a flow rate of the hydrocarbon-based fuel supplied to the reforming catalyst layer to $FI^*$; and
$F^1$) when there exists only one i for which the reformable flow rate $Fi^R$ calculated in step $B^1$ is equal to or more than the minimum value $Fi_{min}$, representing said only one i as I, and setting the electrical output of the fuel cell to $PI^*$, setting the reforming method performed in the reformer to an I-th reforming method, and setting the flow rate of the hydrocarbon-based fuel supplied to the reforming catalyst layer to FI*.

2. The method according to claim 1, wherein steps $A^1$ to $F^1$ are repeatedly performed during the load following operation.

3. The method according to claim 1, wherein the hydrocarbon-based fuel comprises a hydrocarbon-based fuel with a carbon number of two or more.

4. The method according to claim 3, wherein the concentration of a compound with a carbon number of two or more in the reformed gas is 50 ppb or less on a mass basis.

5. A method of load following operation of a fuel cell system comprising a reformer for reforming a hydrocarbon-based fuel to produce a reformed gas containing hydrogen, said reformer having a reforming catalyst layer, and a high temperature fuel cell for generating electric power using the reformed gas, wherein at least two reforming methods selected from the group consisting of a steam reforming method, a partial oxidation reforming method, and an autothermal reforming method are determined as i-th reforming methods, where i is an integer of 1 or more and L or less, and L is 2 or 3, functions Fi=fi(P) and P=fi$^{-1}$(Fi) are obtained beforehand for every i, said functions Fi=fi(P) and P=fi$^{-1}$(Fi) being functions of an electrical output P of the fuel cell and a flow rate Fi of the hydrocarbon-based fuel required to be supplied to the reforming catalyst layer in order to output the electrical output P from the fuel cell when a reformed gas produced by the i-th reforming method is supplied to the fuel cell, where P=fi$^{-1}$(Fi) is an inverse function of Fi=fi(P), a function ηi=gi(P) is obtained beforehand for every i, said function ηi=gi(P) being a function of the electrical output P of the fuel cell and an electric power generation efficiency ηi of the fuel cell when a reformed gas produced by the i-th reforming method is supplied to the fuel cell to output the electrical output P from the fuel cell, $Pi_M$ represents a maximum electrical output of the fuel cell when a reformed gas produced by the i-th reforming method is supplied to the fuel cell, $Fi_{min}$ represents a minimum value of a flow rate of the hydrocarbon-based fuel determined by the function Fi=fi(P) when P is within a range of 0 or more and $Pi_M$ or less, and Ni different reforming catalyst layer temperatures $Ti_k$ and a flow rate $Gi_k$ of the hydrocarbon-based fuel that corresponds to each $Ti_k$ are set beforehand for every i, where k is an integer of 1 or more and Ni or less, and Ni is an integer of 2 or more, each $Gi_k$ is a flow rate of the hydrocarbon-based fuel capable of being reformed in the reforming catalyst layer at a corresponding reforming catalyst layer temperature $Ti_k$ by the i-th reforming method, each $Gi_k$ is larger than 0, and $Gi_k$ is the same value or increases with an increase of k, the method of load following operation of the fuel cell system comprising:

$A^2$) measuring a temperature T of the reforming catalyst layer;

$B^2$) for every i, adopting $Gi_k$ corresponding to a largest $Ti_k$ that is equal to or less than the temperature T as a reformable flow rate $Fi^R$ that is a flow rate of the hydrocarbon-based fuel capable of being reformed in the reforming catalyst layer at the temperature T by the i-th reforming method;

$C^2$) when the reformable flow rate $Fi^R$ determined in step $B^2$ is smaller than the minimum value $Fi_{min}$ for every i, stopping electric power generation in the fuel cell;

$D^2$) when the reformable flow rate $Fi^R$ determined in step $B^2$ is equal to or more than the minimum value $Fi_{min}$ for at least one i, for each of said at least one i, performing step $d^2 1$ if a fuel cell output demand value $P_D$ is equal to or less than the maximum electrical output $Pi_M$, and performing step $d^2 2$ if the fuel cell output demand value $P_D$ exceeds the maximum electrical output $Pi_M$, $d^2 1$) calculating a flow rate fi($P_D$) of the hydrocarbon-based fuel required to be supplied to the reforming catalyst layer, in which the i-th reforming method is performed, in order to output the fuel cell output demand value $P_D$ from the fuel cell, using the function Fi=fi(P), and if fi($P_D$) is equal to or less than the reformable flow rate $Fi^R$ determined in step $B^2$, then setting Pi*=$P_D$, and setting Fi*=fi($P_D$), and if fi($P_D$) exceeds the reformable flow rate $Fi^R$ determined in step $B^2$, then setting Pi*={a value that is less than $P_D$ and the maximum among one or more P values calculated from a function P=fi$^{-1}$($Fi^R$)}, and setting Fi*=$Fi^R$, $d^2 2$) calculating a flow rate fi($Pi_M$) of the hydrocarbon-based fuel supplied to the reforming catalyst layer required to be supplied to the reforming catalyst layer, in which the i-th reforming method is performed, in order to output the maximum electrical output $Pi_M$ from the fuel cell, using the function Fi=fi(P), and if fi($Pi_M$) is equal to or less than the reformable flow rate $Fi^R$ determined in step $B^2$, then setting Pi*=$Pi_M$, and setting Fi*=fi($Pi_M$), and if fi($Pi_M$) exceeds the reformable flow rate $Fi^R$ determined in step $B^2$, then setting Pi*={a value that is the maximum among one or more P values calculated from the function P=fi$^{-1}$($Fi^R$)}, and setting Fi*=$Fi^R$;

$E^2$) when there exist two or more i for which the reformable flow rate $Fi^R$ determined in step $B^2$ is equal to or more than the minimum value $Fi_{min}$, calculating ηi=gi(Pi*) that is an electric power generation efficiency at the electrical output Pi*, using the function ηi=gi(P), for each of said two or more i, and representing i that gives the largest ηi among thus calculated ηi as I, and when PI* is zero, stopping the electric power generation in the fuel cell, and when PI* exceeds zero, setting an electrical output of the fuel cell to PI*, setting a reforming method performed in the reformer to an I-th reforming method, and setting a flow rate of the hydrocarbon-based fuel supplied to the reforming catalyst layer to FI*; and $F^2$) when there exists only one i for which the reformable flow rate $Fi^R$ determined in step $B^2$ is equal to or more than the minimum value $Fi_{min}$, representing said only one i as I, and when PI* is zero, stopping the electric power generation in the fuel cell, and when PI* exceeds zero, setting the electrical output of the fuel cell to PI*, setting the reforming method performed in the reformer to an I-th reforming method, and setting the flow rate of the hydrocarbon-based fuel supplied to the reforming catalyst layer to FI*.

6. The method according to claim 5, wherein steps $A^2$ to $F^2$ are repeatedly performed during the load following operation.

7. The method according to claim 5, wherein the hydrocarbon-based fuel comprises a hydrocarbon-based fuel with a carbon number of two or more.

8. The method according to claim 7, wherein the concentration of a compound with a carbon number of two or more in the reformed gas is 50 ppb or less on a mass basis.

9. A method of load following operation of a fuel cell system comprising a reformer for reforming a hydrocarbon-based fuel to produce a reformed gas containing hydrogen, said reformer having a reforming catalyst layer, and a high temperature fuel cell for generating electric power using the reformed gas, wherein at least two reforming methods selected from the group consisting of a steam reforming method, a partial oxidation reforming method, and an autothermal reforming method are determined as i-th reforming methods, where i is an integer of 1 or more and L or less, and L is 2 or 3, for every i, Mi different fuel cell electrical outputs $Pi_j$ and a flow rate $Fi_j$ of the hydrocarbon-based fuel that corresponds to each $Pi_j$ when a reformed gas produced by the i-th reforming method is supplied to the fuel cell to generate electric power are set beforehand, and an electric power generation efficiency $\eta i_j$ at each $Pi_j$ is obtained beforehand, where j is an integer from 1 to Mi, and Mi is an integer of 2 or more, each $Fi_j$ is a flow rate of the hydrocarbon-based fuel required to be supplied to the reforming catalyst layer, in which the i-th reforming method is performed, in order to output a corresponding electrical output $Pi_j$ from the fuel cell, each $Pi_j$ is 0 or more, $Pi_j$ increases with an increase of j, and each $Fi_j$ is larger than 0, for every i, $Pi_1$ is 0, and $Pi_{Mi}$ is a maximum electrical output of the fuel cell when the i-th reforming method is performed, and for each i, a minimum value of $Fi_j$ for all j is represented as $Fi_{min}$, the method of load following operation of the fuel cell system comprising:

$A^3$) measuring a temperature T of the reforming catalyst layer;

$B^3$) for every i, calculating a reformable flow rate $Fi^R$ that is a flow rate of the hydrocarbon-based fuel capable of being reformed in the reforming catalyst layer at the temperature T by the i-th reforming method;

$C^3$) when the reformable flow rate $Fi^R$ is smaller than the minimum value $Fi_{min}$ for every i, stopping electric power generation in the fuel cell;

$D^3$) when the reformable flow rate $Fi^R$ is equal to or more than the minimum value $Fi_{min}$ for at least one i, for each of said at least one i, performing step $d^31$ if a fuel cell output demand value $P_D$ is equal to or less than the maximum electrical output $Pi_{Mi}$, and performing step $d^32$ if the fuel cell output demand value $P_D$ exceeds the maximum electrical output $Pi_{Mi}$, $d^31$) if there exists, among all $Pi_j$, a value of $Pi_j$ that is equal to the fuel cell output demand value $P_D$, then setting $Fi_{DS}$=($Fi_j$ that corresponds to the value of $Pi_j$ that is equal to $P_D$), and if there does not exist, among all $Pi_j$, a value of $Pi_j$ that is equal to the fuel cell output demand value $P_D$, then setting $Fi_{DS}$={not smaller one of (a $Fi_j$ corresponding to a smallest value of $Pi_j$ that exceeds $P_D$) and (a $Fi_j$ corresponding to a largest value of $Pi_j$ that is less than $P_D$)}, and when $Fi_{DS}$ is equal to or less than the reformable flow rate $Fi^R$, setting Pi*=$P_D$ and Fi*=$Fi_{DS}$, and when $Fi_{DS}$ exceeds the reformable flow rate $Fi^R$, if there exists $Pi_j$ corresponding to $Fi_j$ that is equal to or less than $Fi^R$ within a range of less than the fuel cell output demand value $P_D$, then setting Pi*=(the maximum value among the $Pi_j$ corresponding to $Fi_j$ that is equal to or less than $Fi^R$ and existing within the range of less than $P_D$) and Fi*=($Fi_j$ that corresponds to the maximum value among the $Pi_j$ corresponding to $Fi_j$ that is equal to or less than $Fi^R$ and existing within the range of less than $P_D$), and if there does not exist $Pi_j$ corresponding to $Fi_j$ that is equal to or less than $Fi^R$ within the range of less than the fuel cell output demand value $P_D$, then setting Pi*=0 and Fi*=$Fi^R$, $d^32$) when $Fi_{Mi}$, that is $Fi_j$ corresponding to the maximum electrical output $Pi_{Mi}$, is equal to or less than the reformable flow rate $Fi^R$, setting Pi*=$Pi_{Mi}$ and Fi*=$Fi_{Mi}$, and when $Fi_{Mi}$, that is $Fi_j$ corresponding to the maximum electrical output $Pi_{Mi}$, exceeds the reformable flow rate $Fi^R$, setting Pi*=(the maximum value among $Pi_j$ corresponding to $Fi_j$ that is equal to or less than $Fi^R$) and Fi*=($Fi_j$ that corresponds to the maximum value among $Pi_j$ corresponding to $Fi_j$ that is equal to or less than $Fi^R$);

$E^3$) when there exist two or more i for which the reformable flow rate $Fi^R$ is equal to or more than the minimum value $Fi_{min}$, obtaining $\eta i$ that corresponds to Pi* for each of said two or more i, and representing i that gives the largest $\eta i$ among thus obtained $\eta i$ as I, and when PI* is zero, stopping the electric power generation in the fuel cell, and when PI* exceeds zero, setting an electrical output of the fuel cell to PI*, setting a reforming method performed in the reformer to an I-th reforming method, and setting a flow rate of the hydrocarbon-based fuel supplied to the reforming catalyst layer to FI*; and $F^3$) when there exists only one i for which the reformable flow rate $Fi^R$ is equal to or more than the minimum value $Fi_{min}$, representing said only one i as I, and when PI* is zero, stopping the electric power generation in the fuel cell, and when PI* exceeds zero, setting the electrical output of the fuel cell to PI*, setting the reforming method performed in the reformer to an I-th reforming method, and setting the flow rate of the hydrocarbon-based fuel supplied to the reforming catalyst layer to FI*.

10. The method according to claim 9, wherein steps $A^3$ to $F^3$ are repeatedly performed during the load following operation.

11. The method according to claim 9, wherein the hydrocarbon-based fuel comprises a hydrocarbon-based fuel with a carbon number of two or more.

12. The method according to claim 11, wherein the concentration of a compound with a carbon number of two or more in the reformed gas is 50 ppb or less on a mass basis.

13. A method of load following operation of a fuel cell system comprising a reformer for reforming a hydrocarbon-based fuel to produce a reformed gas containing hydrogen, said reformer having a reforming catalyst layer, and a high temperature fuel cell for generating electric power using the reformed gas, wherein at least two reforming methods selected from the group consisting of a steam reforming method, a partial oxidation reforming method, and an autothermal reforming method are determined as i-th reforming methods, where i is an integer of 1 or more and L or less, and L is 2 or 3, for every i, Mi different fuel cell electrical outputs $Pi_j$ and a flow rate $Fi_j$ of the hydrocarbon-based fuel that corresponds to each $Pi_j$ when a reformed gas produced by the i-th reforming method is supplied to the fuel cell to generate electric power are set beforehand, and an electric power generation efficiency $\eta i_j$ at each $Pi_j$ is obtained beforehand, where j is an integer from 1 to Mi, and Mi is an integer of 2 or more, each $Fi_j$ is a flow rate of the hydrocarbon-based fuel required to be supplied to the reforming catalyst layer, in which the i-th reforming method is performed, in order to output a corresponding electrical output $Pi_j$ from the fuel cell, each $Pi_j$ is 0 or more, $Pi_j$ increases with an increase of j, and each $Fi_j$ is larger than 0, for every i, $Pi_1$ is 0, and $Pi_{Mi}$ is a maximum electrical output of the fuel cell when the i-th reforming method is performed, for each i, a minimum value among $Fi_j$ for all j is represented as $Fi_{min}$, and Ni different reforming catalyst layer temperatures $Ti_k$ and a flow rate $Gi_k$ of the hydrocarbon-based fuel that corresponds to each $Ti_k$ are set beforehand for every i, where k is an integer of 1 or more and Ni or less, and Ni is an integer of 2 or more, each $Gi_k$ is a flow rate of the hydrocarbon-based fuel capable of being reformed in the reforming catalyst layer at a corresponding reforming catalyst layer temperature $Ti_k$ by the i-th reforming method, each $Gi_k$ is larger than 0, and $Gi_k$ is the same value or increases with an increase of k, the method of load following operation of the fuel cell system comprising:

$A^4$) measuring a temperature T of the reforming catalyst layer;

$B^4$) for every i, adopting $Gi_k$ corresponding to a largest $Ti_k$ that is equal to or less than the temperature T as a reformable flow rate $Fi^R$ that is a flow rate of the hydrocarbon-based fuel capable of being reformed in the reforming catalyst layer at the temperature T by the i-th reforming method;

$C^4$) when the reformable flow rate $Fi^R$ is smaller than the minimum value $Fi_{min}$ for every i, stopping electric power generation in the fuel cell;

$D^4$) when the reformable flow rate $Fi^R$ is equal to or more than the minimum value $Fi_{min}$ for at least one i, for each of said at least one i, performing step $d^4 1$ if a fuel cell output demand value $P_D$ is equal to or less than the maximum electrical output $Pi_{Mi}$, and performing step $d^4 2$ if the fuel cell output demand value $P_D$ exceeds the maximum electrical output $Pi_{Mi}$, $d^4 1$) if there exists, among all $Pi_j$, a value of $Pi_j$ that is equal to the fuel cell output demand value $P_D$, then setting $Fi_{DS}$=($Fi_j$ that corresponds to the value of $Pi_j$ that is equal to $P_D$), and if there does not exist, among all $Pi_j$, $Pi_j$ that is equal to the fuel cell output demand value $P_D$, then setting $Fi_{DS}$={not smaller one of a ($Fi_j$ corresponding to a smallest value of $Pi_j$ that exceeds $P_D$) and (a $Fi_j$ corresponding to a largest value of $Pi_j$ that is less than $P_D$)}, and when $Fi_{DS}$ is equal to or less than the reformable flow rate $Fi^R$, setting $Pi^*$=$P_D$ and $Fi^*$=$Fi_{DS}$, and when $Fi_{DS}$ exceeds the reformable flow rate $Fi^R$, if there exists $Pi_j$ corresponding to $Fi_j$ that is equal to or less than $Fi^R$ within a range of less than the fuel cell output demand value $P_D$, then setting $Pi^*$=(the maximum value among the $Pi_j$ corresponding to $Fi_j$ that is equal to or less than $Fi^R$ and existing within the range of less than $P_D$) and $Fi^*$=($Fi_j$ that corresponds to the maximum value among the $Pi_j$ corresponding to $Fi_j$ that is equal to or less than $Fi^R$ and existing within the range of less than $P_D$), and if there does not exist $Pi_j$ corresponding to $Fi_j$ that is equal to or less than $Fi^R$ within the range of less than the fuel cell output demand value $P_D$, then setting $Pi^*$=0 and $Fi^*$=$Fi^R$, $d^4 2$) when $Fi_{Mi}$, that is $Fi_j$ corresponding to the maximum electrical output $Pi_{Mi}$, is equal to or less than the reformable flow rate $Fi^R$, setting $Pi^*$=$Pi_{Mi}$ and $Fi^*$=$Fi_{Mi}$, and when $Fi_{Mi}$, that is $Fi_j$ corresponding to the maximum electrical output $Pi_{Mi}$, exceeds the reformable flow rate $Fi^R$, setting $Pi^*$=(the maximum value among $Pi_j$ corresponding to $Fi_j$ that is equal to or less than $Fi^R$) and $Fi^*$=($Fi_j$ that corresponds to the maximum value among $Pi_j$ corresponding to $Fi_j$ that is equal to or less than $Fi^R$);

$E^4$) when there exist two or more i for which the reformable flow rate $Fi^R$ is equal to or more than the minimum value $Fi_{min}$, obtaining $\eta i$ that corresponds to $Pi^*$ for each of said two or more i, and representing i that gives the largest $\eta i$ among thus obtained $\eta i$ as I, and when $PI^*$ is zero, stopping the electric power generation in the fuel cell, and when $PI^*$ exceeds zero, setting an electrical output of the fuel cell to $PI^*$, setting a reforming method performed in the reformer to an I-th reforming method, and setting a flow rate of the hydrocarbon-based fuel supplied to the reforming catalyst layer to $FI^*$; and $F^4$) when there exists only one i for which the reformable flow rate $Fi^R$ is equal to or more than the minimum value $Fi_{min}$, representing said only one i as I, and when $PI^*$ is zero, stopping the electric power generation in the fuel cell, and when $PI^*$ exceeds zero, setting the electrical output of the fuel cell to $PI^*$, setting the reforming method performed in the reformer to an I-th reforming method, and setting the flow rate of the hydrocarbon-based fuel supplied to the reforming catalyst layer to $FI^*$.

14. The method according to claim 13, wherein steps $A^4$ to $F^4$ are repeatedly performed during the load following operation.

15. The method according to claim 13, wherein the hydrocarbon-based fuel comprises a hydrocarbon-based fuel with a carbon number of two or more.

16. The method according to claim 15, wherein the concentration of a compound with a carbon number of two or more in the reformed gas is 50 ppb or less on a mass basis.

* * * * *